US011392130B1

(12) United States Patent
Desrosiers et al.

(10) Patent No.: US 11,392,130 B1
(45) Date of Patent: Jul. 19, 2022

(54) SELECTING DELIVERY MODES AND DELIVERY AREAS USING AUTONOMOUS GROUND VEHICLES

(71) Applicant: Amazon Technologies, Inc., Seattle, WA (US)

(72) Inventors: Philippe Desrosiers, Seattle, WA (US); Jonathan Barak Flowers, Edgware (GB); Nicholas K. Gentry, Seattle, WA (US); Ramsey P. Gill, Kent, WA (US); Camerin Hahn, Redmond, WA (US); Ian Beck Jordan, Lake Forest Park, WA (US); Liam S C Pingree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 566 days.

(21) Appl. No.: 16/218,094

(22) Filed: Dec. 12, 2018

(51) Int. Cl.
*G05D 1/02* (2020.01)
*G01C 9/00* (2006.01)
(Continued)

(52) U.S. Cl.
CPC ......... *G05D 1/0219* (2013.01); *B64C 39/024* (2013.01); *G01C 9/00* (2013.01);
(Continued)

(58) Field of Classification Search
CPC .. G05D 1/0219; G05D 1/0227; G05D 1/0246; G05D 2201/0207; G06Q 10/083;
(Continued)

(56) References Cited

U.S. PATENT DOCUMENTS 4,865,248 A 9/1989 Barth
4,954,962 A 9/1990 Evans, Jr. et al.
(Continued)

FOREIGN PATENT DOCUMENTS

BE 1024714 A1 5/2018
CN 206938908 U 1/2018
(Continued)

OTHER PUBLICATIONS

Bullock et al., "Analysis of the Use of Digital Road Maps in Vehicle Navigation," 1994, IEEE, p. 494-501 (Year: 1994).
DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.
(Continued)

*Primary Examiner* — Maceeh Anwari
(74) *Attorney, Agent, or Firm* — Athorus, PLLC

(57) ABSTRACT

Autonomous ground vehicles equipped with one or more sensors may capture data regarding ground conditions at a location. The data may refer to or describe slopes, surface textures, terrain features, weather conditions, moisture contents or the like at the location, and may be used to select one or more areas for receiving a delivery of an item. The sensors may include one or more inclinometers, imaging devices or other systems. The autonomous ground vehicles may also engage in one or more direct interactions or communications with a delivery vehicle, and may select an appropriate area that is suitable for such interactions. The autonomous ground vehicles may also prepare the area for an arrival of a delivery vehicle, such as by making one or more visible markings in ground surfaces at the area.

20 Claims, 54 Drawing Sheets

145 146 140 142 NETWORK 190 132
Toy Truck $19.76 Deliver To 96 Larch Road BUY NOW 145 146 140 142 NETWORK 190 132
Thank you! Your Item Will Arrive in 20 Minutes OK

(51) Int. Cl.
*G06Q 10/08* (2012.01)
*B64C 39/02* (2006.01)

(52) U.S. Cl.
CPC ......... *G05D 1/0227* (2013.01); *G05D 1/0246* (2013.01); *G06Q 10/083* (2013.01); *B64C 2201/128* (2013.01); *B64C 2201/141* (2013.01); *G05D 2201/0207* (2013.01)

(58) Field of Classification Search
CPC ............ B64C 39/024; B64C 2201/128; B64C 2201/141; G01C 9/00
USPC ........................................................... 701/23
See application file for complete search history.

(56) References Cited

U.S. PATENT DOCUMENTS 5,040,116 A 8/1991 Evans, Jr. et al.
5,283,739 A 2/1994 Summerville et al.
5,386,462 A 1/1995 Schlamp
5,452,374 A 9/1995 Cullen et al.
5,497,236 A 3/1996 Wolff et al.
5,731,884 A 3/1998 Inoue
5,901,253 A 5/1999 Tretter
5,995,898 A 11/1999 Tuttle
6,031,612 A 2/2000 Shirley
6,266,577 B1 7/2001 Popp et al.
6,344,796 B1 2/2002 Ogilvie et al.
6,374,155 B1 4/2002 Wallach et al.
6,426,699 B1 7/2002 Porter
6,507,670 B1 1/2003 Moed
6,543,983 B1 4/2003 Felder et al.
6,636,781 B1 10/2003 Shen et al.
6,690,997 B2 2/2004 Rivalto
6,694,217 B2 2/2004 Bloom
6,705,523 B1 3/2004 Stamm et al.
6,919,803 B2 7/2005 Breed
6,954,290 B1 10/2005 Braudaway et al.
6,961,711 B1 11/2005 Chee
6,965,440 B1 11/2005 Nakagiri et al.
6,970,838 B1 11/2005 Kamath et al.
7,006,952 B1 2/2006 Matsumoto et al.
7,016,536 B1 3/2006 Ling et al.
7,031,519 B2 4/2006 Elmenhurst
7,129,817 B2 10/2006 Yamagishi
7,133,743 B2 11/2006 Tilles et al.
7,145,699 B2 12/2006 Dolan
7,149,611 B2 12/2006 Beck et al.
7,188,513 B2 3/2007 Wilson
7,337,686 B2 3/2008 Sagi-Dolev
7,337,944 B2 3/2008 Devar
7,339,993 B1 3/2008 Brooks et al.
7,459,880 B1 12/2008 Rosen
7,639,386 B1 12/2009 Siegel et al.
7,668,404 B2 2/2010 Adams et al.
7,673,831 B2 3/2010 Steele et al.
7,685,953 B2 3/2010 Giles
7,693,745 B1 4/2010 Pomerantz et al.
7,894,939 B2 2/2011 Zini et al.
7,925,375 B2 4/2011 Schininger et al.
7,946,530 B1 5/2011 Talmage
7,966,093 B2 6/2011 Zhuk
8,015,023 B1 9/2011 Lee et al.
8,078,317 B2 12/2011 Allinson et al.
8,126,642 B2 2/2012 Trepagnier et al.
8,131,607 B2 3/2012 Park et al.
8,145,351 B2 3/2012 Schininger et al.
8,195,328 B2 6/2012 Mallett et al.
8,286,236 B2 10/2012 Jung et al.
8,412,588 B1 4/2013 Bodell et al.
8,418,959 B2 4/2013 Kang et al.
8,429,754 B2 4/2013 Jung et al.
8,511,606 B1 8/2013 Lutke et al.
8,577,538 B2 11/2013 Lenser et al.
8,602,349 B2 12/2013 Petrov
8,736,820 B2 5/2014 Choe et al.
8,752,166 B2 6/2014 Jung et al.
8,791,790 B2 7/2014 Robertson et al.
8,899,903 B1 12/2014 Saad et al.
8,948,914 B2 2/2015 Zini et al.
8,956,100 B2 2/2015 Davi et al.
8,989,053 B1 3/2015 Skaaksrud et al.
9,033,285 B2 5/2015 Iden et al.
9,051,043 B1 6/2015 Peeters et al.
9,079,587 B1 7/2015 Rupp et al.
9,139,310 B1 9/2015 Wang
9,163,909 B2 10/2015 Chengalva
9,195,959 B1 11/2015 Lopez et al.
9,216,587 B2 12/2015 Ando et al.
9,216,857 B1 12/2015 Kalyan et al.
9,230,236 B2 1/2016 Villamar
9,235,213 B2 1/2016 Villamar
9,244,147 B1 1/2016 Soundararajan et al.
9,256,852 B1 2/2016 Myllymaki
9,261,578 B2 2/2016 Im et al.
9,336,506 B2 5/2016 Shucker et al.
9,336,635 B2 5/2016 Robertson et al.
9,358,975 B1 6/2016 Watts
9,373,149 B2 * 6/2016 Abhyanker .......... G05D 1/0251
9,381,916 B1 7/2016 Zhu et al.
9,397,518 B1 7/2016 Theobald
9,404,761 B2 8/2016 Meuleau
9,409,644 B2 8/2016 Stanek et al.
9,411,337 B1 8/2016 Theobald et al.
9,412,280 B1 8/2016 Zwillinger et al.
9,436,183 B2 9/2016 Thakur et al.
9,436,926 B2 9/2016 Cousins et al.
9,448,559 B2 9/2016 Kojo et al.
9,489,490 B1 11/2016 Theobald
9,510,316 B2 11/2016 Skaaksrud
9,535,421 B1 1/2017 Canoso et al.
9,545,852 B2 1/2017 Streett
9,561,941 B1 2/2017 Watts
9,568,335 B2 2/2017 Thakur et al.
9,582,950 B2 2/2017 Shimizu et al.
9,600,645 B2 3/2017 Fadell et al.
9,619,776 B1 4/2017 Ford et al.
9,623,553 B1 4/2017 Theobald et al.
9,623,562 B1 4/2017 Watts
9,650,136 B1 5/2017 Haskin et al.
9,652,912 B2 5/2017 Fadell et al.
9,656,805 B1 5/2017 Evans et al.
9,671,791 B1 6/2017 Paczan
9,682,481 B2 6/2017 Lutz et al.
9,697,730 B2 7/2017 Thakur et al.
9,718,564 B1 8/2017 Beckman et al.
9,720,414 B1 8/2017 Theobald
9,731,821 B2 8/2017 Hoareau et al.
9,733,646 B1 8/2017 Nusser et al.
9,746,852 B1 8/2017 Watts et al.
9,746,853 B2 8/2017 Scheepjens et al.
9,778,653 B1 10/2017 McClintock et al.
9,786,187 B1 10/2017 Bar-Zeev et al.
9,796,529 B1 10/2017 Hoareau et al.
9,828,092 B1 11/2017 Navot et al.
9,858,604 B2 1/2018 Apsley et al.
9,886,035 B1 2/2018 Watts et al.
9,896,204 B1 2/2018 Willison
9,959,771 B1 5/2018 Carlson
9,959,773 B2 5/2018 Raptopoulos et al.
9,974,612 B2 5/2018 Pinter et al.
10,022,753 B2 7/2018 Chelian et al.
10,022,867 B2 7/2018 Saboo et al.
10,048,697 B1 8/2018 Theobald
10,108,185 B1 10/2018 Theobald
2001/0045449 A1 11/2001 Shannon
2002/0016726 A1 2/2002 Ross
2002/0035450 A1 3/2002 Thackston
2002/0072979 A1 6/2002 Sinha et al.
2002/0087375 A1 7/2002 Griffin et al.
2002/0107751 A1 8/2002 Rajagopalan et al.
2002/0111914 A1 8/2002 Terada et al.
2002/0116289 A1 8/2002 Yang
2002/0123930 A1 9/2002 Boyd et al.

(56) References Cited

U.S. PATENT DOCUMENTS

2002/0156645 A1 10/2002 Hansen
2003/0040980 A1 2/2003 Nakajima et al.
2003/0072031 A1 4/2003 Kuwata et al.
2003/0121968 A1 7/2003 Miller et al.
2003/0141411 A1 7/2003 Pandya et al.
2004/0002898 A1 1/2004 Kuhlmann et al.
2004/0068416 A1 4/2004 Solomon
2004/0112660 A1 6/2004 Johansson et al.
2004/0162638 A1 8/2004 Solomon
2005/0068178 A1 3/2005 Lee et al.
2005/0093865 A1 5/2005 Jia
2005/0102240 A1 5/2005 Misra et al.
2005/0244060 A1 11/2005 Nagarajan et al.
2005/0285934 A1 12/2005 Carter
2006/0053534 A1 3/2006 Mullen
2006/0118162 A1 6/2006 Saelzer et al.
2006/0136237 A1 6/2006 Spiegel et al.
2007/0016496 A1 1/2007 Bar et al.
2007/0073552 A1 3/2007 Hileman
2007/0150375 A1 6/2007 Yang
2007/0170237 A1 7/2007 Neff
2007/0233337 A1 10/2007 Plishner
2007/0244763 A1 10/2007 Williams et al.
2007/0293978 A1 12/2007 Wurman et al.
2008/0027591 A1 1/2008 Lenser et al.
2008/0100258 A1 5/2008 Ward
2008/0109246 A1 5/2008 Russell
2008/0111816 A1 5/2008 Abraham et al.
2008/0150679 A1 6/2008 Bloomfield
2008/0154659 A1 6/2008 Bettes et al.
2008/0167817 A1 7/2008 Hessler et al.
2008/0301009 A1 12/2008 Plaster et al.
2009/0062974 A1 3/2009 Tamamoto et al.
2009/0063166 A1 3/2009 Palmer
2009/0079388 A1 3/2009 Reddy
2009/0086275 A1 4/2009 Liang et al.
2009/0106124 A1 4/2009 Yang
2009/0149985 A1 6/2009 Chirnomas
2009/0164379 A1 6/2009 Jung et al.
2009/0165127 A1 6/2009 Jung et al.
2009/0236470 A1 9/2009 Goossen et al.
2009/0254457 A1 10/2009 Folsom
2009/0254482 A1 10/2009 Vadlamani et al.
2009/0299903 A1 12/2009 Hung et al.
2009/0303507 A1 12/2009 Abeloe
2009/0314883 A1 12/2009 Arlton et al.
2010/0030608 A1 2/2010 Kaminsky et al.
2010/0031351 A1 2/2010 Jung et al.
2010/0088163 A1 4/2010 Davidson et al.
2010/0088175 A1 4/2010 Lundquist
2010/0169185 A1 7/2010 Cottingham
2010/0287065 A1 11/2010 Alivandi
2010/0299222 A1 11/2010 Hamilton et al.
2011/0035149 A1 2/2011 McAndrew et al.
2011/0074570 A1 3/2011 Feldstein et al.
2011/0087350 A1 4/2011 Fogel et al.
2011/0112761 A1 5/2011 Hurley et al.
2011/0153052 A1 6/2011 Pettibone et al.
2011/0166707 A1 7/2011 Romanov et al.
2011/0246331 A1 10/2011 Luther et al.
2011/0264311 A1 10/2011 Lee et al.
2011/0282476 A1 11/2011 Hegemier et al.
2011/0313878 A1 12/2011 Norman
2012/0039694 A1 2/2012 Suzanne
2012/0078592 A1 3/2012 Sims
2012/0109419 A1 5/2012 Mercado
2012/0219397 A1 8/2012 Baker
2012/0221438 A1 8/2012 Cook et al.
2012/0323365 A1 12/2012 Taylor et al.
2013/0006739 A1 1/2013 Horvitz et al.
2013/0073477 A1 3/2013 Grinberg
2013/0081245 A1 4/2013 Vavrina et al.
2013/0126611 A1 5/2013 Kangas et al.
2013/0148123 A1 6/2013 Hayashi
2013/0218446 A1 8/2013 Bradley et al.
2013/0218799 A1 8/2013 Lehmann et al.
2013/0261792 A1 10/2013 Gupta et al.
2013/0262251 A1 10/2013 Wan et al.
2013/0262252 A1 10/2013 Lakshman et al.
2013/0262276 A1 10/2013 Wan et al.
2013/0262336 A1 10/2013 Wan et al.
2013/0264381 A1 10/2013 Kim et al.
2013/0324164 A1 12/2013 Vulcano
2014/0022055 A1 1/2014 Levien et al.
2014/0025230 A1 1/2014 Levien et al.
2014/0030444 A1 1/2014 Swaminathan et al.
2014/0031964 A1 1/2014 Sidhu et al.
2014/0032034 A1 1/2014 Raptopoulos et al.
2014/0040065 A1 2/2014 DuBois
2014/0052661 A1 2/2014 Shakes et al.
2014/0058959 A1 2/2014 Isbjornssund et al.
2014/0081445 A1 3/2014 Villamar
2014/0089073 A1 3/2014 Jacobs et al.
2014/0136282 A1 5/2014 Fedele
2014/0136414 A1 5/2014 Abhyanker
2014/0149244 A1 5/2014 Abhyanker
2014/0156053 A1 6/2014 Mahdavi et al.
2014/0180914 A1 6/2014 Abhyanker
2014/0200697 A1 7/2014 Cheng
2014/0214684 A1 7/2014 Pell
2014/0244433 A1 8/2014 Cruz
2014/0254896 A1 9/2014 Zhou et al.
2014/0283104 A1 9/2014 Nilsson
2014/0309813 A1 10/2014 Ricci
2014/0325218 A1 10/2014 Shimizu et al.
2014/0330456 A1 11/2014 Morales et al.
2014/0337246 A1 11/2014 Williams et al.
2015/0006005 A1 1/2015 Yu et al.
2015/0066178 A1 3/2015 Stava
2015/0069968 A1 3/2015 Pounds
2015/0102154 A1 4/2015 Duncan et al.
2015/0112837 A1 4/2015 O'Dea
2015/0112885 A1 4/2015 Fadell et al.
2015/0120094 A1 4/2015 Kimchi et al.
2015/0120602 A1 4/2015 Huffman et al.
2015/0127712 A1 5/2015 Fadell et al.
2015/0129716 A1 5/2015 Yoffe
2015/0153175 A1 6/2015 Skaaksrud
2015/0154545 A1 6/2015 Skaaksrud et al.
2015/0158599 A1 6/2015 Sisko
2015/0175276 A1 6/2015 Koster
2015/0183528 A1 7/2015 Walsh et al.
2015/0185034 A1 7/2015 Abhyanker
2015/0202770 A1 7/2015 Patron et al.
2015/0227882 A1 8/2015 Bhatt
2015/0246727 A1 9/2015 Masticola et al.
2015/0253777 A1 9/2015 Binney et al.
2015/0254611 A1 9/2015 Perez
2015/0259078 A1 9/2015 Filipovic et al.
2015/0317597 A1 11/2015 Shucker et al.
2015/0332206 A1 11/2015 Trew et al.
2015/0367850 A1 12/2015 Clarke et al.
2015/0370251 A1 12/2015 Siegel et al.
2016/0009413 A1 1/2016 Lee et al.
2016/0019495 A1 1/2016 Kolchin
2016/0033966 A1 2/2016 Farris et al.
2016/0068267 A1 3/2016 Liu et al.
2016/0104099 A1 4/2016 Villamar
2016/0104113 A1 4/2016 Gorlin
2016/0107750 A1 4/2016 Yates
2016/0114488 A1 4/2016 Medina et al.
2016/0117931 A1 4/2016 Chan et al.
2016/0129592 A1 5/2016 Saboo et al.
2016/0132059 A1 5/2016 Mason et al.
2016/0144734 A1 5/2016 Wang et al.
2016/0144982 A1 5/2016 Sugumaran
2016/0196755 A1 7/2016 Navot et al.
2016/0196756 A1 7/2016 Prakash et al.
2016/0200438 A1 7/2016 Bokeno et al.
2016/0207627 A1 7/2016 Hoareau et al.
2016/0214717 A1 7/2016 Silva
2016/0235236 A1 8/2016 Byers et al.
2016/0236778 A1 8/2016 Takayama et al.
2016/0239789 A1 8/2016 Hanks

(56) References Cited

U.S. PATENT DOCUMENTS

2016/0239803 A1 8/2016 Borley et al.
2016/0257401 A1 9/2016 Buchmueller et al.
2016/0258775 A1 9/2016 Santilli et al.
2016/0266578 A1 9/2016 Douglas et al.
2016/0282126 A1 9/2016 Watts et al.
2016/0299233 A1 10/2016 Levien et al.
2016/0334229 A1 11/2016 Ross et al.
2016/0364660 A1 12/2016 Brown
2016/0364679 A1 12/2016 Cao
2016/0364823 A1 12/2016 Cao
2016/0364989 A1 * 12/2016 Speasl .................. G08G 5/0082
2017/0011333 A1 1/2017 Greiner et al.
2017/0011340 A1 1/2017 Gabbai
2017/0032315 A1 2/2017 Gupta et al.
2017/0087999 A1 3/2017 Miller et al.
2017/0096222 A1 4/2017 Spinelli et al.
2017/0098378 A1 4/2017 Soundararajan et al.
2017/0100837 A1 4/2017 Zevenbergen et al.
2017/0101017 A1 4/2017 Street
2017/0113352 A1 4/2017 Lutz et al.
2017/0147975 A1 5/2017 Natarajan et al.
2017/0154347 A1 6/2017 Bateman
2017/0164319 A1 6/2017 Skaaksrud et al.
2017/0167881 A1 6/2017 Rander
2017/0187993 A1 6/2017 Martch et al.
2017/0193442 A1 7/2017 Ekkel et al.
2017/0255896 A1 9/2017 Dyke
2017/0286905 A1 10/2017 Richardson et al.
2017/0300855 A1 10/2017 Lund et al.
2017/0308098 A1 10/2017 Yu et al.
2017/0316379 A1 11/2017 Lepek et al.
2017/0345245 A1 11/2017 Torresani et al.
2017/0372256 A1 12/2017 Kantor et al.
2018/0024554 A1 1/2018 Brady et al.
2018/0088586 A1 3/2018 Hance et al.
2018/0127211 A1 5/2018 Jarvis et al.
2018/0137454 A1 5/2018 Kulkarni et al.
2018/0203464 A1 7/2018 Yu et al.

FOREIGN PATENT DOCUMENTS

DE 102011086497 A1 5/2013
FR 2692064 A1 12/1993
JP 2004126800 A 4/2004
JP 2011211025 A 10/2011
WO 2013148123 A1 10/2013
WO 2017064202 A1 4/2017
WO 2020107468 A1 * 11/2018

OTHER PUBLICATIONS

DHL Trend Research, "Unmanned Aerial Vehicles in Logistics: A Dhl perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

International Search Report and Written Opinion for PCT Application No. PCT/US2017/043401 dated Sep. 19, 2017.

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Navaravong et al., "Formation Reconfiguration for Mobile Robots with Network Connectivity Constraints," 2012, IEEE, p. 18-24 (Year: 2012).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

URL: https://web.archive.org/web/20160804001046/https://www.starship.xyz/, download date: Aug. 4, 2016, 21 pages.

* cited by examiner

485
NETWORK
490
476
462-1
468
462-2
BATTERY 88%
471
456
453
459
462-3
459
450
457
452
464
470
473
472

SELECTING DELIVERY MODES AND DELIVERY AREAS USING AUTONOMOUS GROUND VEHICLES

BACKGROUND

Electronic marketplaces (or online marketplaces) are increasingly common electronic forums through which customers may place orders for one or more items over the Internet or one or more other computer networks. Such marketplaces enable customers to visit one or more network sites from any corner of the globe, to view and evaluate items, and to place orders for the purchase of such items over the Internet. Orders for items that are placed at electronic marketplaces over the Internet may be fulfilled at the original locations of vendors (or manufacturers, merchants or other sources of the items), or at one or more fulfillment centers or other facilities in possession of such items, from which the items may be shipped to customers by mail or another common carrier.

Items may be delivered in any number of vehicles. For example, items may be delivered from an origin (e.g., a source of the items) to one or more destinations by mail or another common carrier, e.g., in one or more cars, trucks, tractors, vans or other automobiles. Additionally, an aerial vehicle may be programmed or otherwise configured to transport one or more items from an origin to one or more destinations. Alternatively, items may be carried or otherwise transported to a selected destination by a courier on foot, or on one or more self-guided vehicles (e.g., bicycles). For example, an aerial vehicle or another vehicle, or a mobile device carried or otherwise associated with a courier, may be programmed with one or more sets of coordinates corresponding to destinations, or geolocations, and programmed to travel by air at desired speeds to such destinations. Upon arriving at a destination, an aerial vehicle may descend in altitude and land, while a ground vehicle such as an automobile may idle or park, and a courier on foot may approach, a selected area at the destination before departing for another destination. An area for receiving a delivery may be selected based on any basis.

Occasionally, a delivery of an item may be requested at a destination having ground conditions that are dynamic or uncertain in nature. For example, a patch of land that appears flat, green and lush in satellite imagery or from a street or sidewalk may be sloped, waterlogged or unstable, while a driveway or patio may be vacant at one moment, and occupied by one or more vehicles, humans or other animals at another moment. Information or data regarding ground conditions within an area is only as good as it is recent.

DETAILED DESCRIPTION

As is set forth in greater detail below, the present disclosure is directed to selecting delivery modes and delivery areas using autonomous ground vehicles. More specifically, some embodiments of the systems and methods disclosed herein are directed to using an autonomous ground vehicle to evaluate ground conditions within a region in a vicinity of an intended destination, and to select an area for delivering one or more items to the destination based on information or data regarding the ground conditions that is captured by one or more sensors aboard the autonomous ground vehicle. The autonomous ground vehicles may be configured to capture data regarding ground conditions in one or more regions or spaces that are associated with a home, a building or any other structure or facility either in response to an order or a request for a facility or at any time, such as on a periodic basis. Data regarding ground conditions that is captured by autonomous ground vehicles may be processed and used to identify areas for deliveries by vehicles such as aerial vehicles, traditional road vehicles (e.g., cars, trucks, vans, tractors or other automobiles), or other autonomous ground vehicles, as well as ground-based couriers traveling on foot or by a self-guided vehicle such as a bicycle, a scooter, or a personal transporter. The delivery areas may be selected by one or more computer devices or systems residing aboard the autonomous ground vehicles that captured the data, or by one or more other computer devices or systems in other locations, such as aboard one or more other vehicles for completing a delivery, or in one or more physical or virtual systems, e.g., a "cloud"-based environment.

In some embodiments, an autonomous ground vehicle may prepare an area for receiving a delivery, e.g., a landing by an unmanned aerial vehicle, or an arrival of a ground-based vehicle or courier, such as by clearing the area of objects, or by making one or more markings on the area to designate the area for an arrival of the vehicle or courier, e.g., a landing by an unmanned aerial vehicle. For example, in some embodiments, an unmanned aerial vehicle may be programmed or configured to land directly on an autonomous ground vehicle in a selected area, or to hover within a vicinity of the autonomous ground vehicle, and to complete one or more interactions (e.g., a transfer or exchange of an item) with the autonomous ground vehicle. In other embodiments, a delivery vehicle or courier may be instructed to travel to an area selected based on data captured by one or more autonomous ground vehicles in order to interact with the one or more autonomous ground vehicles. Additionally, a delivery vehicle or courier may be configured for communication with an autonomous ground vehicle directly or by one or more networks.

Figure 1A:
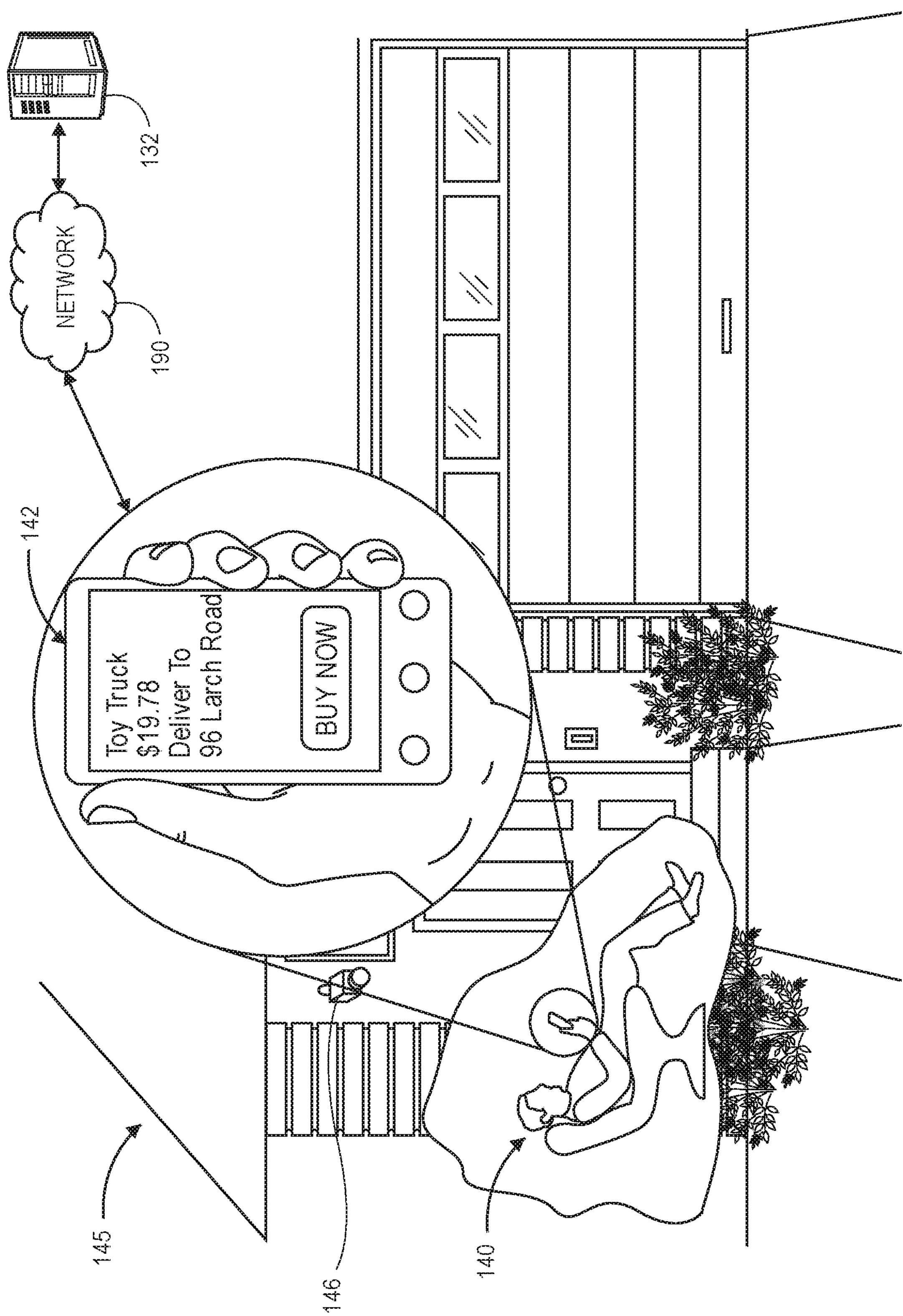
FIGS. 1A through 1J are views of aspects of one system for selecting delivery modes or delivery areas using autonomous ground vehicles in accordance with embodiments of the present disclosure.
Figure 1B:
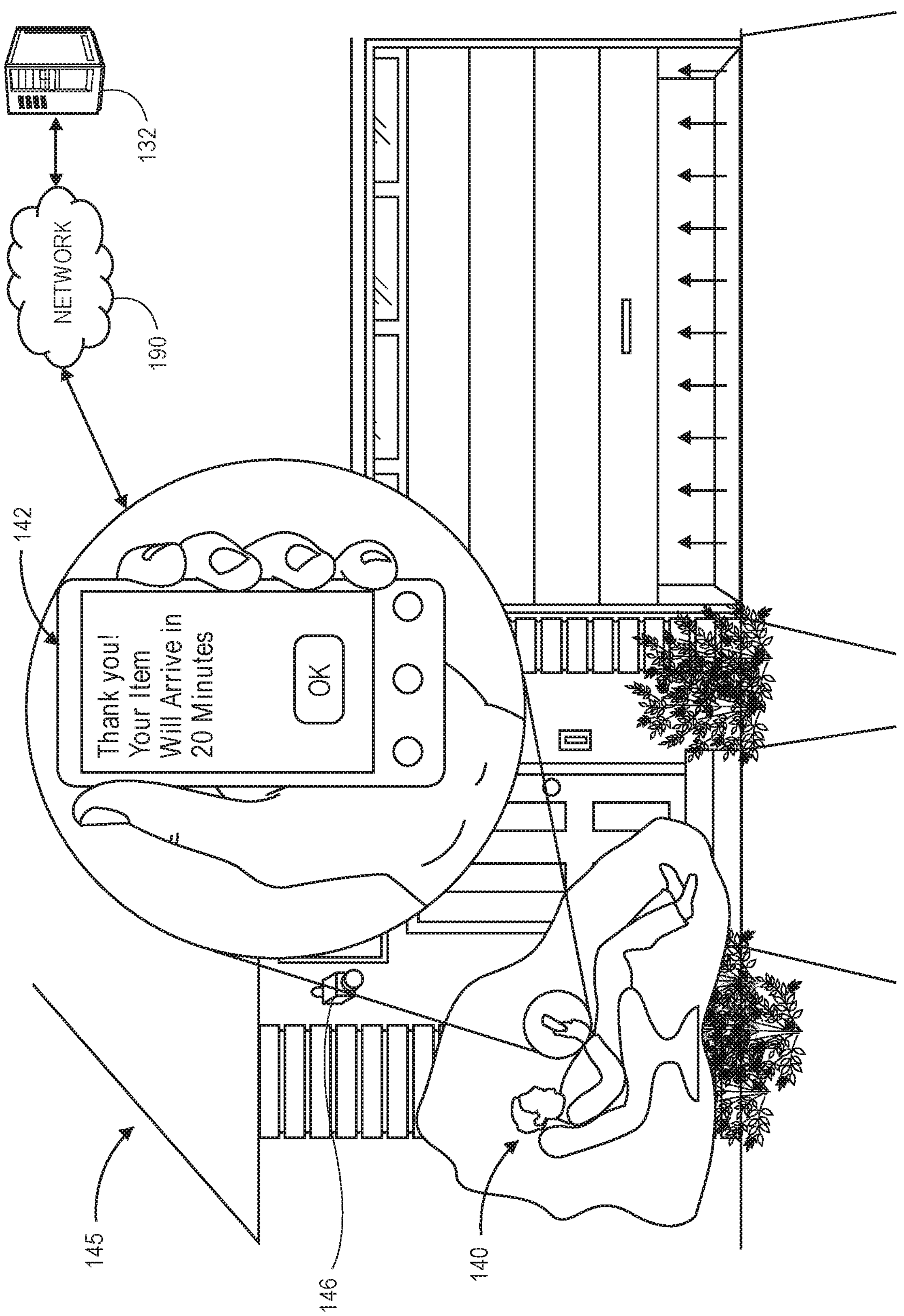
Figure 1C:
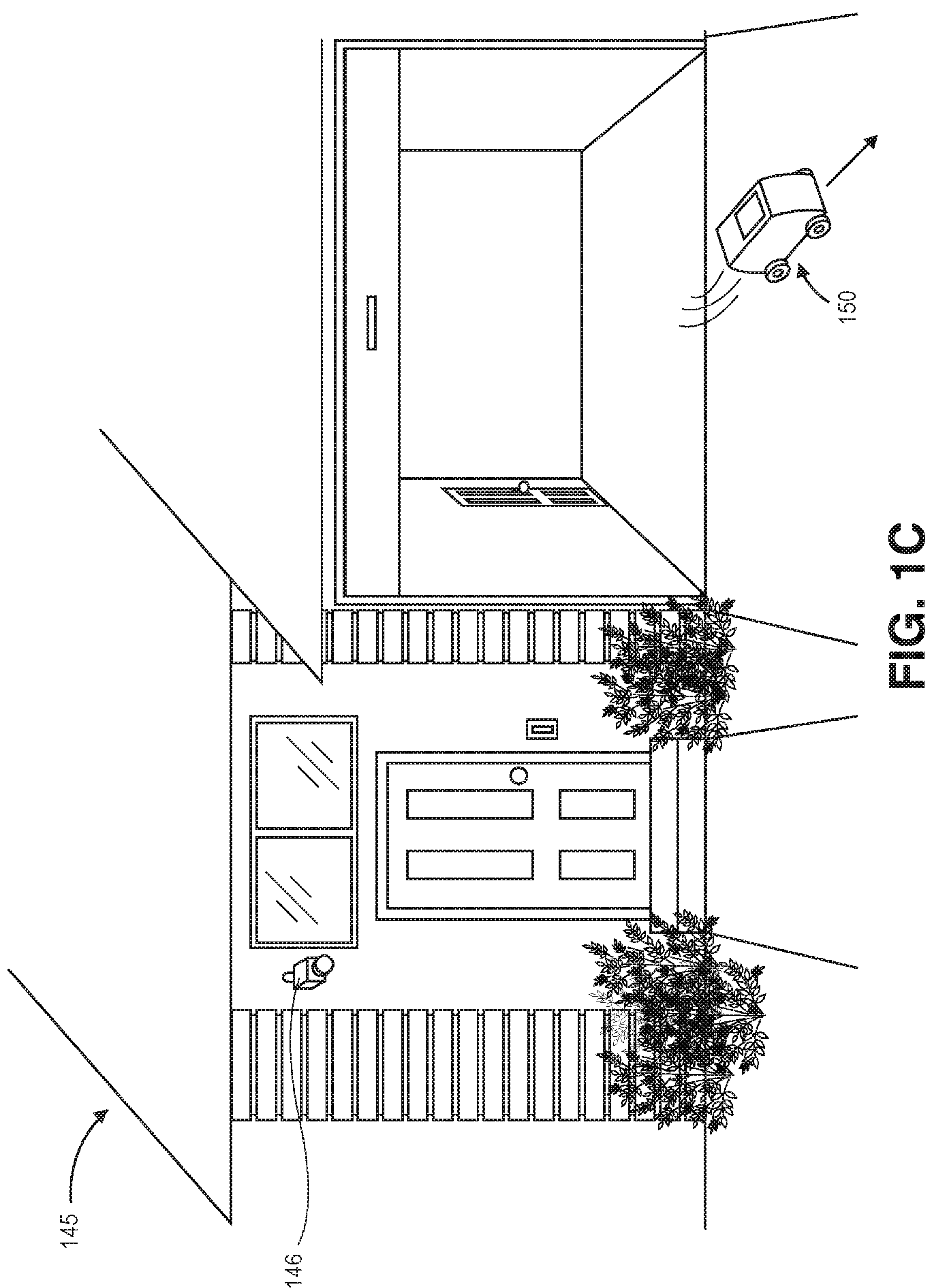

Referring to FIGS. 1A through 1J, views of aspects of one system for selecting delivery modes or delivery areas using autonomous ground vehicles in accordance with embodiments of the present disclosure are shown. As is shown in FIGS. 1A through 1C, a customer 140 in a home 145 or other facility operates a mobile device 142 that is configured to communicate with one or more servers 132 over one or more networks 190, which may include the Internet in whole or in part. The servers 132 may be associated with a materials handling facility, a fulfillment center or any other facility that is adapted to receive, store, process and/or distribute items to customers. The mobile device 142 and/or the server 132 may be configured for communication via any wired or wireless systems or protocols, including but not limited to Wireless Fidelity (or "Wi-Fi"), radio frequency identification (or "RFID"), near-field communication (or "NFC") readers, Bluetooth®, or any other type of systems or protocols. The home 145 may include one or more internal or external sensors, such as a digital camera 146 configured to capture imaging data, acoustic data, or any other information or data.

As is shown in FIG. 1A, the customer 140 completes an order for an item (viz., a toy truck) to be delivered to the home 145. As is shown in FIG. 1B, the customer 140 is notified that the item will be delivered within a brief period of time (viz., twenty minutes). As is shown in FIG. 1C, upon receiving confirmation that the item will be delivered shortly, an autonomous ground vehicle 150 departs the home 145 via a door (viz., a garage door). The autonomous ground vehicle 150 may be outfitted with one or more sensors for capturing information or data regarding ground conditions, such as one or more imaging devices, inclinometers, moisture sensors, or others.

Figure 1D:
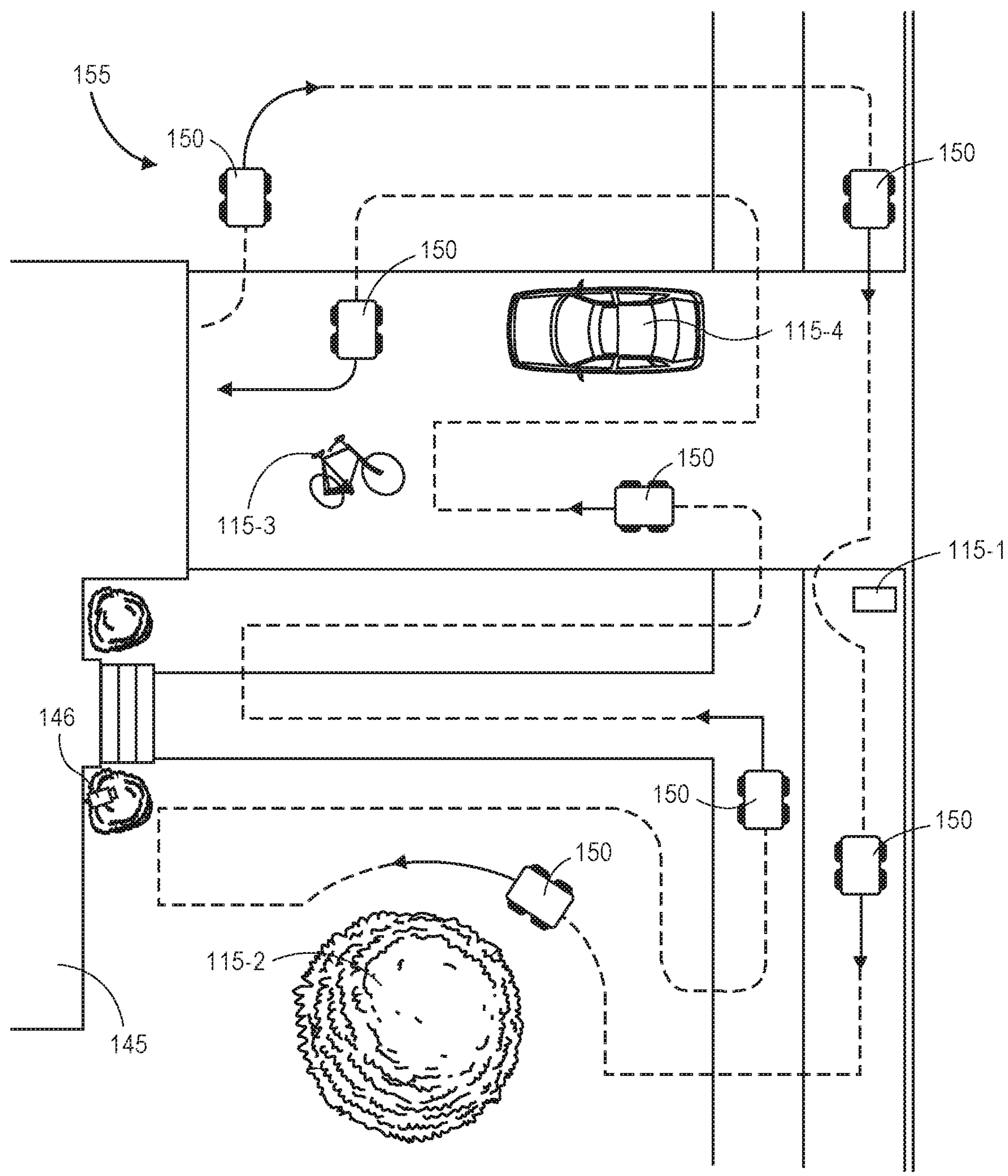

As is shown in FIG. 1D, the autonomous ground vehicle 150 surveys grounds 155 within a vicinity of the home 145 while traveling in regular or irregular patterns defined with respect to one or more boundaries of the grounds 155 or aspects of the home 145 (e.g., walls, foundations, or structures of the home 145) on the grounds 155, and captures information or data regarding conditions of the grounds 155 by the one or more sensors. For example, and as is shown in FIG. 1D, the autonomous ground vehicle 150 may travel about a perimeter of the grounds 155 and in one or more parallel or perpendicular paths while capturing information or data. The autonomous ground vehicle 150 may be programmed with coordinates, position data or other information or data regarding a placement of the home 145 on the grounds 155, as well as boundaries or property lines, or any other features, and configured to detect and/or avoid one or more obstacles on the grounds 155. Alternatively, the autonomous ground vehicle 150 may be programmed or configured to travel in paths that are neither parallel nor perpendicular. In some embodiments, the autonomous ground vehicle 150 may be programmed or otherwise configured to travel along the grounds 155 at regular times (e.g., according to a schedule), in response to one or more events (e.g., the order of the item), or on any other basis.

Figure 1E:
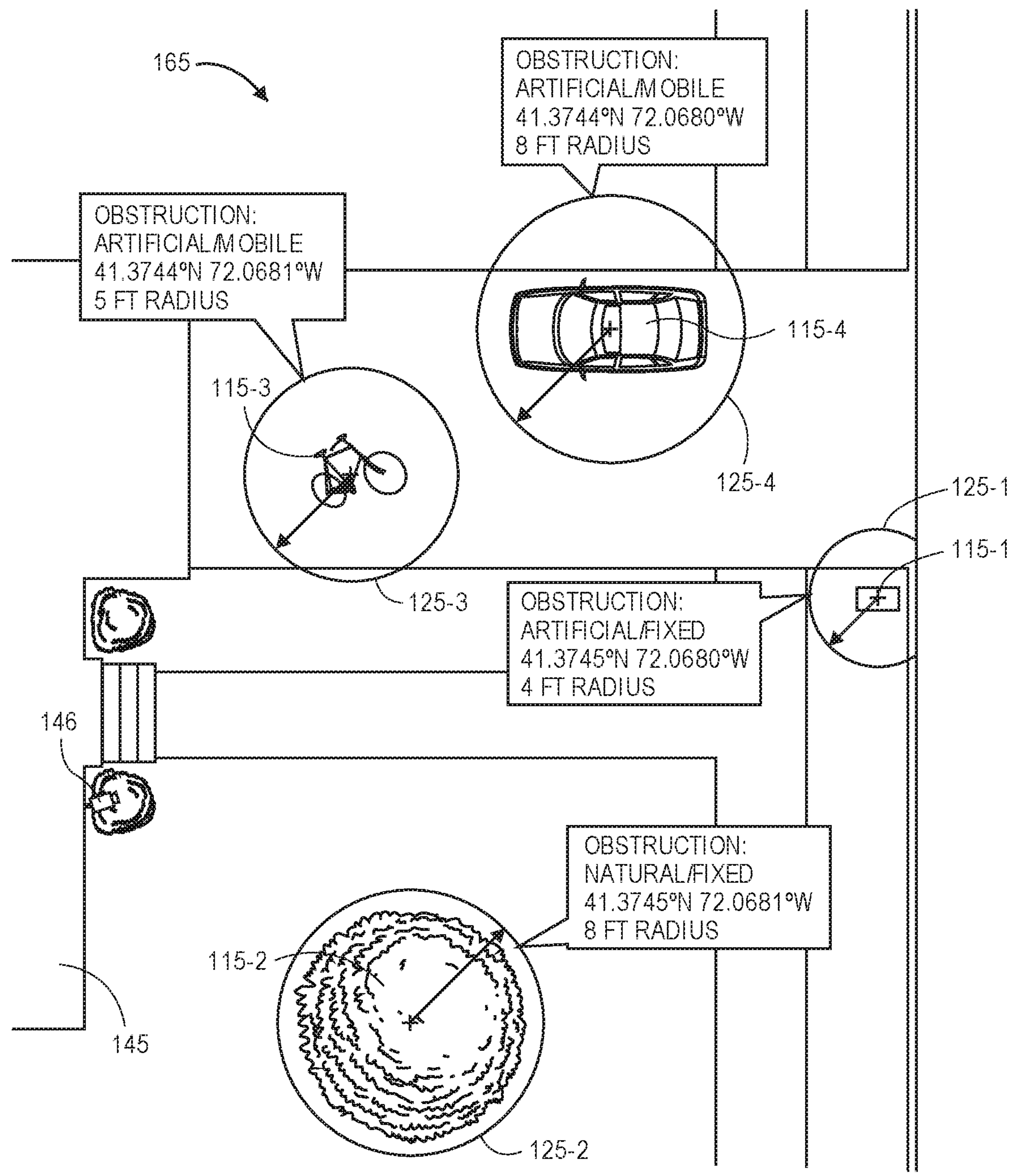

As is shown in FIG. 1E, the autonomous ground vehicle 150 generates a record 165 including positions of a mailbox 115-1, a tree 115-2, a bicycle 115-3 and an automobile 115-4, or any other obstacles that may be present on the grounds 155. The autonomous ground vehicle 150 may further determine any other information or data regarding conditions of the grounds 155, including but not limited to slopes, surface textures, terrain features, weather conditions, moisture contents or the like in one or more areas of the grounds 155. The autonomous ground vehicle 150 may be configured with one or more computer devices or systems for receiving the information or data regarding the conditions of the grounds 155, along with positions (e.g., sets of geographic coordinates, such as a latitude and a longitude, and, optionally, an elevation) at which such information or data was captured, and may store such information or data and positions in one or more memory components or data stores, or transmit such information or data to one or more external systems.

Figure 1F:
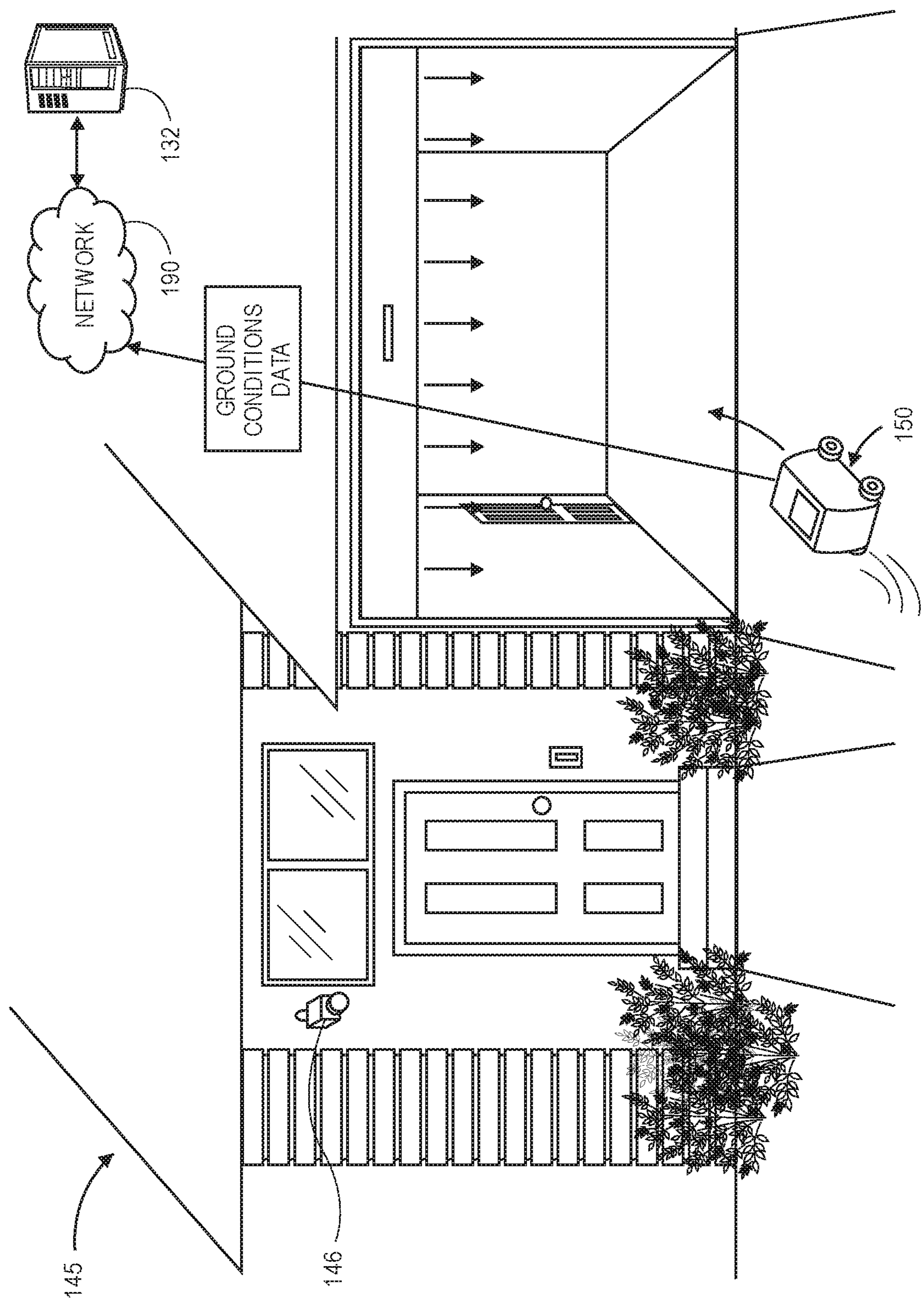
Figure 1G:
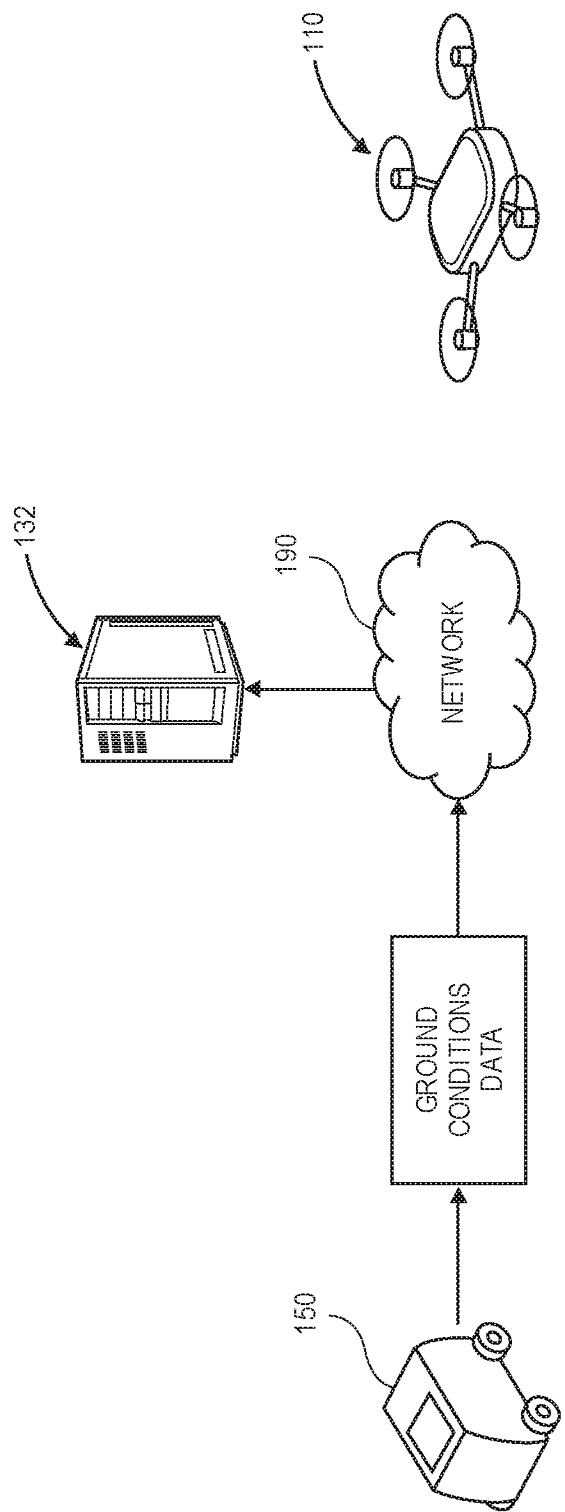
Figure 1H:
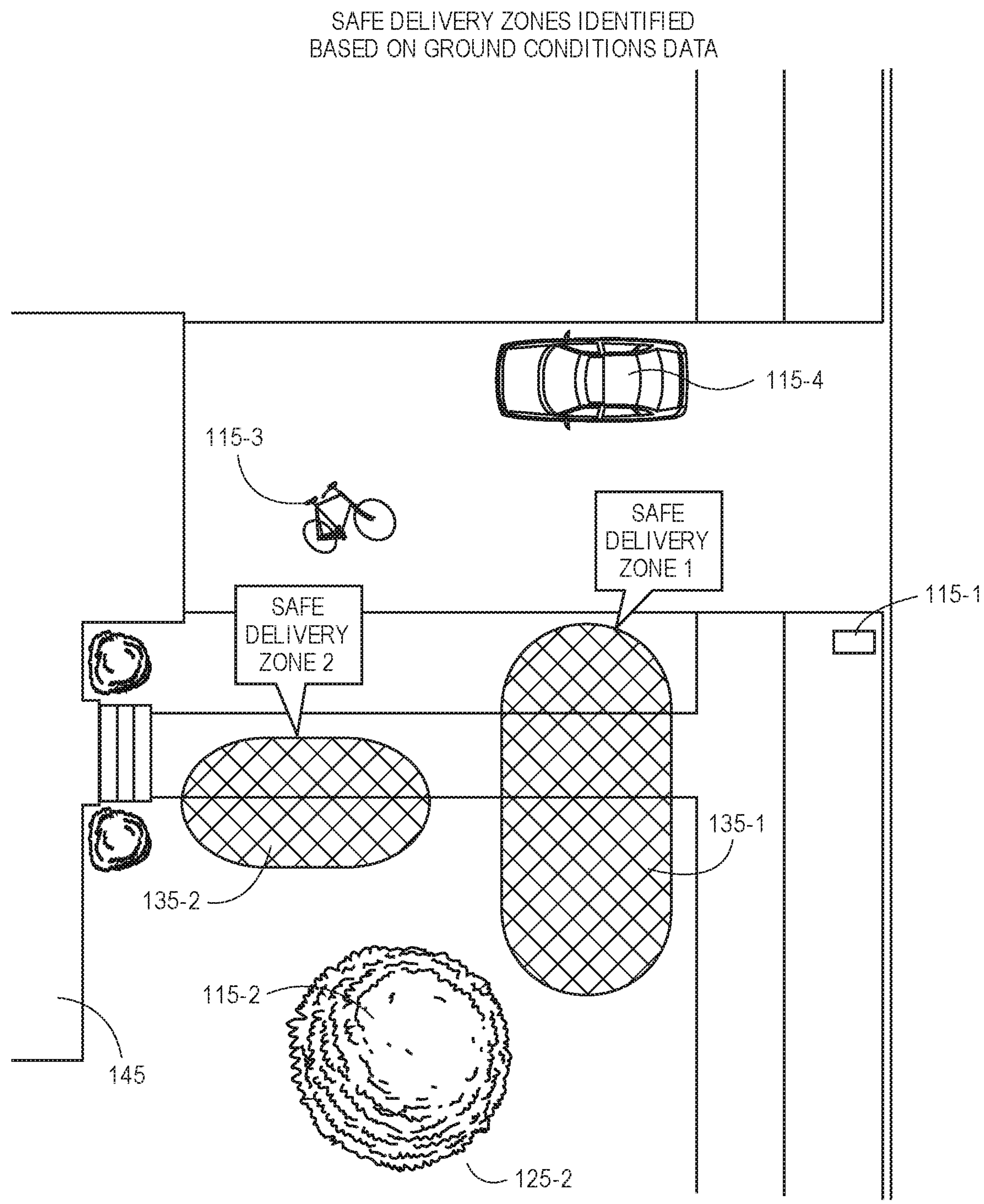

As is shown in FIGS. 1F and 1G, upon completing a survey of the grounds 155, the autonomous mobile vehicle 150 transmits the record 165 and any other information or data regarding conditions of the grounds 155 to the server 132 over the one or more networks 190, e.g., synchronously or asynchronously, or in one or more batch processes. Alternatively, the information or data may be transmitted to the server 132 in real time or in near-real time, as the information or data is captured. As is shown in FIG. 1H, the server 132 may identify one or more safe landing zones 135-1, 135-2 for an aerial vehicle 110 based on the information or data regarding the ground conditions, or any other information or data including but not limited to one or more dimensions of the aerial vehicle 110, or one or more operating conditions or constraints for the aerial vehicle 110, e.g., one or more dimensions or masses of the aerial vehicle 110, or one or more ranges of speeds, altitudes, or other parameters of the aerial vehicle 110, such as anticipated acoustic emissions of the aerial vehicle 110, or minimum levels of visibility required for safe operation of the aerial vehicle 110. For example, as is shown in FIG. 1H, the safe landing zones 135-1, 135-2 may be defined within borders of the grounds 155 and at safe ranges from the mailbox 115-1, the tree 115-2, the bicycle 115-3 and the automobile 115-4. Additionally, the safe landing zones 135-1, 135-2 may be defined on portions of the grounds 155 that are sufficiently flat and durable, and may adequately support the mass of the aerial vehicle 110 during a landing evolution and a subsequent take-off evolution. In some embodiments, the safe landing zones 135-1, 135-2 need not be located within a vicinity of the home 145. For example, the autonomous ground vehicle 150 may survey and capture data regarding one or more public spaces, or other public or private areas that are not immediately adjacent the home 145 and for which permission for the autonomous ground vehicle 150 to travel thereon, or for the aerial vehicle 110 to land or take off, has been obtained.

Figure 1I:
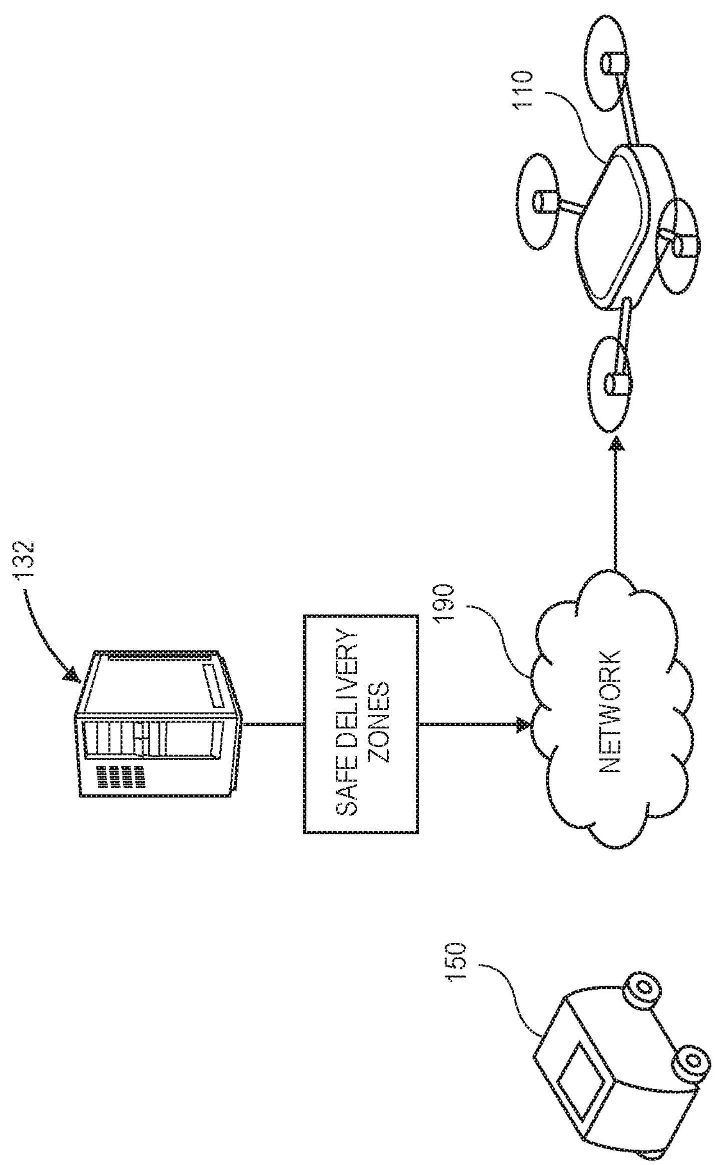

As is shown in FIG. 1I, information or data regarding the safe landing zones 135-1, 135-2 may be transmitted by the server 132 to the aerial vehicle 110 over the network 190. In some embodiments, the information or data may identify one of the safe landing zones 135-1, 135-2 as a primary or preferred landing zone, and another of the safe landing zones 135-1, 135-2 as a secondary or backup landing zone. In some embodiments, one or more processors aboard the autonomous ground vehicle 150 may select the safe landing zones 135-1, 135-2, and transmit information or data (e.g., geolocations) regarding the safe landing zones 135-1, 135-2 to the aerial vehicle 110 over the network 190, e.g., in a server-free manner. Alternatively, in some embodiments, the autonomous ground vehicle 150 may transmit the information or data regarding the ground conditions to the aerial vehicle 110 directly, and the aerial vehicle 110 may select the one or more safe landing zones based on the information or data.

Figure 1J:
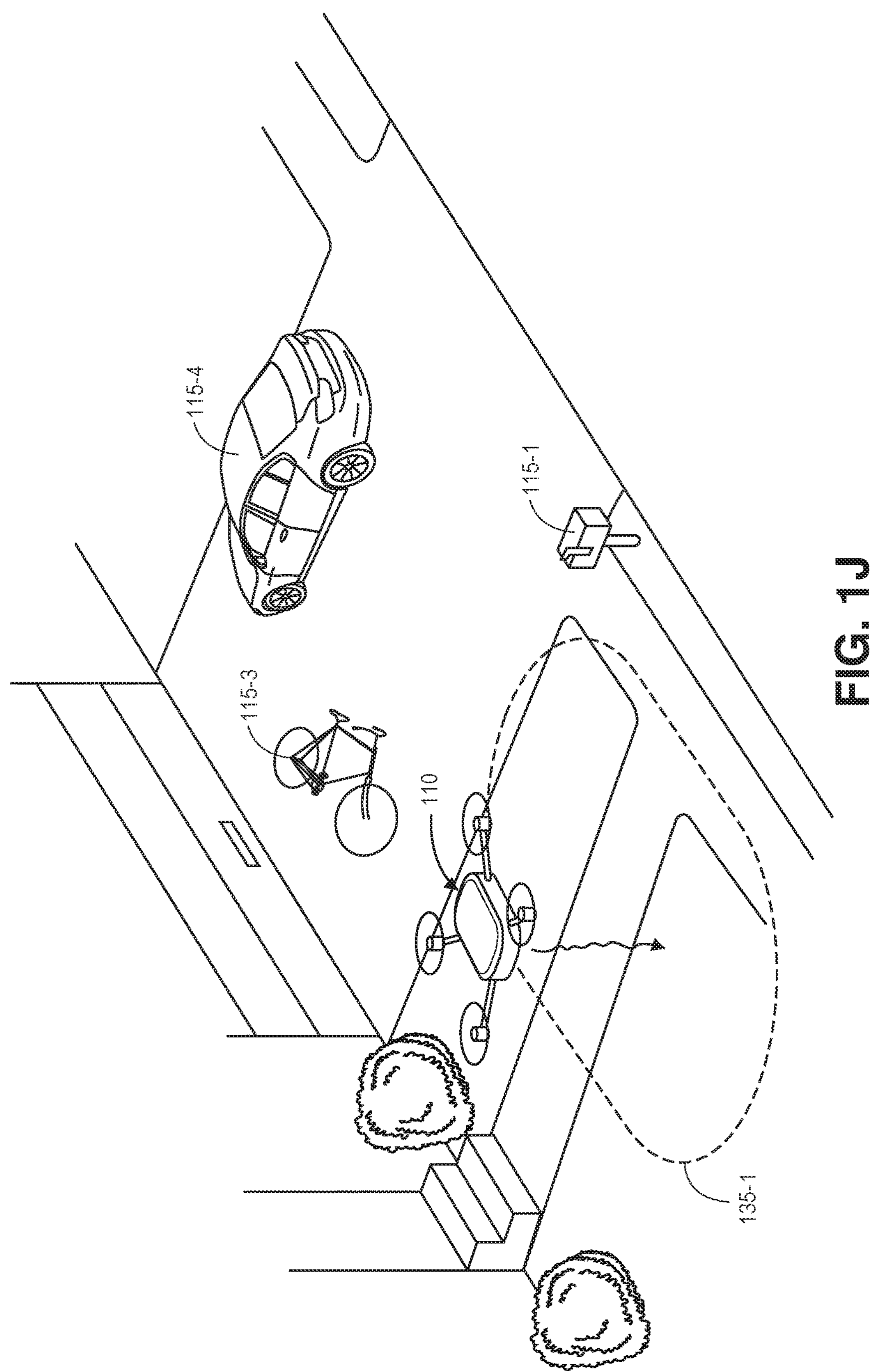

As is shown in FIG. 1J, the aerial vehicle 110 lands at the safe landing zone 135-1 to complete a delivery of the ordered item. Alternatively, in some embodiments, the aerial vehicle 110 may land on the autonomous ground vehicle 150, and transfer the ordered item to the autonomous ground vehicle 150.

Accordingly, the systems and methods of the present disclosure are directed to selecting delivery areas, e.g., for one or more vehicles or couriers, based at least in part on information or data captured using autonomous ground vehicles. For example, in some embodiments, an autonomous ground vehicle may be equipped with one or more sensors such as inclinometers, imaging devices or other sensors for determining information or data regarding ground conditions in a region or space that is associated with a home, a building or another structure or facility. Where a delivery is requested to the home, the building or the other structure or facility, or otherwise to the region or space, an autonomous ground vehicle may travel across grounds of the region or space to capture information or data regarding the conditions of the grounds, including slopes, surface textures, terrain features, weather conditions, moisture contents or the like. Based at least in part on the information or data, one or more areas for receiving a delivery of an item may be selected. In some embodiments, where the delivery is to be completed by an aerial vehicle, the aerial vehicle may land on grounds within a selected landing area. In some other embodiments, the aerial vehicle may land directly on an autonomous ground vehicle, which may be configured to direct itself to grounds at the selected landing area. Alternatively, an area may be selected for an aerial vehicle to retrieve one or more items therefrom, or to complete any other tasks or evolutions. Where the delivery is to be completed by a ground-based vehicle or a courier, the ground-based vehicle or the courier may travel to the selected area, e.g., by one or more optimal paths or routes, and deliver the item or complete any other tasks or evolutions.

Furthermore, in some embodiments, an autonomous ground vehicle may prepare a delivery area for an arrival of a delivery vehicle or courier. For example, an autonomous ground vehicle may be configured to apply one or more markings or other materials to ground surfaces at the delivery area, or to clear debris (e.g., natural or artificial debris, such as snow) or otherwise prepare the delivery area prior to the arrival of the aerial vehicle.

The autonomous ground vehicles of the present disclosure may be vehicles having any number of wheels mounted to axles that may be rotated by one or more motors, with dimensions, masses or other indicators of size that may be selected on any basis. For example, in some embodiments, the autonomous ground vehicles may be sized and configured to travel on roads, sidewalks, crosswalks, bicycle paths, trails or the like, as well as yards, parking lots, driveways, patios or other surfaces, at various times or during various levels of congestion, and at various speeds, e.g., in response to one or more computer-based instructions.

Additionally, autonomous ground vehicles of the present disclosure may include a cargo bay or other storage compartment, or multiple cargo bays or storage compartments, for maintaining items therein at any desired temperature, pressure or alignment or orientation, and to protect such items against the elements. Furthermore, in some embodiments, the autonomous ground vehicles may include various equipment or components for determining whether a cargo bay or other storage compartment is empty or includes one or more items, or for identifying specific items that are stored therein, along with equipment or components for engaging or interacting with such items. The autonomous ground vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous ground vehicles of the present disclosure may include any number of sensors such as position sensors (e.g., Global Positioning Satellite, or GPS, receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The autonomous ground vehicles of the present disclosure may also include communications equipment (e.g., wired or wireless means for communication such as components or systems operating Wireless Fidelity, or Wi-Fi, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous ground vehicle, e.g., in causing the autonomous ground vehicle to travel along one or more paths or routes, to search for alternate paths or routes, or to avoid expected or unexpected hazards encountered by the autonomous vehicle while traveling along such paths or routes. The autonomous ground vehicles of the present disclosure may further include any number of computer components (e.g., processors, data stores, transceivers or input/output devices) for performing any of the tasks or executing any of the functions described herein.

In still other embodiments, autonomous ground vehicles may be programmed or otherwise configured to automatically access one or more predetermined or specified locations, e.g., to automatically deliver an item to a given location or to retrieve items from the given location. For example, an autonomous ground vehicle may be programmed or instructed to automatically open a door or other entry point at a facility (e.g., a private dwelling or business location), to access a public garage or other parking or standing area, or to activate an indicator within a home, an office or another structure. An autonomous ground vehicle may be configured to transmit wireless codes, signals or other information to trigger a response from one or more devices or machines equipped with wireless transceivers, such as garage door openers, doorbells, lights, haptic feedback systems or other machines or devices. Alternatively, requests or instructions for granting access to locations on behalf of an autonomous vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous vehicle to obtain access to one or more structures at a given location.

Figure 2A:
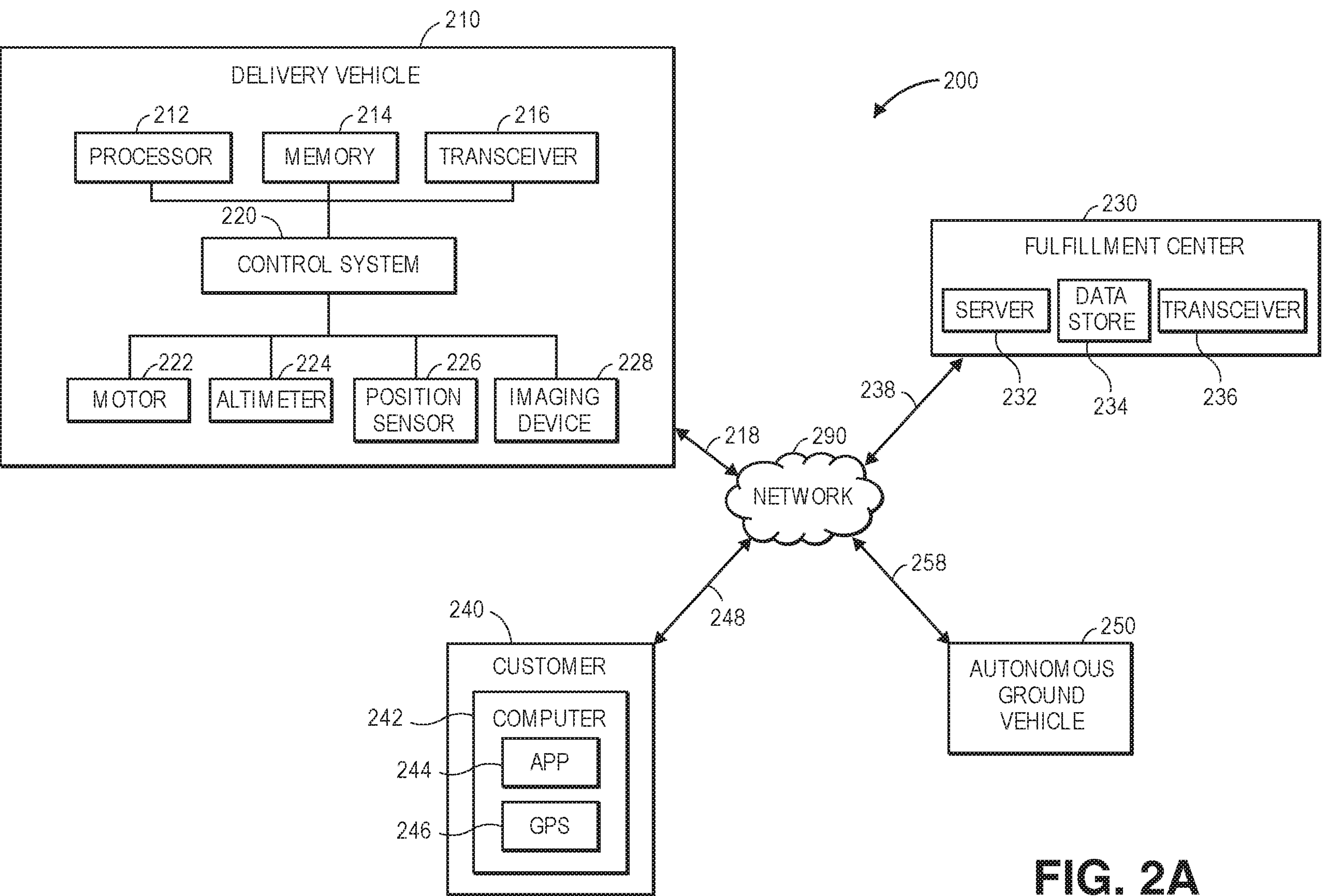
FIGS. 2A and 2B are block diagrams of components of one system for selecting delivery modes or delivery areas using autonomous ground vehicles in accordance with embodiments of the present disclosure.
Figure 2B:
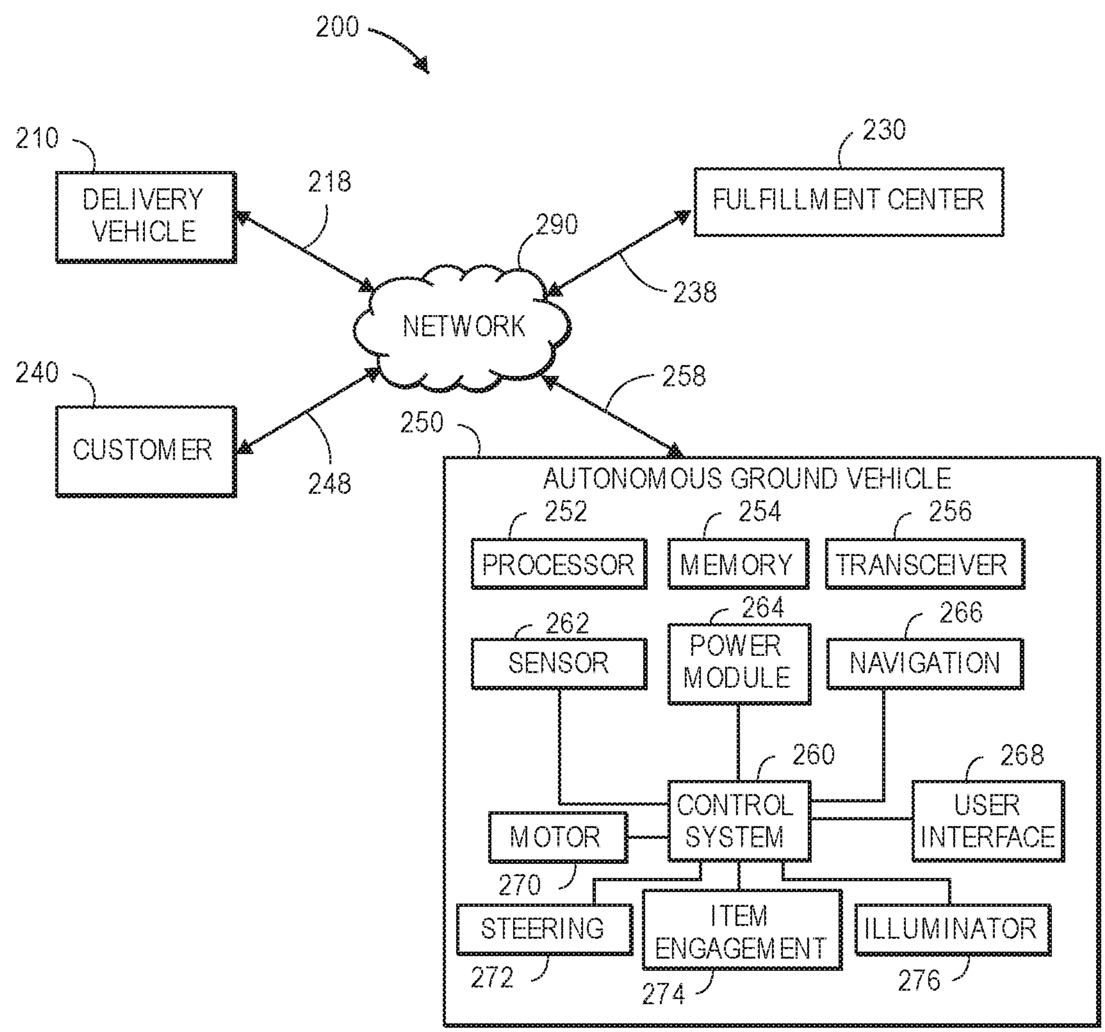

Referring to FIGS. 2A and 2B, a block diagram of components of one system 200 for selecting delivery modes or delivery areas using autonomous ground vehicles in accordance with embodiments of the present disclosure is shown. The system 200 includes a delivery vehicle 210, a fulfillment center 230, a customer 240 and an autonomous ground vehicle 250 that are connected to one another across a network 290, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1J.

The delivery vehicle 210 may be any type or form of vehicle that is configured to travel from one location to another location in order to execute one or more tasks or functions, such as a delivery of an item. For example, in some embodiments, the delivery vehicle 210 may be an aerial vehicle (e.g., a manned or unmanned aerial vehicle, such as a drone), an automobile such as a car, a truck, a van, a tractor, or any other type or form of vehicle, such as a hovercraft or another autonomous ground vehicle. The delivery vehicle 210 includes a processor 212, a memory 214 and a transceiver 216. The delivery vehicle 210 may further include a control system 220, a plurality of propulsion motors 222, an altimeter 224, a position sensor 226 and an imaging device 228.

The processor 212 may be configured to perform any type or form of computing function associated with the operation of the delivery vehicle 210, including but not limited to the execution of one or more algorithms or techniques (e.g., object detection or recognition algorithms or techniques) associated with one or more applications, purposes or functions, or to select at least one of a course, a speed or an altitude for the safe operation of the delivery vehicle 210. For example, the processor 212 may be configured to control any aspects of the operation of the delivery vehicle 210 and the one or more computer-based components thereon, including but not limited to the propulsion motors 222, the altimeter 224, the position sensor 226 and/or the imaging device 228. For example, the processor 212 may be configured to determine an optimal path or route between two locations for the execution of a given mission or task to be executed by the delivery vehicle 210, such as according to one or more traditional shortest path or shortest route algorithms such as Dijkstra's Algorithm, Bellman-Ford Algorithm, Floyd-Warshall Algorithm, Johnson's Algorithm or a hub labeling technique.

The processor 212 may also control the operation of one or more control systems or modules, such as the control system 220, for generating instructions for conducting operations of one or more of the propulsion motors 222, the altimeter 224, the position sensor 226 and/or the imaging device 228, or for interpreting information or data captured by one or more onboard sensors, e.g., the altimeter 224, the position sensor 226 and/or the imaging device 228, or others (not shown). Such control systems or modules may be associated with one or more other computing devices or machines, and may communicate with the fulfillment center 230, the customer 240, the autonomous ground vehicle 250, or one or more other computer devices or delivery vehicles (not shown) over the network 290, as indicated by line 218, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the delivery vehicle 210 further includes one or more memory or storage components 214 (such as databases or data stores) for storing any type of information or data, e.g., instructions for operating the delivery vehicle 210, or information or data captured during operations of the delivery vehicle 210. For example, the memory 214 may be configured to store information or data regarding positions where changes in slopes, surface textures, terrain features, weather conditions, moisture contents or other conditions are observed, amounts or extents of such changes, as well as operating data, imaging data or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, vehicle control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the delivery vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the delivery vehicle 210, or to one or more other computer devices or systems (e.g., other delivery vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the delivery vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate at desired speeds, to capture information or data regarding altitudes, positions and/or speeds, and to cause one or more of the imaging devices 228 to capture any imaging data (e.g., still or moving images) as well as any associated audio data and/or metadata. For example, the propulsion motors 222 may be configured to rotate propellers or axles, or to otherwise generate forces of thrust and/or lift, on the delivery vehicle 210. The control system 220 may further control any other aspects of the delivery vehicle 210, including but not limited to the operation of one or more control surfaces (not shown) such as wings, rudders, ailerons, elevators, flaps, brakes, slats or other features within desired ranges, or the engagement with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers, axles or other components to provide thrust and/or lift forces to the delivery vehicle 210 and any payload engaged thereby, in order to transport the engaged payload from one location to another location. In some embodiments, one or more of the propulsion motors 222 may be a brushless DC multi-phase motor such as an outrunner brushless motor or an inrunner brushless motor.

The delivery vehicle 210 may include any number of such propulsion motors 222 of any kind. For example, one or more of the propulsion motors 222 may be aligned or configured to provide forces of lift to the delivery vehicle 210, exclusively, while one or more of the propulsion motors 222 may be aligned or configured to provide forces of thrust to the delivery vehicle 210, exclusively. Alternatively, one or more of the propulsion motors 222 may be aligned or configured to provide forces of lift and forces of thrust to the delivery vehicle 210, as needed. For example, the propulsion motors 222 may be fixed in their orientation on the delivery vehicle 210, or configured to vary their respective orientations, e.g., a tilt-rotor aircraft. Moreover, the propulsion motors 222 may be aligned or configured to operate with different capacities or ratings, or at different speeds, or coupled to propellers or axles having different sizes and shapes. Additionally, one or more of the propulsion motors 222 may be an electric motor, e.g., a brushless DC multi-phase motor, and one or more of the propulsion motors 222 may be a gasoline-powered motor.

In some embodiments, one or more of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

In some embodiments, one or more of the propulsion motors 222 may be coupled to one or more axles, shafts and/or wheels for causing the delivery vehicle 210 and any items therein to travel in a desired direction and at a desired speed. In some embodiments, the delivery vehicle 210 may include one or more electric motors having any number of stators, poles and/or windings, such as an outrunner or an inrunner brushless direct current (DC) motor, or any other motors, having any speed rating, power rating or any other rating.

The altimeter 224 may be any device, component, system, or instrument for determining an altitude of the delivery vehicle 210, and may include any number of barometers, transmitters, receivers, range finders (e.g., laser or radar), imaging devices or other features for determining altitudes above ground.

The position sensor 226 may be any device, component, system or instrument adapted to receive signals (e.g., trilateration data or information) relating to a position of the delivery vehicle 210, from one or more GPS satellites of a GPS network, from one or more towers or beacons from a cellular telephone network, or from any other source (not shown). In some embodiments, the position sensor 226, or position data received thereby, may be used to determine a speed of the delivery vehicle 210 over time. In some other embodiments, the delivery vehicle 210 may include one or more devices, components, systems, or instruments for determining a speed or velocity of the delivery vehicle 210, and may include related components (not shown) such as pitot tubes, accelerometers, or other features.

The imaging device 228 may be any form of optical recording devices that may be aligned with respect to any expected or ordinary operating orientation of the delivery vehicle 210, and are configured to photograph or otherwise record imaging data of objects or any other elements within fields of view forward of, aft of, lateral to, above or below the delivery vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the delivery vehicle 210.

The imaging device 228 may be mounted, fixed, embedded or otherwise joined to one or more external surfaces of the delivery vehicle 210 in any manner and in any orientation or alignment to capture imaging data from above, below or alongside the delivery vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the delivery vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the fulfillment center 230, the customer 240 or the autonomous ground vehicle 250 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the delivery vehicle 210 may also include any number of other sensors, components or other features for controlling or aiding in the operation of the delivery vehicle 210, including but not limited to one or more environmental or operational sensors for determining one or more attributes of an environment in which the delivery vehicle 210 is operating, or may be expected to operate, including extrinsic information or data or intrinsic information or data. For example, the delivery vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box for a propulsion motor 222, a single box for an altimeter 224, a single box for a position sensor 226 and a single box for an imaging device 228, those of ordinary skill in the pertinent arts will recognize that any number or type of propulsion motors, altimeters, position sensors and/or imaging devices may be provided aboard the delivery vehicle 210 in accordance with the present disclosure. Moreover, in some embodiments, the delivery vehicle 210 may be a courier (e.g., a human or another animal) on foot or by one or more self-guided vehicles, such as a bicycle, a scooter, or a personal transporter. In such embodiments, the courier may carry, bear or otherwise utilize one or more computer devices or systems (e.g., a mobile device) having one or more of the features or capacities of the control system 220 described herein, or any of the other devices or systems described herein.

The fulfillment center 230 may be any facility that is adapted to receive, store, process and/or distribute items. As is shown in FIG. 2A, the fulfillment center 230 includes a server 232, a data store 234, and a transceiver 236. The fulfillment center 230 also includes stations for receiving, storing and distributing items to customers.

The server 232 and/or the data store 234 may operate one or more order processing and/or communication systems and/or software applications having one or more user interfaces, or communicate with one or more other computing devices or machines that may be connected to the network 290, as indicated by line 238, for transmitting or receiving information in the form of digital or analog data, or for any other purpose. For example, the server 232 and/or the data store 234 may also operate or provide access to one or more reporting systems for receiving or displaying information or data regarding orders for items received from one or more customers, and may provide one or more interfaces for receiving interactions (e.g., text, numeric entries or selections) from one or more operators, users, workers or other persons in response to such information or data. The server 232, the data store 234 and/or the transceiver 236 may be components of a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding workflow operations, or the interactions received from the one or more operators, users, workers or persons.

For example, the server 232 and/or the data store 234 may be configured to determine an optimal path or route between two locations for the execution of a given mission or task to be executed by the delivery vehicle 210, such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the data store 234 may be configured to control or direct, or to recommend or suggest, collaboration between or among one or more of the delivery vehicle 210, the customer 240 and/or the autonomous mobile vehicle 250, in the performance of one or more tasks or in the execution of one or more functions. For example, the server 232 and/or the data store 234 may identify appropriate locations or rendezvous points where one or more humans, vehicles or other machines, e.g., the delivery vehicle 210, the customer 240 and/or the autonomous mobile vehicle 250, may meet in order to transfer inventory or materials therebetween, or for any other purpose.

The transceiver 236 may be configured to enable the fulfillment center 230 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 236 may include one or more of the properties or features of the transceiver 216 described herein, or any other properties or features.

The fulfillment center 230 may further include one or more control systems that may generate instructions for conducting operations at one or more receiving stations, storage areas and/or distribution stations. Such control systems may be associated with the server 232, the data store 234 and/or the transceiver 236, or with one or more other computing devices or machines, and may communicate by any known wired or wireless means, or with the delivery vehicle 210, the customer 240 or the autonomous mobile robot 250 over the network 290, as indicated by line 238, through the sending and receiving of digital data.

Additionally, the fulfillment center 230 may include one or more systems or devices (not shown in FIG. 2A or FIG. 2B) for locating or identifying one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the fulfillment center 230, e.g., for delivery to a selected destination by the delivery vehicle 210 or by any other means. The customer 240 may utilize one or more computing devices 242 (e.g., a smartphone, a tablet computer, a laptop computer, a desktop computer, a smart speaker, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the delivery vehicle 210, the fulfillment center 230 or the autonomous ground vehicle 250 through the network 290, as indicated by line 248, by the transmission and receipt of digital data.

The autonomous ground vehicle 250 may be any type or form of self-powered vehicle capable of being programmed or otherwise configured for autonomous travel between two points of along one or more paths or routes, in the performance of one or more missions or tasks, based on one or more computer instructions. For example, one or more of the autonomous ground vehicle 250 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths our routes may, in some embodiments, include one or more common locations or rendezvous points where an item or materials may be transferred between or among the autonomous ground vehicle 250, or one or more humans, machines or other vehicles.

As is shown in FIG. 2B, the autonomous ground vehicle 250 may include one or more computer components such as a processor 252, a memory 254 and a transceiver 256 in communication with one or more other computer devices that may be connected to the network 290, as indicated by line 258, in order to transmit or receive information in the form of digital or analog data, or for any other purpose. For example, the autonomous ground vehicle 250 may receive instructions or other information or data via the transceiver 256 regarding an item that is to be delivered from the fulfillment center 230 to the customer 240 via the delivery vehicle 210 from the processor 212, the server 232 and/or the computer 242, or from any other computing device over the network 290. The transceiver 256 may be configured to enable the autonomous ground vehicle 250 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 256 may include one or more of the properties or features of the transceiver 216 or the transceiver 236 described herein, or any other properties or features.

As is shown in FIG. 2B, the autonomous ground vehicle 250 also includes one or more control systems 260, as well as one or more sensors 262, one or more power modules 264, one or more navigation modules 266, and one or more user interfaces 268. As is also shown in FIG. 2B, the autonomous ground vehicle 250 further includes one or more control systems 260, as well as one or more sensors 262, one or more power modules 264, one or more navigation modules 266, and one or more user interfaces 268. Additionally, the autonomous ground vehicle 250 further includes one or more motors 270, one or more steering systems 272, one or more item engagement systems (or devices) 274 and one or more illuminators 276 (or other feedback devices).

The autonomous ground vehicle 250 may be any type or form of vehicle. For example, in some embodiments, one or more of the tasks or functions described herein as being performed by an autonomous ground vehicle may be performed by a ground vehicle that is outfitted with one or more of the sensors 262 described herein and is manned or otherwise operated manually, such as a lawn mower (e.g., a "walk-behind" lawn mower, or a "riding" lawn mower) or a remote-controlled car. Alternatively, the autonomous ground vehicle 250 may be a hovercraft, or any other vehicle or craft configured for travel over land or water surfaces, e.g., at low altitudes.

The control system 260 may include one or more software applications or hardware components configured for controlling or monitoring operations of one or more components such as the sensor 262, the power module 264, the navigation module 266, or the user interfaces 268, as well as the motors 270, the steering systems 272, the item engagement systems 274 and the illuminators 276, e.g., by receiving, generating, storing and/or transmitting one or more computer instructions to such components. The control system 260 may communicate with the delivery vehicle 210, the fulfillment center 230 and/or the customer 240 over the network 290, as indicated by line 258, through the sending and receiving of digital data.

The sensor 262 may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous ground vehicle 250. Geolocations of the sensor 262 may be associated with the autonomous ground vehicle 250, where appropriate.

The sensor 262 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous ground vehicle 250, or for any other purpose. For example, the sensor 262 may be configured to capture or detect reflected light if the reflected light is within a field of view of the sensor 262, which is defined as a function of a distance between an imaging sensor and a lens within the sensor 262, viz., a focal length, as well as a position of the sensor 262 and an angular orientation of the lens. Accordingly, where an object appears within a depth of field, or a distance within the field of view where the clarity and focus is sufficiently sharp, the sensor 262 may capture light that is reflected off objects of any kind to a sufficiently high degree of resolution using one or more sensors thereof, and store information regarding the reflected light in one or more data files.

The sensor 262 may also include manual or automatic features for modifying a field of view or orientation. For example, the sensor 262 may be a digital camera configured in a fixed position, or with a fixed focal length (e.g., fixed-focus lenses) or angular orientation. Alternatively, the sensor 262 may include one or more actuated or motorized features for adjusting a position of the sensor 262, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262, or a change in one or more of the angles defining the angular orientation of the sensor 262.

For example, the sensor 262 may be an imaging device that is hard-mounted to a support or mounting that maintains the imaging device in a fixed configuration or angle with respect to one, two or three axes. Alternatively, however, the sensor 262 may be provided with one or more motors and/or controllers for manually or automatically operating one or more of the components, or for reorienting the axis or direction of the sensor 262, i.e., by panning or tilting the sensor 262. Panning the sensor 262 may cause a rotation within a horizontal plane or about a vertical axis (e.g., a yaw), while tilting the sensor 262 may cause a rotation within a vertical plane or about a horizontal axis (e.g., a pitch). Additionally, the sensor 262 may be rolled, or rotated about its axis of rotation, and within a plane that is perpendicular to the axis of rotation and substantially parallel to a field of view of the sensor 262.

Imaging data (e.g., still or moving images, as well as associated audio data or metadata) captured using the sensor 262 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262 may further be one or more compasses, speedometers, altimeters, inclinometers, thermometers, barometers, hygrometers, gyroscopes, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), accelerometers, ranging sensors (e.g., radar, sonar or LIDAR ranging sensors) or sound sensors (e.g., microphones, piezoelectric sensors, vibration sensors or other transducers for detecting and recording acoustic energy from one or more directions).

The sensor 262 may be further configured to capture, record and/or analyze information or data regarding its positions, velocities, accelerations or orientations of the autonomous ground vehicle 250, and to analyze such data or information by one or more means, e.g., by aggregating or summing such data or information to form one or more qualitative or quantitative metrics of the movement of the sensor 262. For example, a net vector indicative of any and all relevant movements of the autonomous ground vehicle 250, including but not limited to physical positions, velocities, accelerations or orientations of the sensor 262, may be derived. Additionally, coefficients or scalars indicative of the relative movements of the autonomous ground vehicle 250 may also be defined.

Although the sensor 262 is shown as intrinsic to or onboard the autonomous ground vehicle 250, the autonomous ground vehicle 250 may utilize one or more sensors that are external to the autonomous ground vehicle 250 in the capture of information or data, or rely on information or data captured using such sensors, in accordance with the present disclosure. For example, the autonomous ground vehicle 250 may receive information or data regarding ground conditions at a location that was captured by one or more sensors at the location. Such external sensors may have any or all of the features or characteristics of the sensors 262 disclosed herein.

The power module 264 may be any type of power source for providing electrical power, mechanical power or other forms of power in support of one or more electrical or mechanical loads aboard the autonomous ground vehicle 250. In some embodiments, the power module 264 may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264 may each have any cell voltages, peak load currents, charge times, specific energies, internal resistances or cycle lives, or other power ratings. The power module 264 may also be any type, size or form of other power source, e.g., other than a battery, including but not limited to one or more fuel cells, turbines, solar cells or nuclear reactors. Alternatively, the power module 264 may be another form of prime mover (e.g., electric, gasoline-powered or any other type of motor) capable of generating sufficient mechanical forces for the autonomous ground vehicle 250.

The navigation module 266 may include one or more software applications or hardware components including or having access to information or data regarding aspects of transportation systems within a given region or space, including the locations, dimensions, capacities, conditions, statuses or other attributes of various paths or routes in the region or space. For example, the navigation module 266 may receive inputs from the sensor 262, e.g., from a GPS receiver, an imaging device or another sensor, and determine an optimal direction and/or an optimal speed of the autonomous ground vehicle 250 for travelling on a given path or route based on such inputs. The navigation module 266 may select a path or route to be traveled upon by the autonomous ground vehicle 250, and may provide information or data regarding the selected path or route to the control system 260.

The user interface 268 may be configured to receive and provide information to human users of the autonomous ground vehicle 250 and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous ground vehicle 250 and a human user. In various embodiments, the user interface 268 may include a variety of different features. For example, in one embodiment, the user interface 268 may include a relatively small display and/or a keypad for receiving inputs from human users. In other embodiments, inputs for controlling the operation of the autonomous ground vehicle 250 may be provided remotely. For example, in order to access a storage compartment, a human user may send a text message to or reply to a text message from the control system 260 and request that a door or other access portal be opened in order to enable the user to access an item therein. In various implementations, the autonomous ground vehicle 250 may have capabilities for directly receiving such signals from a user device or other device (e.g., a device inside a user's residence) that provides a signal to open the storage compartment door.

The motor 270 may be any type or form of motor or engine (e.g., electric, gasoline-powered or any other type of motor) that is capable of providing sufficient rotational forces to one or more axles, shafts and/or wheels for causing the autonomous ground vehicle 250 and any items therein to travel in a desired direction and at a desired speed. In some embodiments, the autonomous ground vehicle 250 may include one or more electric motors having any number of stators, poles and/or windings, such as an outrunner or an inrunner brushless direct current (DC) motor, or any other motors, having any speed rating, power rating or any other rating.

The steering system 272 may be any system for controlling a direction of travel of the autonomous ground vehicle 250. The steering system 272 may include any number of automatically operable gears (e.g., racks and pinions), gear boxes, shafts, shaft assemblies, joints, servos, hydraulic cylinders, linkages or other features for repositioning one or more wheels to cause the autonomous ground vehicle 250 to travel in a desired direction.

The item engagement system 274 may be any mechanical component, e.g., a robotic arm, for engaging an item or for disengaging the item, as desired. For example, when the autonomous ground vehicle 250 is tasked with delivering items or materials from an origin to a destination, the item engagement system 274 may be used to engage the items or materials at the origin and to deposit the items or materials in a cargo bay or other storage compartment prior to departing. After the autonomous ground vehicle 250 arrives at the destination, the item engagement system 274 may be used to retrieve the items or materials within the cargo bay or storage compartment, and deposit the items or materials in a desired location at the destination.

In some embodiments, the autonomous ground vehicle 250 may be programmed or configured to perform one or more missions or tasks in an integrated manner. For example, the control system 260 may be programmed to instruct the autonomous ground vehicle 250 to travel to an origin, e.g., the fulfillment center 230, and to begin the performance of a task there, such as by retrieving an item at the origin using the item engagement system 274, before proceeding to a destination, e.g., the customer 240, along a selected route (e.g., an optimal route). Along the way, the control system 260 may cause the motor 270 to operate at any predetermined speed and cause the steering system 272 to orient the autonomous ground vehicle 250 in a predetermined direction or otherwise as necessary to travel along the selected route, e.g., based on information or data received from or stored in the navigation module 266. The control system 260 may further cause the sensor 262 to capture information or data (including but not limited to imaging data) regarding the autonomous ground vehicle 250 and/or its surroundings along the selected route. The control system 260 or one or more other components of the autonomous ground vehicle 250 may be programmed or configured as necessary in order to execute any actions associated with a given task, in accordance with the present disclosure.

The illuminator 276 may be any light or light source that is configured to project light in one or more directions. For example, in some embodiments, the illuminator 276 may be one or more light-emitting diodes (or "LED"), liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. Alternatively, or in addition to the illuminator 276, the autonomous ground vehicle 250 may include one or more other feedback devices, including but not limited to components such as audio speakers or other physical components that may be automatically controlled or configured to generate audible messages, signals or sounds, or one or more haptic vibrating elements that may be automatically controlled or configured to generate tactile vibrations of any frequency or intensity.

Any combination of networks or communications protocols may be utilized in accordance with the systems and methods of the present disclosure. For example, each of the autonomous ground vehicle 250 may be configured to communicate with one another or with the processor 212, the server 232 and/or the computer 242 via the network 290, such as is shown in FIGS. 2A and 2B, e.g., via an open or standard protocol such as Wi-Fi. Alternatively, each of the autonomous ground vehicle 250 may be configured to communicate with one another directly outside of a centralized network, such as the network 290, e.g., by a wireless protocol such as Bluetooth, in which two or more of the autonomous ground vehicle 250 may be paired with one another.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "delivery vehicle," a "fulfillment center," a "customer," an "autonomous ground vehicle" (or "autonomous vehicle"), or like terms, may be automated steps performed by their respective computer systems, or implemented within software modules (or computer programs) executed by one or more general purpose computers. Moreover, process steps described as being performed by a "delivery vehicle," a "fulfillment center," a "customer," or an "autonomous vehicle" may be typically performed by a human operator, but could, alternatively, be performed by an automated agent.

The delivery vehicle 210, the fulfillment center 230, the customer 240, or the autonomous ground vehicle 250 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the fulfillment center 230 and/or the server 232 may be adapted to transmit information or data in the form of synchronous or asynchronous messages to the delivery vehicle 210 and/or the processor 212, the customer 240 and/or the computer 242, the autonomous ground vehicle 250 and/or the control system 260, or any other computer device in real time or in near-real time, or in one or more offline processes, via the network 290. Those of ordinary skill in the pertinent art would recognize that the delivery vehicle 210, the fulfillment center 230, the customer 240, or the autonomous ground vehicle 250 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, the computer 242, the processors 252 or any other computers or control systems utilized by the delivery vehicle 210, the fulfillment center 230, the customer 240, or the autonomous ground vehicle 250, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
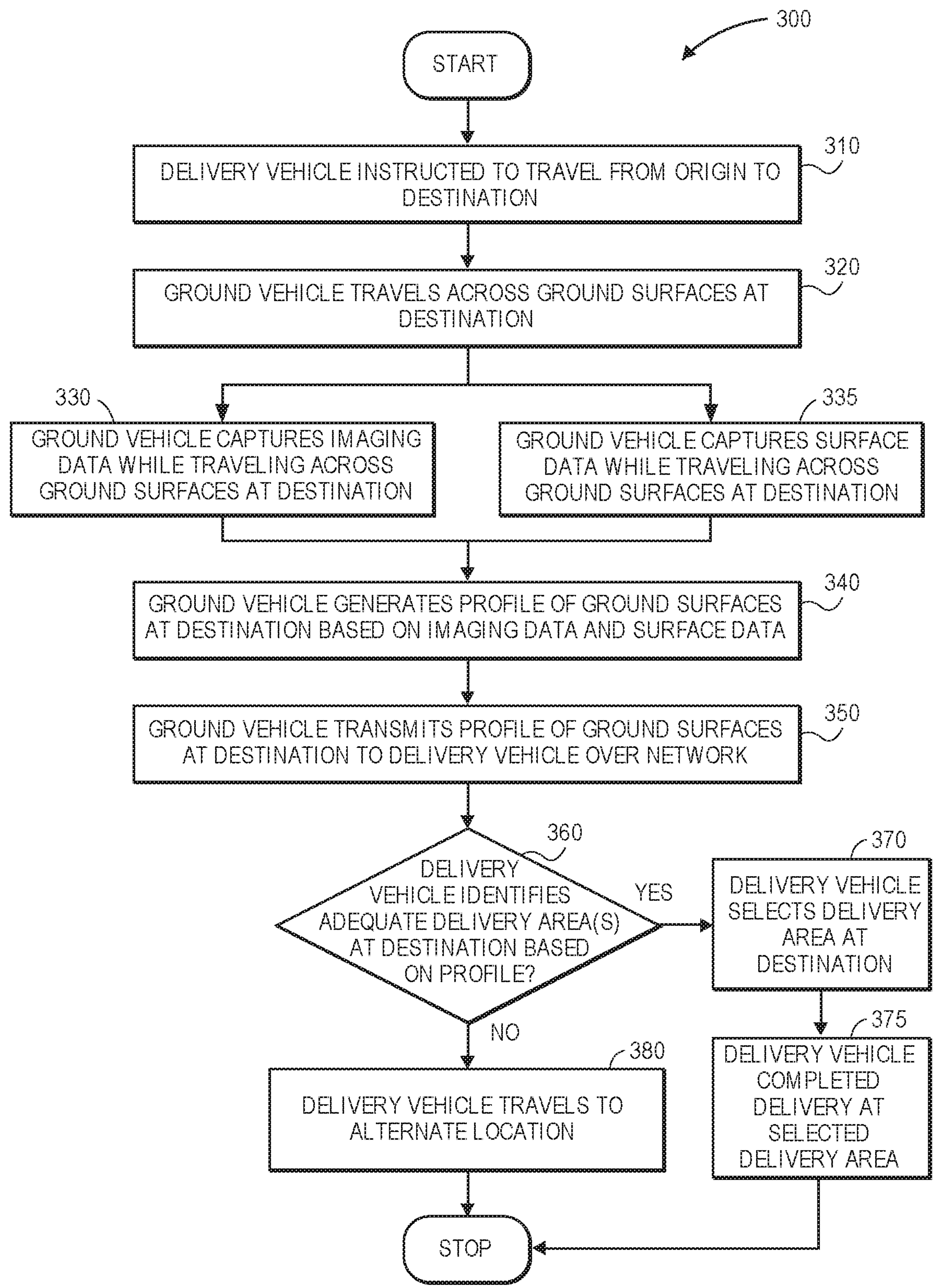
FIG. 3 is a flow chart of one process for selecting delivery modes or delivery areas using autonomous ground vehicles in accordance with embodiments of the present disclosure.

Referring to FIG. 3, a flow chart 300 of one process for selecting delivery modes or delivery areas using autonomous ground vehicles in accordance with embodiments of the present disclosure is shown. At box 310, a delivery vehicle is instructed to travel from an origin to a destination. For example, the delivery vehicle may be an aerial vehicle or an automobile or other ground-based vehicle that is configured to deliver one or more items to the destination, to conduct monitoring or surveillance operations at the destination, or to perform any other tasks or functions within a vicinity of the destination, or along a route between the origin and the destination. Alternatively, the delivery vehicle may be a courier that is instructed to travel from the origin to the destination.

At box 320, a ground vehicle travels across ground surfaces at the destination. The ground vehicle may travel along the ground surfaces in one or more regular or irregular patterns or directions, and at constant or varying velocities, in a region or space that includes the destination. In some embodiments, the region or space may include one or more homes or other structures, and the ground surfaces may be yards, patios, driveways, sidewalks, walkways, streets or other surfaces within a vicinity of the one or more homes or other structures. In some embodiments, the ground surfaces may be privately owned lands associated with such homes or structures, including but not limited to lands owned in common with such homes or structures, or otherwise owned or associated with the homes or structures, e.g., by one or more neighborhood or condominium associations. Alternatively, the ground surfaces may be publicly owned land, or land that is owned or controlled by one or more private owners not associated with the homes or structures, and for which permission for the ground vehicle to travel and for the delivery vehicle to land, park or otherwise stand has been granted or otherwise obtained. In accordance with the present disclosure, the ground surfaces need not be associated with a home or other dwelling, and need not be adjacent to or otherwise affiliated with one or more structures. Moreover, in some embodiments, the ground vehicle may be an autonomous ground vehicle, or any other ground vehicle that is manned or otherwise operated manually, such as a lawn mower (e.g., a "walk-behind" lawn mower, or a "riding" lawn mower) or a remote-controlled car.

At box 330, the ground vehicle captures imaging data while traveling across the ground surfaces at the destination. In some embodiments, the imaging data may include visual imaging data, e.g., color, grayscale or black-and-white images, or depth imaging data, e.g., ranges or distances to objects, that may be captured using imaging devices provided aboard the ground vehicle and having fields of view aligned at any orientation with respect to a direction of travel of the ground vehicle. In parallel, at box 335, the ground vehicle also captures surface data while traveling across the ground surfaces at the destination. The surface data may include angles of inclination, data regarding surface terrain (e.g., composition, moisture, or the like), or any other data that may be captured using one or more sensors aboard the ground vehicle.

At box 340, the ground vehicle generates a profile of the ground surfaces at the destination based on the imaging data and the surface data. The profile may include a contour map, locations of one or more obstructions, hazards or other objects, or any other information or data. At box 350, the ground vehicle transmits the profile of the ground surfaces at the destination to the delivery vehicle over one or more networks, e.g., wireless networks operating according to one or more Wireless Fidelity, or Wi-Fi, Bluetooth, near-field communications or cellular technologies or protocols. Alternatively, the ground vehicle may transmit the imaging data, the surface data and/or the profile or any other information or data to one or more servers or other machines. For example, the ground vehicle may transmit the imaging data and the surface data to a physical or virtual server, which may process the imaging data and the surface data to generate the profile of the ground surfaces.

At box 360, whether the delivery vehicle identifies one or more adequate delivery areas at the destination based on the profile is determined. For example, one or more computer processors aboard the delivery vehicle may evaluate the ground surfaces within a region or space at the destination based on the profile with respect to one or more operating conditions or constraints of the delivery vehicle, e.g., dimensions (such as a maximum length, width or height of the delivery vehicle, or an area or footprint occupied by the delivery vehicle), masses, traveling speeds, minimum turn radii, acoustic emissions, speeds of rotating parts, minimum levels of visibility or masses of the delivery vehicle, or other parameters of the delivery vehicle, and determine whether an area that may accommodate the delivery vehicle during the operation subject to such conditions or constraints is available at the destination. In some embodiments, the delivery vehicle may consider other information or data, including but not limited to information or data such as weather forecasts or indications of scheduled activity at the destination and may be obtained from one or more extrinsic systems, in determining whether an adequate delivery area exists at the destination. Alternatively, whether an adequate delivery area exists may be determined by one or more physical or virtual servers, or other computer devices or machines, based on information or data captured at least in part by the ground vehicle.

If one or more adequate delivery areas exists at the destination, then the process advances to box 370, where the delivery vehicle selects a delivery area at the destination. For example, where a single delivery area is identified in a region or space at the destination, the delivery vehicle selects the single delivery area. Alternatively, where multiple delivery areas are identified at the destination, then the delivery vehicle may select one of the delivery areas, e.g., a primary or optimal delivery area, on any basis. For example, one of the delivery areas having a largest safety margin or distance to a nearest obstacle, a delivery area having a smallest or flattest slope, or a delivery area that is closest to an entryway to a home or other dwelling at the destination may be selected for the delivery. At box 375, the delivery vehicle completes a delivery at the selected delivery area, and the process ends. Alternatively, a vehicle may perform any task or evolution, in addition to or other than a delivery, at an area that is selected based at least in part on information or data captured by one or more sensors aboard the ground vehicle.

Alternatively, if no adequate delivery areas are identified at the destination, then the process advances to box 380, where the delivery vehicle returns to the origin or, alternatively, to another destination, and the process ends.

Figure 4:
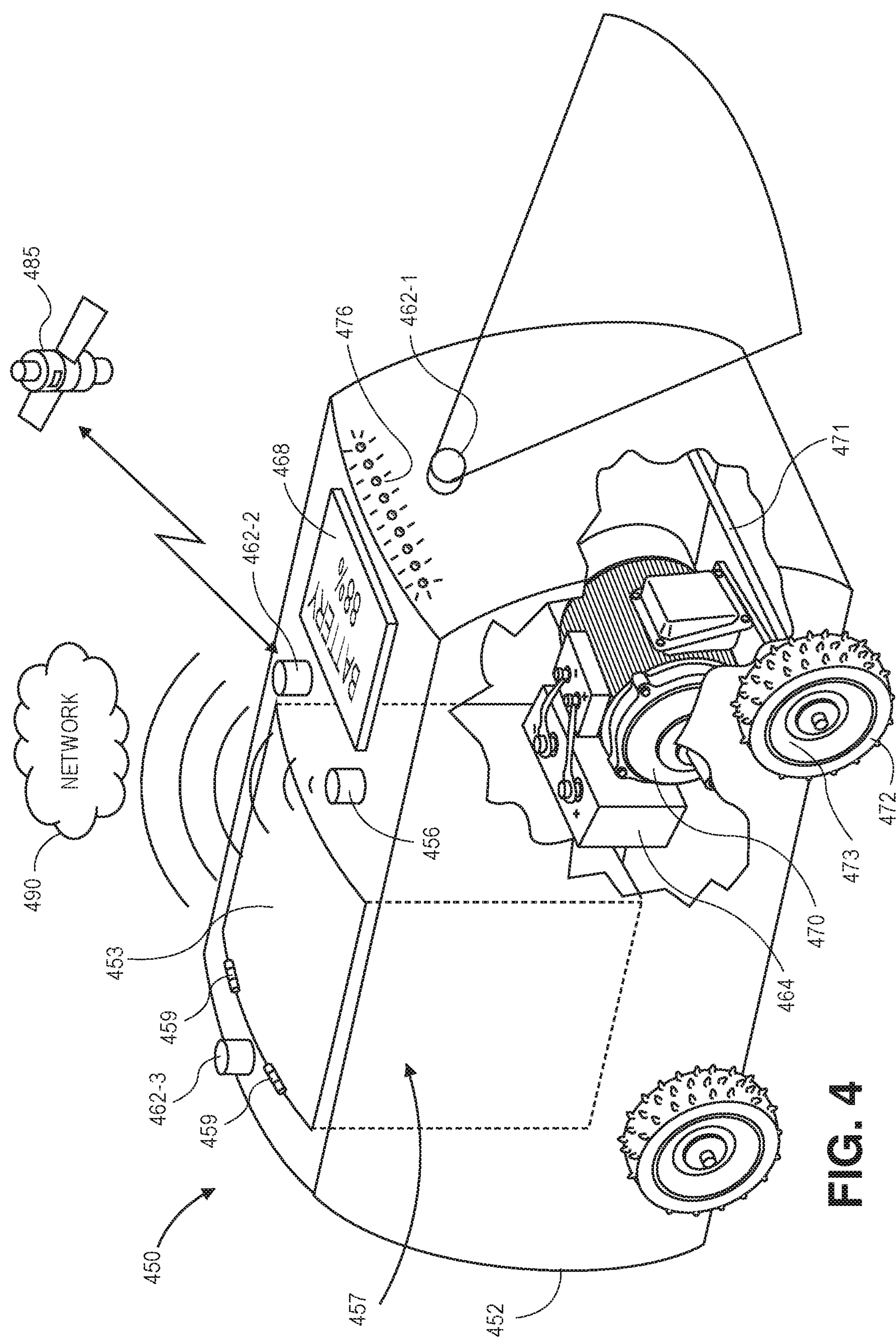
FIG. 4 is a view of one autonomous ground vehicle for selecting delivery modes or delivery areas using autonomous ground vehicles in accordance with embodiments of the present disclosure.

Referring to FIG. 4, a view of one autonomous ground vehicle 450 for selecting delivery areas or delivery modes in accordance with embodiments of the present disclosure is shown. Except where otherwise noted, reference numerals preceded by the number "4" in FIG. 4 refer to elements that are similar to elements having reference numerals preceded by the number "2" in FIG. 2A or FIG. 2B or by the number "1" shown in FIGS. 1A through 1J.

As is shown in FIG. 4, the autonomous ground vehicle 450 includes a frame 452, a storage compartment 457, a pair of axles 471 and a plurality of wheels 473 joined to the axles 471. A front surface of the frame 452 includes an imaging device 462-1 having a field of view aligned in a forward direction or orientation with respect to the autonomous ground vehicle 450 and an array of lights 476. In some embodiments, the autonomous ground vehicle 450 may include any number of imaging devices 462-1, with fields of view that may be permanently or adjustably aligned in any direction or orientation with respect to the autonomous ground vehicle 450. In some embodiments, the autonomous ground vehicle 450 may include any number of lights 476, on any surface thereof, and one or more of the lights 476 may include one or more LEDs, bulbs or other light sources. Alternatively, the autonomous ground vehicle 450 may include one or more other feedback devices, e.g., audible or haptic feedback devices.

An upper surface of the frame 452 includes a door 453 providing access to the storage compartment 457 is rotatably connected by a pair of hinges 459. The door 453 may include any number of manual or automatic features for causing the opening or closing thereof, and may include any suitable dimensions with respect to the dimensions of the storage compartment 457. In some embodiments, the autonomous ground vehicle 450 may include doors 453 on any surface thereof, and any number of storage compartments 457 of any size or shape. The upper surface of the frame 452 further includes a transceiver 456, as well as a GPS receiver 462-2, which may receive geolocation data from or transmit geolocation data to a GPS network 485. In some embodiments, the transceiver 456 may include a Wi-Fi transmitter and/or receiver for communicating with a network 490, which may include the Internet in whole or in part, as well as any other transmitters and/or receivers for communicating in any other manner or fashion, or according to any other protocols. In some embodiments, the transceiver 456 may be configured to transmit and/or receive one or more codes or other information or data in one or more radio frequency (or "RF") waves or signals, at any frequencies or power levels. In some embodiments, the transceiver 456 may be configured to transmit and/or receive radio frequency identification (or "RFID") signals, near-field communication (or "NFC") signals, Bluetooth® signals, or any other type of wireless signals.

Additionally, the upper surface of the frame 452 further includes an inclinometer 462-3, which may be configured to determine angles of slope, elevation or depression of the autonomous ground vehicle 450 about one, two or three principal axes, e.g., a roll axis (or x-axis), a pitch axis (or y-axis) or a yaw axis (or z-axis). The upper surface of the frame 452 also includes a user interface 468 which may receive manual interactions from a human user, or display information to the human user, as appropriate. For example, the user interface 468 may be a touchscreen display. In some embodiments, the transceiver 456, the GPS receiver 462-2, the inclinometer 462-3 and/or the user interface 468 may be provided on any other surface of the frame 452.

As is shown in FIG. 4, the autonomous ground vehicle 450 may include a power module 464 (e.g., a battery), a motor 470 (e.g., a DC electric motor operating at twelve to forty-eight volts) and a steering component 472 (e.g., one or more racks or pinions for automatically changing a direction of travel of the autonomous ground vehicle 450 and/or an orientation of one or more of the axles 471 or the wheels 473. The motor 470 may be configured to operate at any speed or have any power rating, and to cause the autonomous ground vehicle 450 to travel in a forward direction of travel, a reverse direction of travel or in any other direction of travel as determined by the steering component 472. Additionally, the axles 471 and wheels 473 of the autonomous ground vehicle 450 may also have any dimension. For example, the wheels 473 may have bores or axle pads for accommodating axles 471 of any diameter or thickness, and any number of spokes or other extensions for supporting a rim having any desired spacings or offsets for accommodating tires or other coverings. Each of the axles 471 may be joined to and configured to rotate any number of wheels 473, which may include tires or other coverings of any suitable material, including but not limited to rubbers and/or plastics. The wheels 473 or tires thereon may feature any number of belts, walls, treads or other components, and may be pneumatic or solid, or take any other form. In some embodiments, the wheels 473 may be omnidirectional wheels.

According to some embodiments, autonomous vehicles of the present disclosure, such as the autonomous ground vehicle 450 of FIG. 4, may be configured for travel throughout an area or environment, such as travel on traditional transportation and non-traditional transportation infrastructure provided within the area or environment. The autonomous ground vehicle 450 may select a path or route based on geospatial data regarding physical features in an area or environment, including but not limited to topographical data regarding the composition and surface features within the area or environment, as well as elevations of points within the area or environment, which may be identified or determined from satellite or ground-based imagery, GIS data, or any other information or data obtained from any other source. Similarly, where an area or environment includes transportation infrastructure such as roads, sidewalks, crosswalks, bicycle or walking paths, bridges or trails, and also non-traditional transportation infrastructure, e.g., parks, fields, forests, lots, clearings or other spaces, the autonomous vehicle 450 may be configured for travel thereon along one or more paths or routes, which may be selected or defined based on attributes of the transportation infrastructure and other physical features within the area or environment, as well as attributes of prior travel through the area or environment. Information or data regarding prior travel that may be used to select or define a path or route within an area or environment includes, but is not limited to, one or more time stamps (e.g., times and positions of autonomous vehicles within the given area at such times), elapsed times between departures and arrivals, net speeds, courses, angles of orientation (e.g., a yaw, a pitch or a roll), levels of traffic congestion, sizes or dimensions of any payloads carried, environmental conditions or any other information or data that describes or represents instances of prior travel by autonomous vehicles within the area or environment.

As is discussed above, information or data captured regarding conditions of grounds in a region or space may be captured using sensors aboard an autonomous ground vehicle. The autonomous ground vehicle may be configured to patrol, survey or otherwise evaluate the grounds at random times, on a regular basis, or as needed, e.g., in response to one or more requests for deliveries to the region or space. Referring to FIGS. 5A through 5G, views of aspects of one system 500 for selecting delivery modes or delivery areas using autonomous ground vehicles in accordance with embodiments of the present disclosure is shown. Except where otherwise noted, reference numerals preceded by the number "5" in FIGS. 5A through 5G refer to elements that are similar to elements having reference numerals preceded by the number "4" in FIG. 4, by the number "2" in FIG. 2A or FIG. 2B or by the number "1" shown in FIGS. 1A through 1J.

Figure 5A:
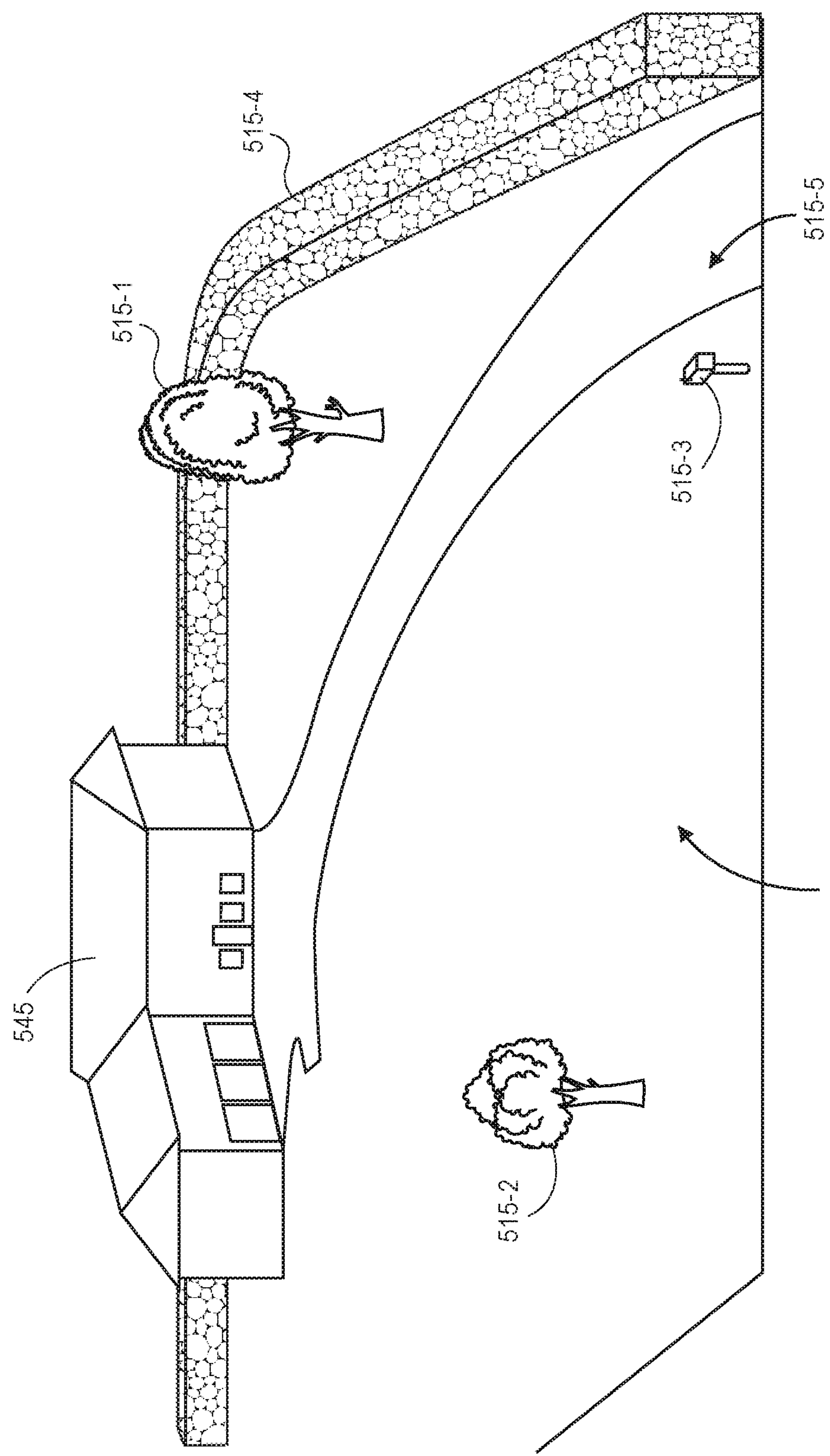
FIGS. 5A through 5G are views of aspects of one system for selecting delivery modes or delivery areas using autonomous ground vehicles in accordance with embodiments of the present disclosure.

As is shown in FIG. 5A, a home 545 is surrounded by grounds 555 having a number of physical features, including but not limited to a pair of trees 515-1, 515-2, a mailbox 515-3, a stone wall 515-4 provided along some of the boundaries of the grounds 555, as well as a driveway 515-5 leading from one street to the home 545 across the grounds 555.

Figure 5B:
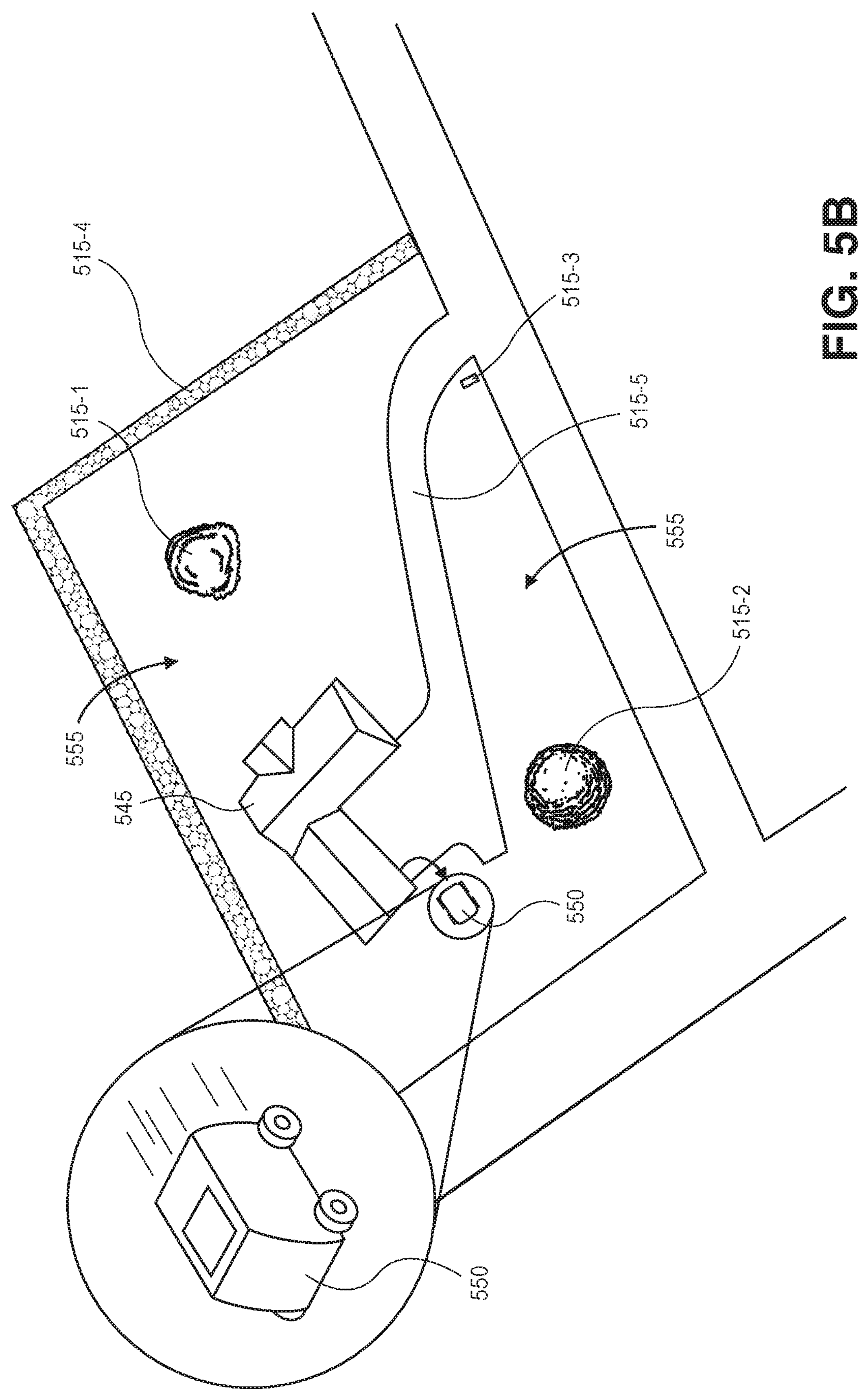
Figure 5C:
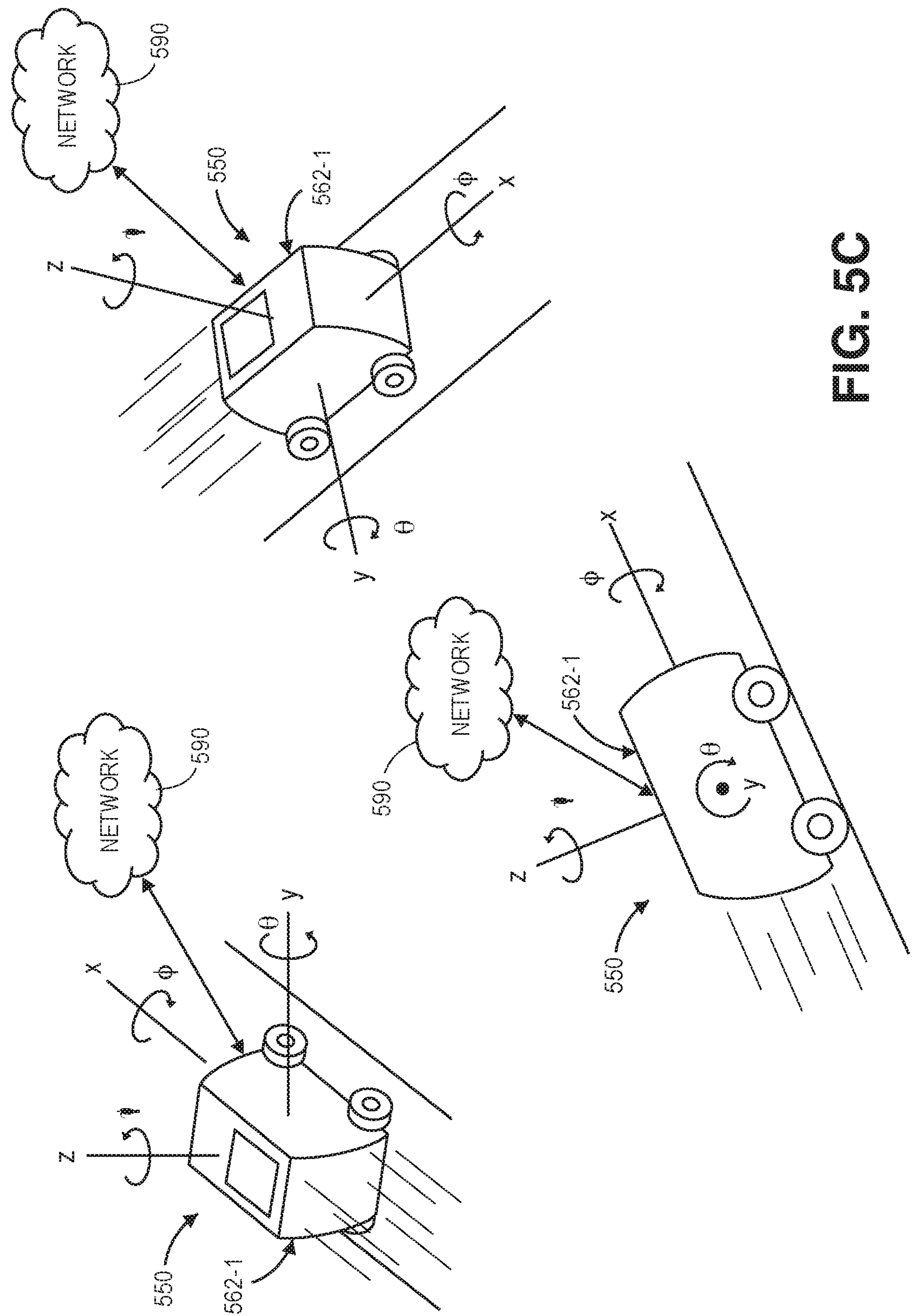
Figure 5D:
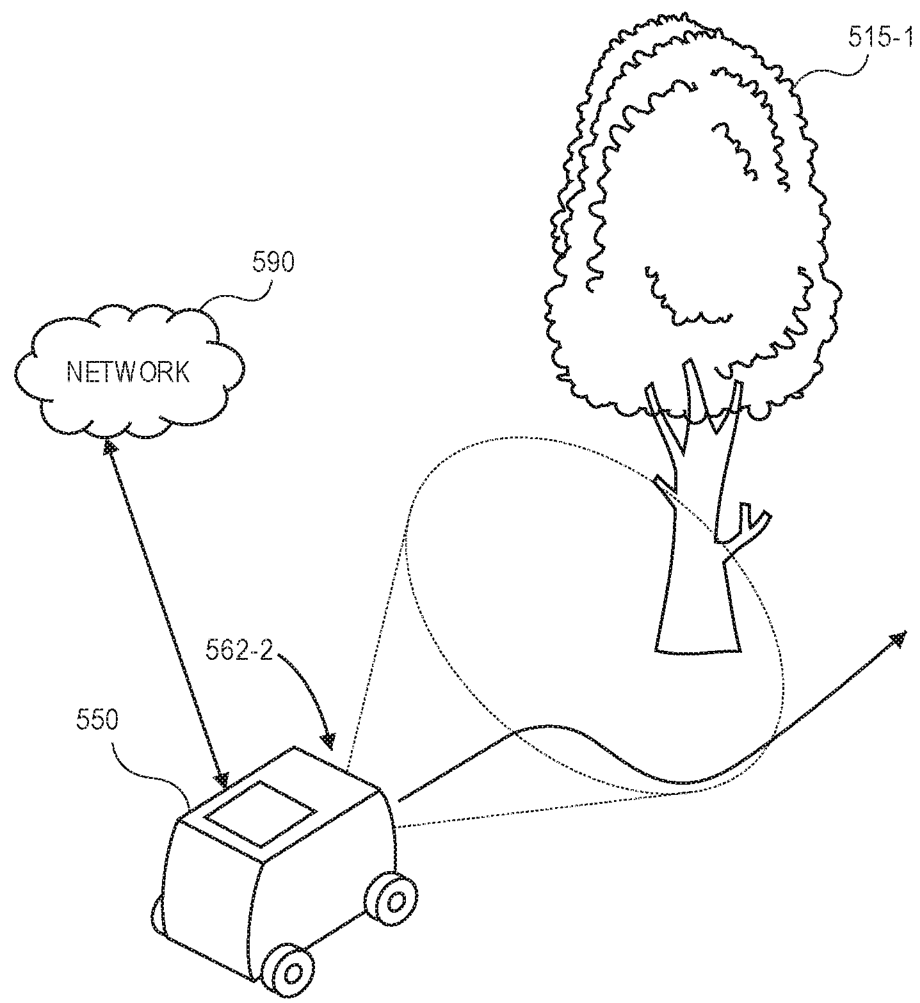

As is shown in FIG. 5B, an autonomous ground vehicle 550 may travel along the grounds 555 and capture data regarding surface conditions using one or more onboard sensors. For example, as is shown in FIG. 5C, the autonomous ground vehicle 550 may travel along surfaces of the grounds 555 and capture information or data regarding orientations such as roll angles it, about a roll axis (or x-axis), pitch angles $\theta$ about a pitch axis (or y-axis), or yaw angles about a yaw axis (or z-axis) at various points on such surfaces using an inclinometer 562-1 or other sensor, and report the information or data to one or more external systems or devices (not shown) over a network 590. As is shown in FIG. 5D, the autonomous ground vehicle 550 may capture imaging data (e.g., visual imaging data or depth imaging data) using an imaging device 562-2, and report the information or data to one or more external systems or devices (not shown) over the network 590. The imaging data may be processed to detect and/or recognize one or more objects depicted therein (e.g., natural or artificial obstacles that may be fixed in position or mobile). For example, as is shown in FIG. 5D, the autonomous ground vehicle 550 may capture information or data while traveling on the grounds 555 and detect the presence of the tree 515-1. The autonomous ground vehicle 550 may further execute one or more turns or other maneuvers to avoid the tree 515-1. The autonomous ground vehicle 550 may further capture information or data regarding other physical features on the grounds 555, including but not limited to the home 545, the tree 515-2, the mailbox 515-3, the stone wall 515-4 and/or the driveway 515-5, as well as the grounds 555 themselves.

Figure 5E:
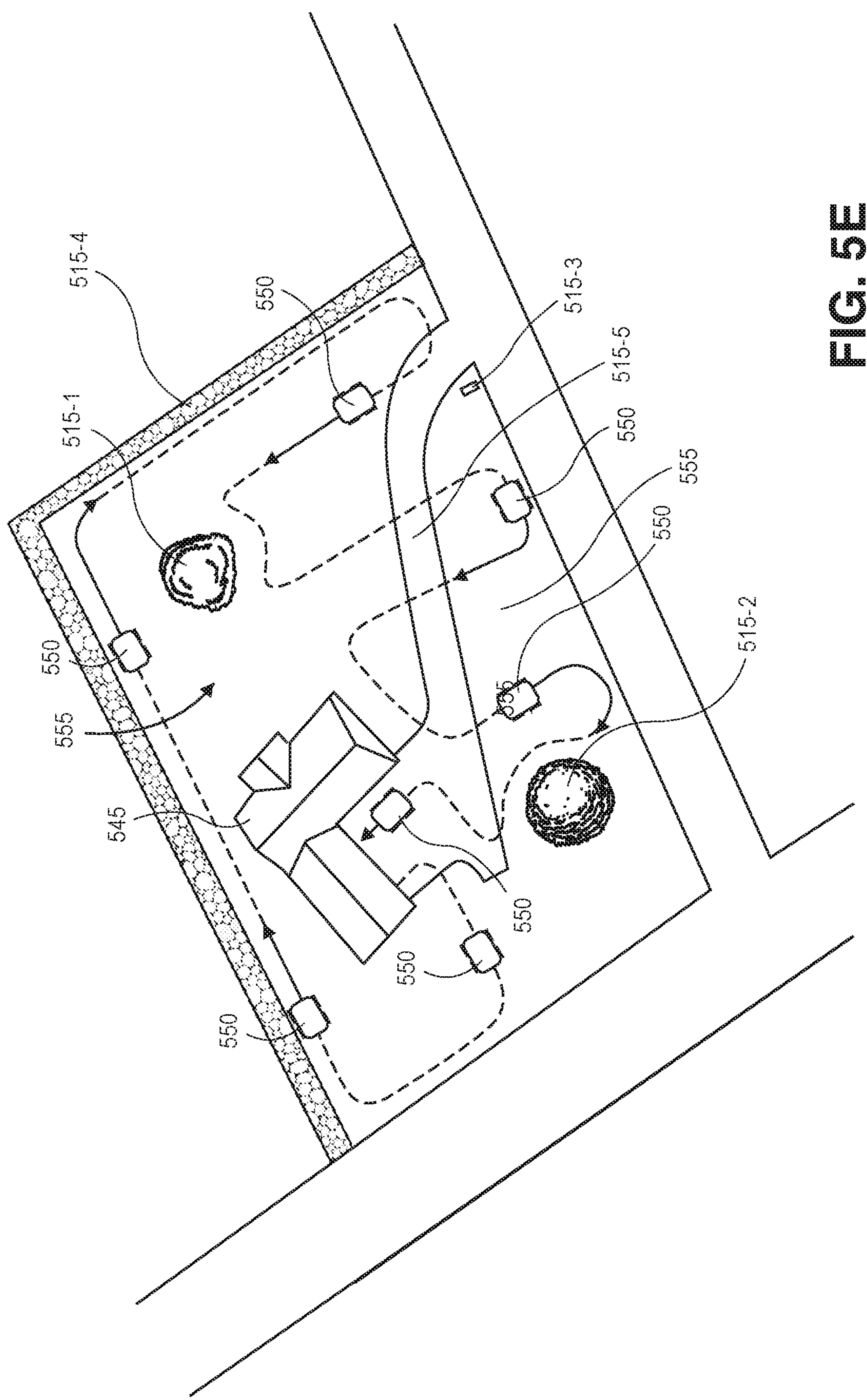

As is shown in FIG. 5E, the autonomous ground vehicle 550 may travel along the surfaces surrounding the home 545 in one or more regular or irregular patterns or directions, e.g., in paths that are parallel or perpendicular to one another, or aligned at any angle with respect to one another, and at constant or varying velocities. For example, as is shown in FIG. 5E, the autonomous ground vehicle 550 may travel on yards, patios, driveways, sidewalks, walkways, streets or other surfaces surrounding the home 545, including lands associated with the home 545, publicly accessible lands within a vicinity of the home 545, and lands owned by others for which permission to travel thereon by one or more vehicles (e.g., to land an aerial vehicle) has been granted or otherwise obtained. Information or data regarding features identified at specific points, or surface textures, terrain features, weather conditions or moisture contents at such points, may be stored in one or more memory components or data stores aboard the autonomous ground vehicle 550 or transmitted to one or more external systems or devices (not shown), e.g., over the network 590. In some embodiments, where a region or space includes a plurality of homes, buildings or other structures or facilities, an autonomous ground vehicle associated with any of the homes, buildings, structures or facilities may, where permission has been so granted, evaluate ground conditions associated with each of the homes, buildings, structures or facilities.

Figure 5F:
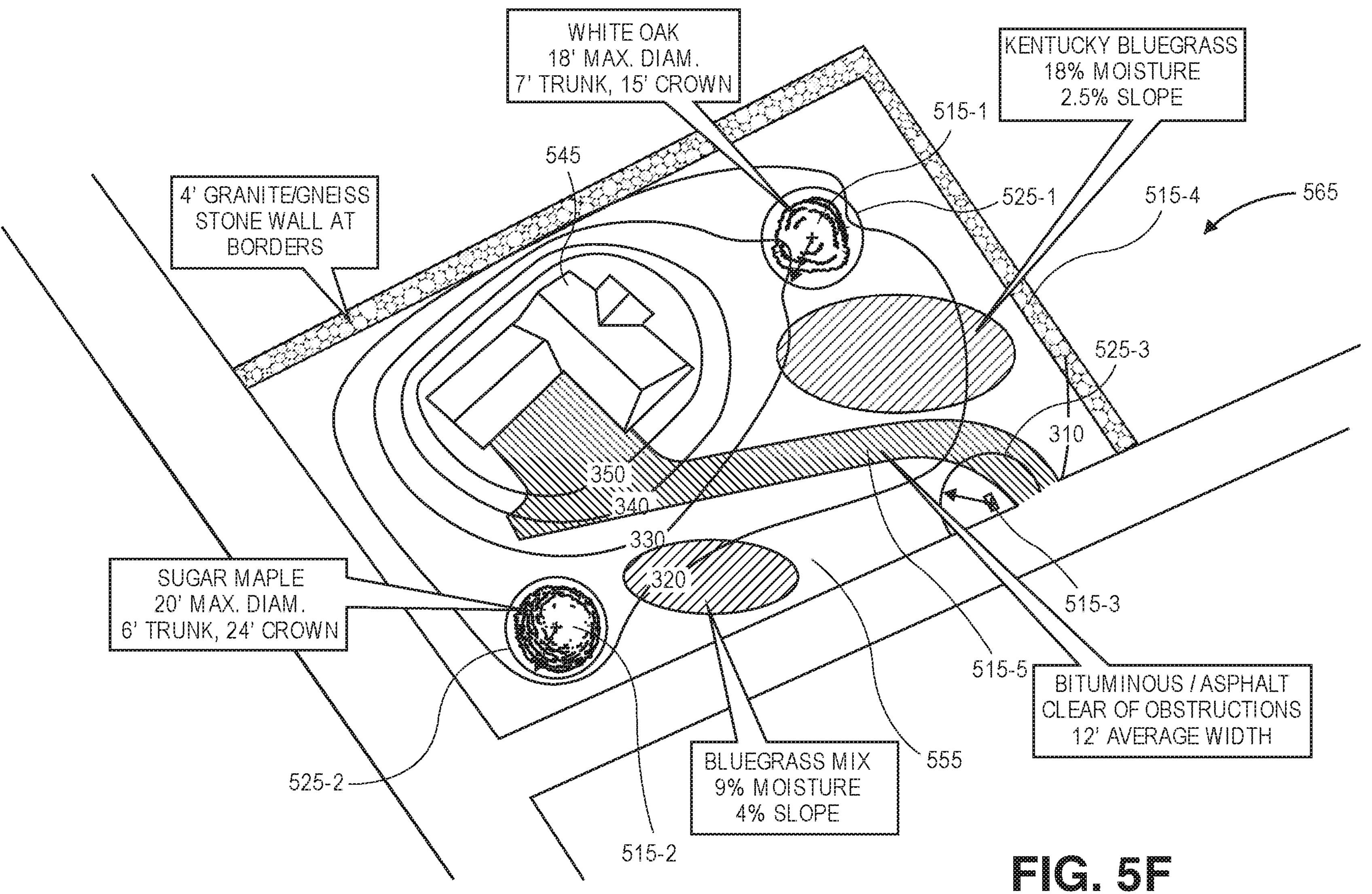

As is shown in FIG. 5F, a profile 565 of the grounds 555 surrounding the home 545 is generated based on the information or data captured by the autonomous ground vehicle 550. The profile 565 may include elevations or contours of the grounds 555, e.g., lines corresponding to elevations of 310, 320, 330, 340 and 350 feet, as well as locations of the trees 515-1, 515-2, the mailbox 515-3, the stone wall 515-4, the driveway 515-5, or other physical features on the grounds, as well as safe ranges or distances around such features. The profile 565 may further include information or data describing or characterizing the grounds 555. For example, as is shown in FIG. 5F, the profile 565 includes an identifier or classification of the tree 515-1, viz., that the tree 515-1 is a white oak tree with an eighteen-foot maximum diameter, a seven-foot trunk and a fifteen-foot crown, and an identifier or classification of the tree 515-2, viz., that the tree 515-2 is a sugar maple tree having a twenty-foot maximum diameter, a six-foot trunk and a twenty-four-foot crown. The profile 565 further includes an identifier or classification of the stone wall 515-4, viz., that the stone wall 515-4 is approximately four feet tall and is formed from granite and gneiss. The profile 565 also describes the driveway 515-5 as being formed from bituminous pavement and asphalt, and indicates that the driveway 515-5 is free of obstructions and has a twelve-foot average width. The profile 565 further describes the composition of portions of the grounds 555, including an identifier that one portion of the grounds 555 is formed from Kentucky bluegrass surfaces having an eighteen percent moisture content and a two-and-one-half percent slope, and an identifier that another portion of the grounds 555 is formed from a bluegrass mixture having a nine percent moisture content and four percent slope.

Figure 5G:
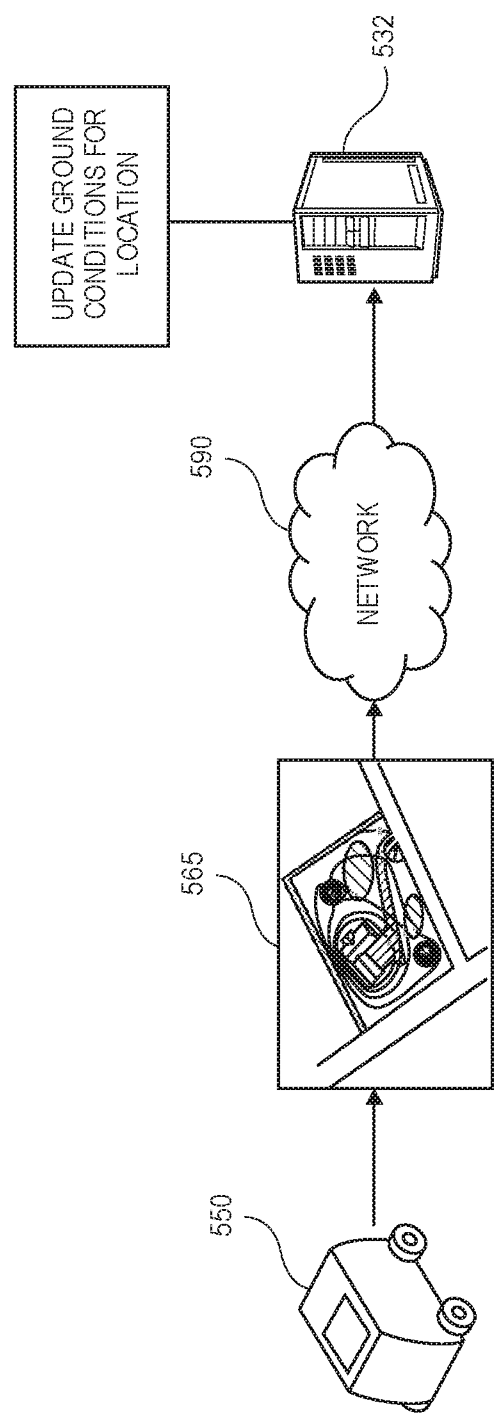

As is shown in FIG. 5G, the profile 565 is provided to a server 532 over a network 590, where the profile 565 may be used to update information or data regarding ground conditions of the home 545 and the grounds 555 stored thereon. Subsequently, the profile 565 or the information or data updated based thereon may be used to select areas for the delivery of one or more items to the home 545 or the grounds 555, or areas where one or more other tasks or evolutions may be performed on the grounds 555, as well as routes to such areas, e.g., according to one or more optimal routes. For example, the profile 565 may be used to select an area on the grounds 555 upon which an aerial vehicle may land or take off, to select an area for receiving a delivery by a ground vehicle, e.g., a car, a truck, a van, a tractor, or any other type or form of vehicle, such as a hovercraft or another autonomous ground vehicle, or to select an area where a courier may deposit one or more items on the grounds 555, such as adjacent to the home 545 or in one or more other locations.

Where delivery areas are identified in association with a home, a building or another structure or facility for each of a plurality of delivery modes, and an order is received for a delivery of an item to the home, the building, the structure or the facility, a customer or other entity associated with the order may be permitted to select a delivery mode based on such delivery areas. Referring to FIGS. 6A through 6D, views of aspects of one system for selecting delivery modes or delivery areas using autonomous ground vehicles in accordance with embodiments of the present disclosure are shown. Except where otherwise noted, reference numerals preceded by the number "6" in FIGS. 6A through 6D refer to elements that are similar to elements having reference numerals preceded by the number "5" in FIGS. 5A through 5G, by the number "4" in FIG. 4, by the number "2" in FIG. 2A or FIG. 2B or by the number "1" shown in FIGS. 1A through 1J.

Figure 6A:
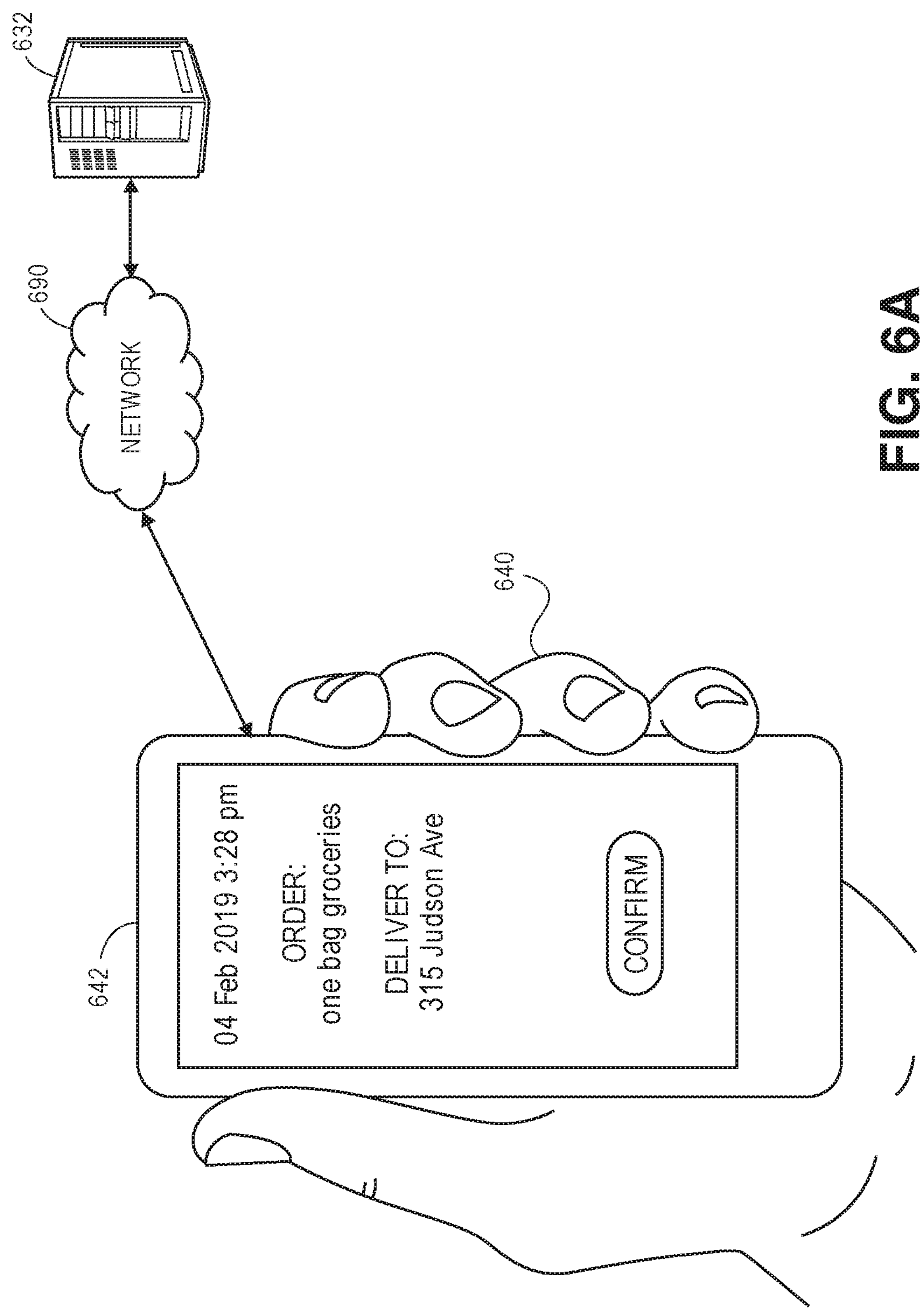
FIGS. 6A through 6D are views of aspects of one system for selecting delivery modes or delivery areas using autonomous ground vehicles in accordance with embodiments of the present disclosure.

As is shown in FIG. 6A, a customer 640 places an order for a delivery of an item using a mobile device 642, e.g., by interacting with one or more user interfaces that are displayed thereon. The mobile device 642 is configured to communicate with one or more servers 632 over one or more networks 690, which may include the Internet in whole or in part. The servers 632 may be associated with a materials handling facility, a fulfillment center or any other facility that is adapted to distribute one or more of the items ordered by the customer 640.

Figure 6B:
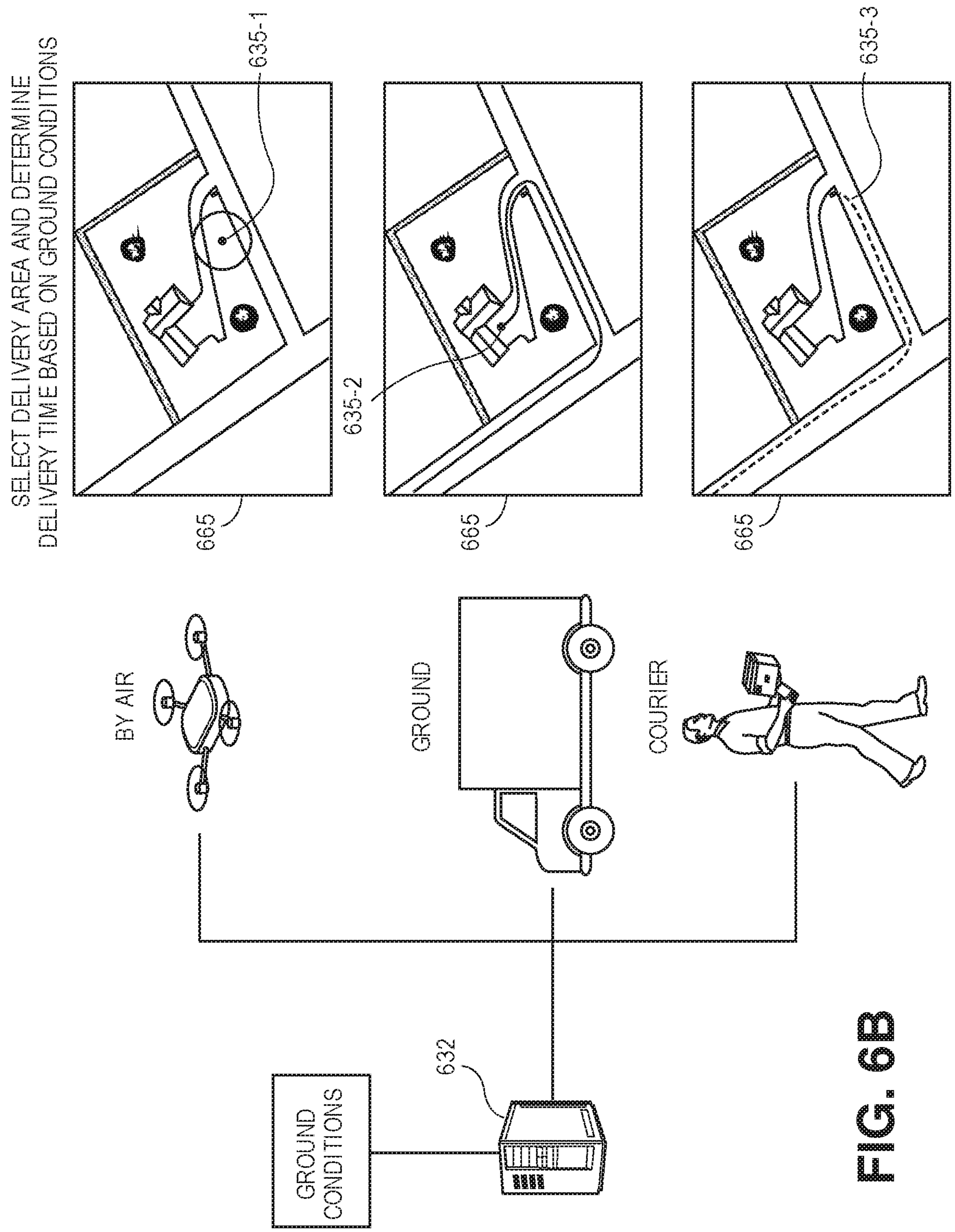
Figure 6C:
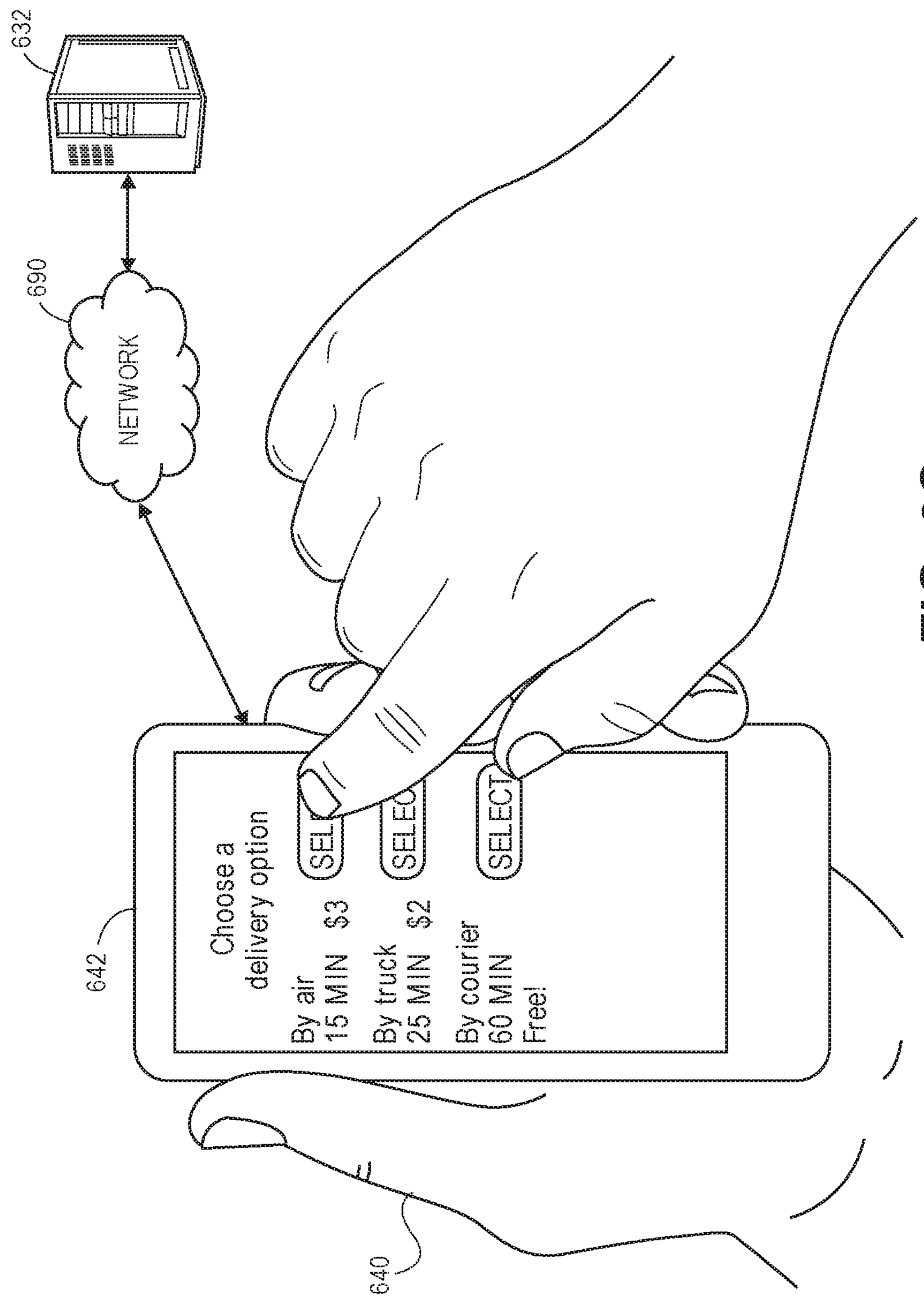

As is shown in FIG. 6B, upon receiving the order, the server 632 may identify delivery areas for each of a plurality of delivery modes and, as is shown in FIG. 6C, present information regarding such delivery modes to the customer 640 via the mobile device 642. For example, as is shown in FIG. 6B, the server 632 may determine delivery areas 635-1, 635-2, 635-3 for each of a plurality of delivery modes (e.g., by air, ground or courier) based on a profile 665 of a region or space to which the customer 640 has requested that the item be delivered. The server 632 may then determine delivery times to each of the delivery areas 635-1, 635-2, 635-3, based on the ground conditions expressed in the profile 665. Where a delivery area may not be identified for a given delivery mode, such as where no area within a region or space associated with a destination may accommodate landings or take-offs by an aerial vehicle, or parking, idling or traveling by a ground-based vehicle such as a van or a truck, or travel on foot or bicycle by a human courier, such options need not be presented to the customer 640. Moreover, as is also shown in FIG. 6C, delivery modes are shown along with transit times and surcharges, as well as one or more selectable features. The delivery modes may be ranked in a user interface based at least in part on such transit times (e.g., shortest to largest) or surcharges (e.g., cheapest to most expensive), in an alphabetical order, or on any other basis.

Figure 6D:
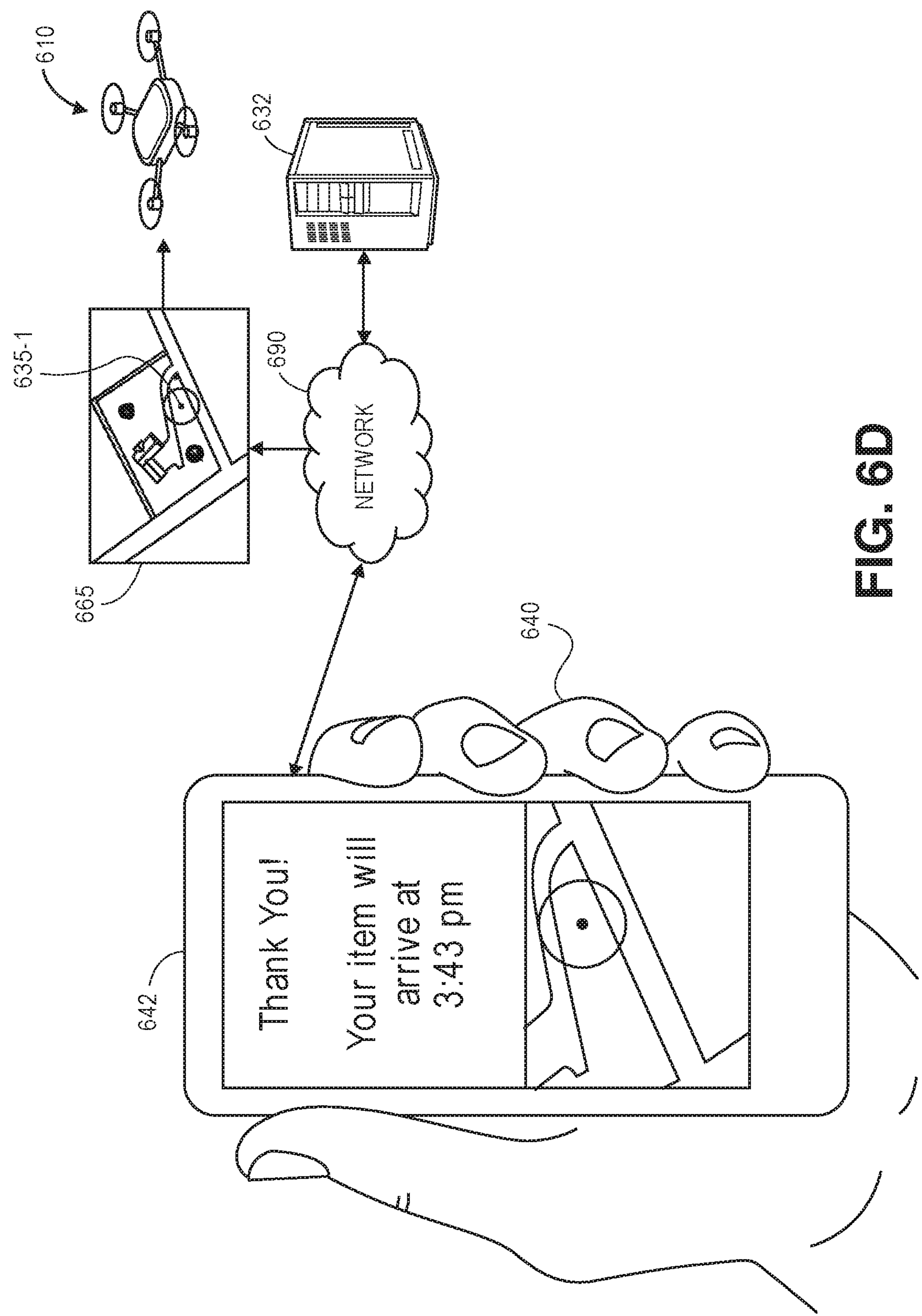

As is shown in FIG. 6D, upon receiving a selection of a delivery mode from the customer 640 via the mobile device 642 over the network 690, the server 632 provides the delivery area 635-1 and the profile 665 to an aerial vehicle 610, which may then travel to the delivery area 635-1 in order to complete the delivery to the customer 640, as specified in the order.

Figure 7:
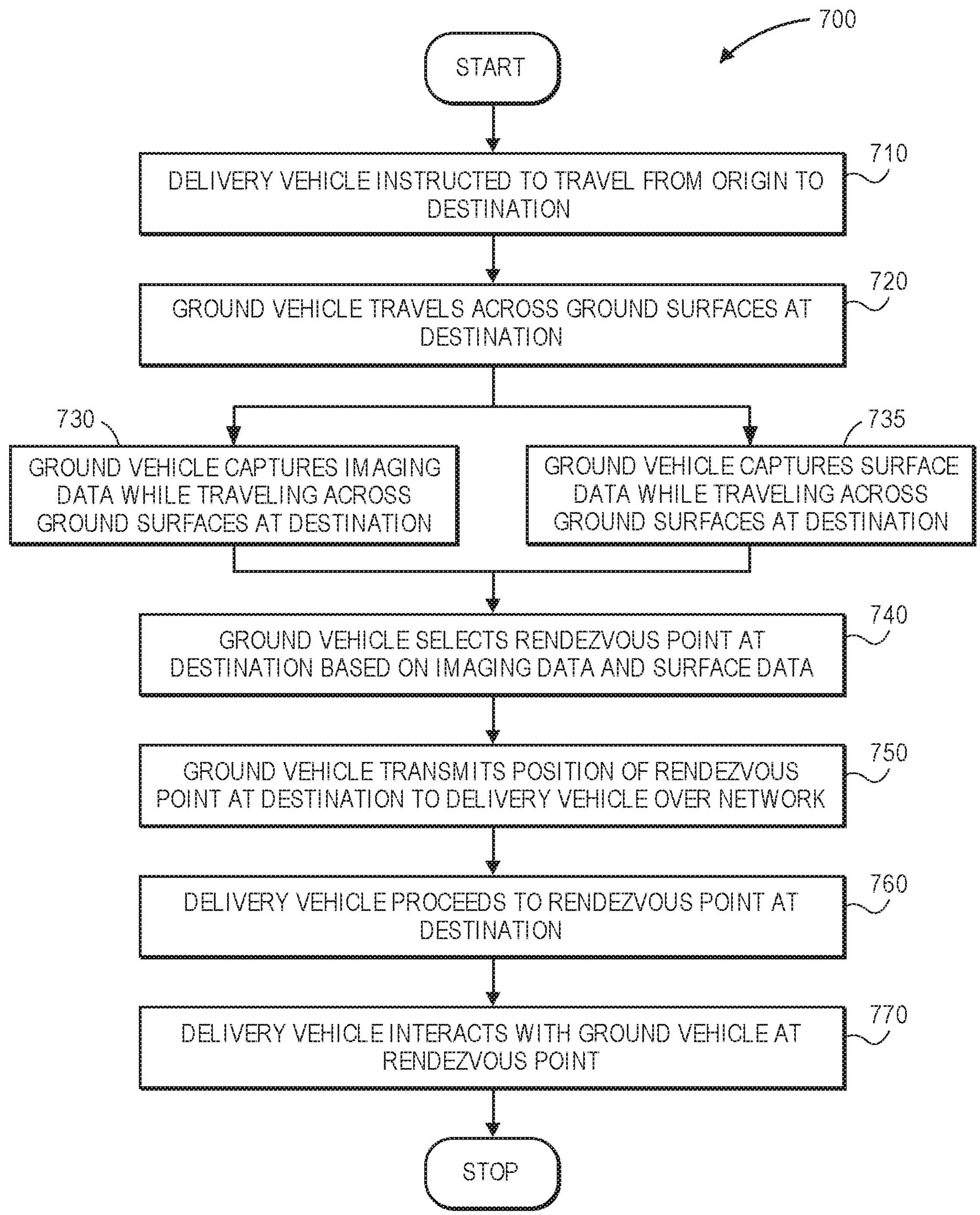
FIG. 7 is a flow chart of one process for selecting delivery modes or delivery areas using autonomous ground vehicles in accordance with embodiments of the present disclosure.

In accordance with the present disclosure, an autonomous ground vehicle may select an area in a region or space that is best suited to interact with a delivery vehicle. For example, an autonomous ground vehicle may select an area at which an aerial vehicle may land atop the autonomous ground vehicle, or hover over the autonomous ground vehicle, based on information or data regarding ground conditions captured thereby, and the autonomous ground vehicle may participate in one or more tasks or evolutions with the aerial vehicle at the selected area. Referring to FIG. 7, a flow chart of one process for selecting delivery modes or delivery areas using autonomous ground vehicles in accordance with embodiments of the present disclosure is shown. At box 710, a delivery vehicle is instructed to travel from an origin to a destination, e.g., to deliver one or more items to the destination, to conduct monitoring or surveillance operations at the destination, or to perform any other tasks or functions within a vicinity of the destination, or along a route between the origin and the destination. At box 720, a ground vehicle travels across ground surfaces at the destination, e.g., in one or more regular or irregular patterns or directions, and at constant or varying velocities.

At box 730, the ground vehicle captures imaging data while traveling across the ground surfaces at the destination. In some embodiments, the imaging data may include visual imaging data or depth imaging data that may be captured using imaging devices provided aboard the ground vehicle and having fields of view aligned at any orientation with respect to a direction of travel of the ground vehicle. In parallel, at box 735, the ground vehicle also captures surface data, e.g., angles of inclination, data regarding surface terrain (e.g., composition, moisture, or the like), or any other data that may be captured using one or more sensors aboard the ground vehicle.

At box 740, the ground vehicle selects a rendezvous point at the destination based on the imaging data and the surface data. For example, the ground vehicle may be programmed to identify an area or location at the destination that may accommodate the ground vehicle and has sufficient vertical clearance to enable an aerial vehicle to land on the ground vehicle, or to hover within close proximity of the aerial vehicle, and to execute one or more interactions between the aerial vehicle and the ground vehicle. In some embodiments, the interactions may involve transferring one or more items from the aerial vehicle to the ground vehicle, or from the ground vehicle to the aerial vehicle. Alternatively, the interactions may involve replacing one or more parts aboard the aerial vehicle, e.g., batteries or other power supplies, with replacement parts provided aboard the autonomous ground vehicle, or any other interactions.

At box 750, the ground vehicle transmits a position of the rendezvous point at the destination to the delivery vehicle, e.g., directly or via one or more networks. The position may be represented by one or more sets of coordinates corresponding to the position or an area or location including the position, e.g., one or more geolocations of the position. Alternatively, information transmitted to the ground vehicle by the autonomous ground vehicle may identify the position of the rendezvous point with respect to one or more landmarks.

At box 760, the delivery vehicle proceeds to the rendezvous point at the destination. In some embodiments, where the ground vehicle was not located at the rendezvous point upon transmitting the position of the rendezvous point to the delivery vehicle at box 750, the ground vehicle may proceed to the rendezvous point. At box 770, the delivery vehicle interacts with the ground vehicle at the rendezvous point, and the process ends. For example, where the delivery vehicle is an aerial vehicle, the aerial vehicle may identify the position and/or the ground vehicle visually, e.g., by imaging data, or by communications between the aerial vehicle and the ground vehicle, either directly or over one or more networks. Upon arriving at the rendezvous point, the delivery vehicle may transfer one or more items to the ground vehicle, or receive one or more items from the ground vehicle, either directly or by depositing the items at or near the rendezvous point, or in any other manner.

Referring to FIGS. 8A through 8E, views of aspects of one system for selecting delivery modes or delivery areas using autonomous ground vehicles in accordance with embodiments of the present disclosure are shown. Except where otherwise noted, reference numerals preceded by the number "8" in FIGS. 8A through 8E refer to elements that are similar to elements having reference numerals preceded by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 8A:
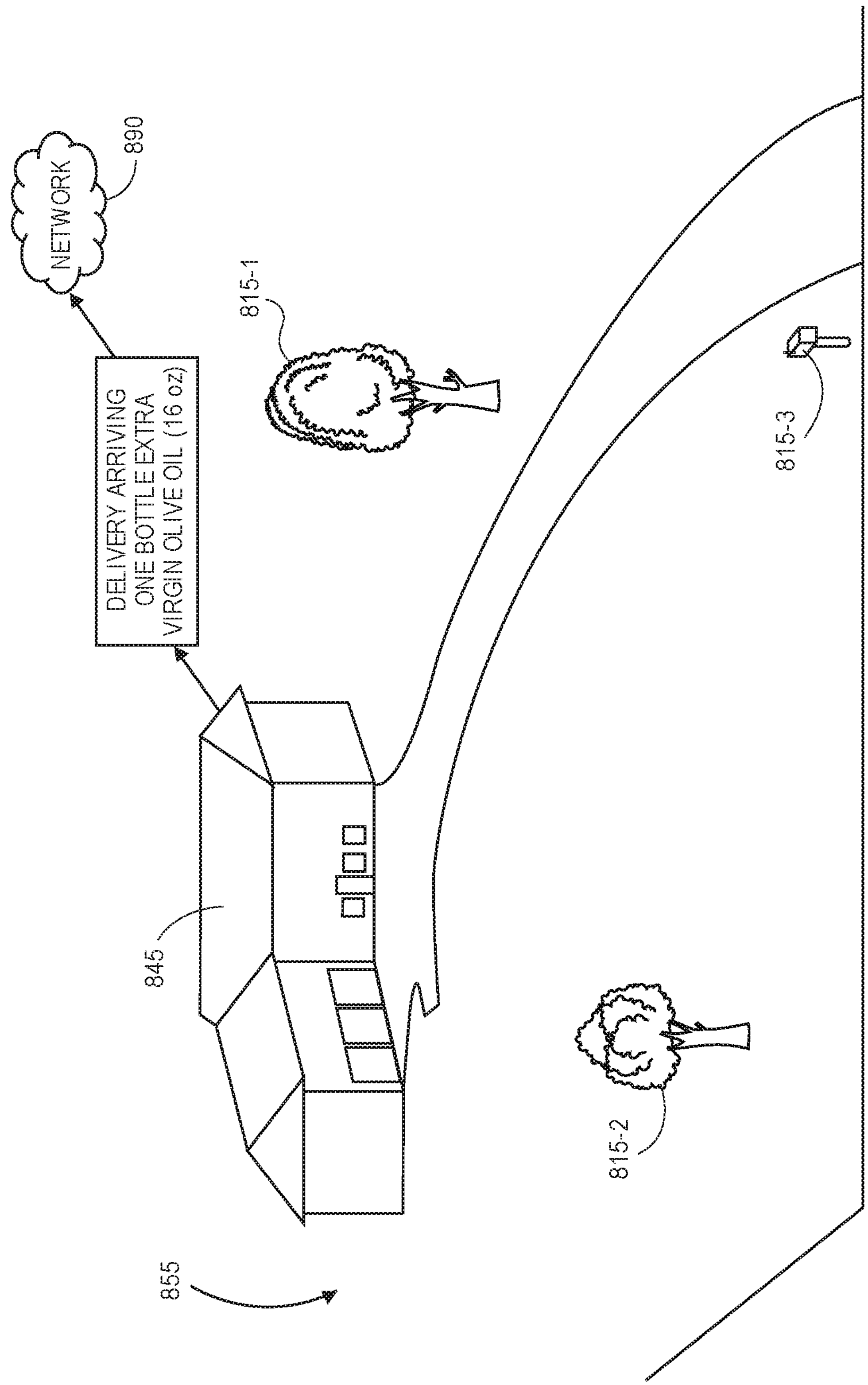
FIGS. 8A through 8E are views of aspects of one system for selecting delivery modes or delivery areas using autonomous ground vehicles in accordance with embodiments of the present disclosure.

As is shown in FIG. 8A, a customer at a home 845 places an order for a delivery of an item over a network 890, e.g., via a tablet computer, a smartphone, a laptop computer, a desktop computer, a smart speaker, a wristwatch, a television, or any other system at the home 845 or in one or more other locations. As is also shown in FIG. 8A, grounds 855 surrounding the home 845 include a plurality of obstructions, e.g., a pair of trees 815-1, 815-2 and a mailbox 815-3.

Figure 8B:
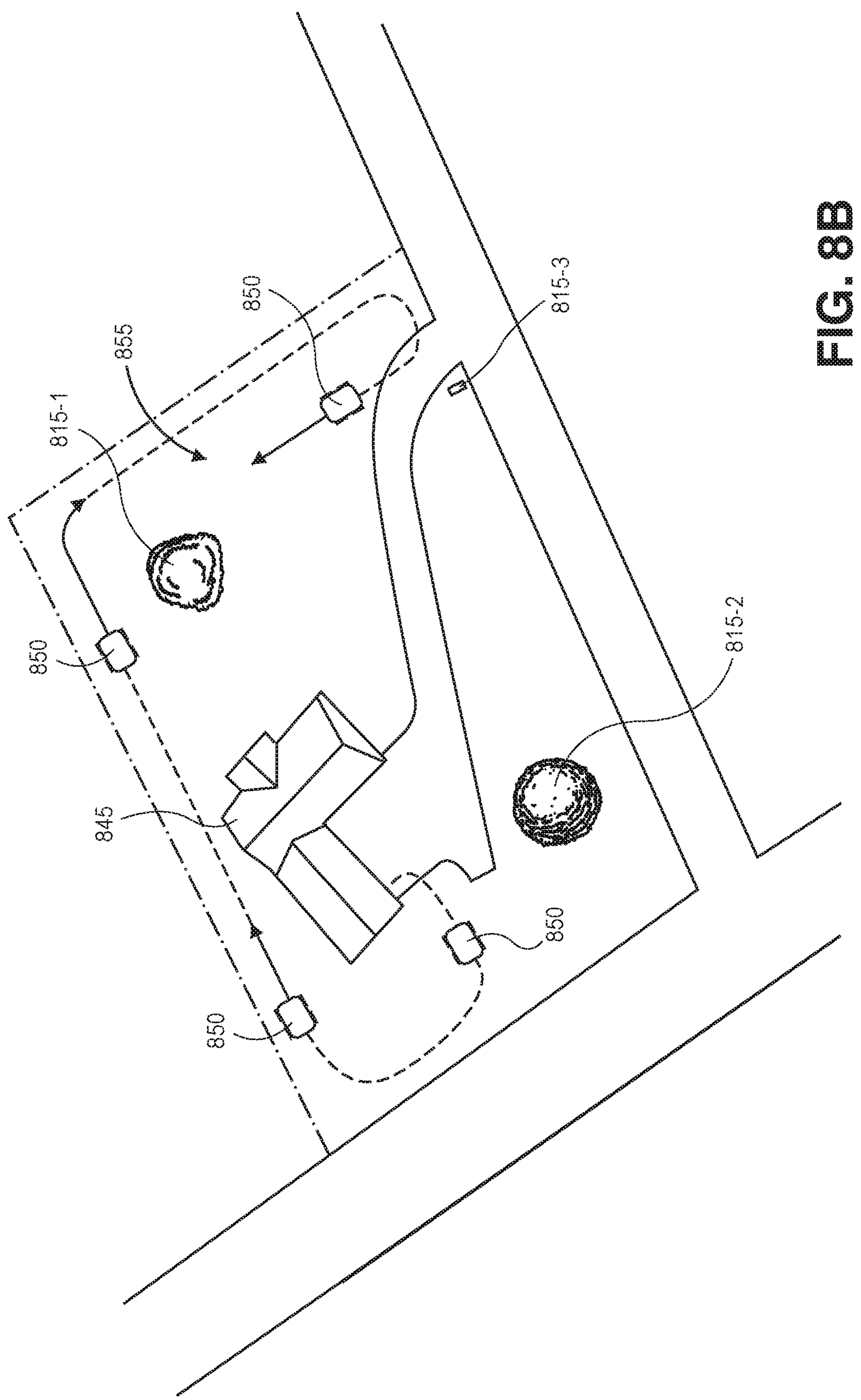

As is shown in FIG. 8B, after the order has been placed, an autonomous ground vehicle 850 may travel along the grounds 855 and capture data regarding surface conditions using one or more onboard sensors, e.g., information or data regarding orientations of the autonomous ground vehicle 850 such as roll angles, pitch angles or yaw angles using an inclinometer or other sensor, imaging data using a digital camera or other imaging device, or any other data regarding the grounds 855 using any other sensor.

Figure 8C:
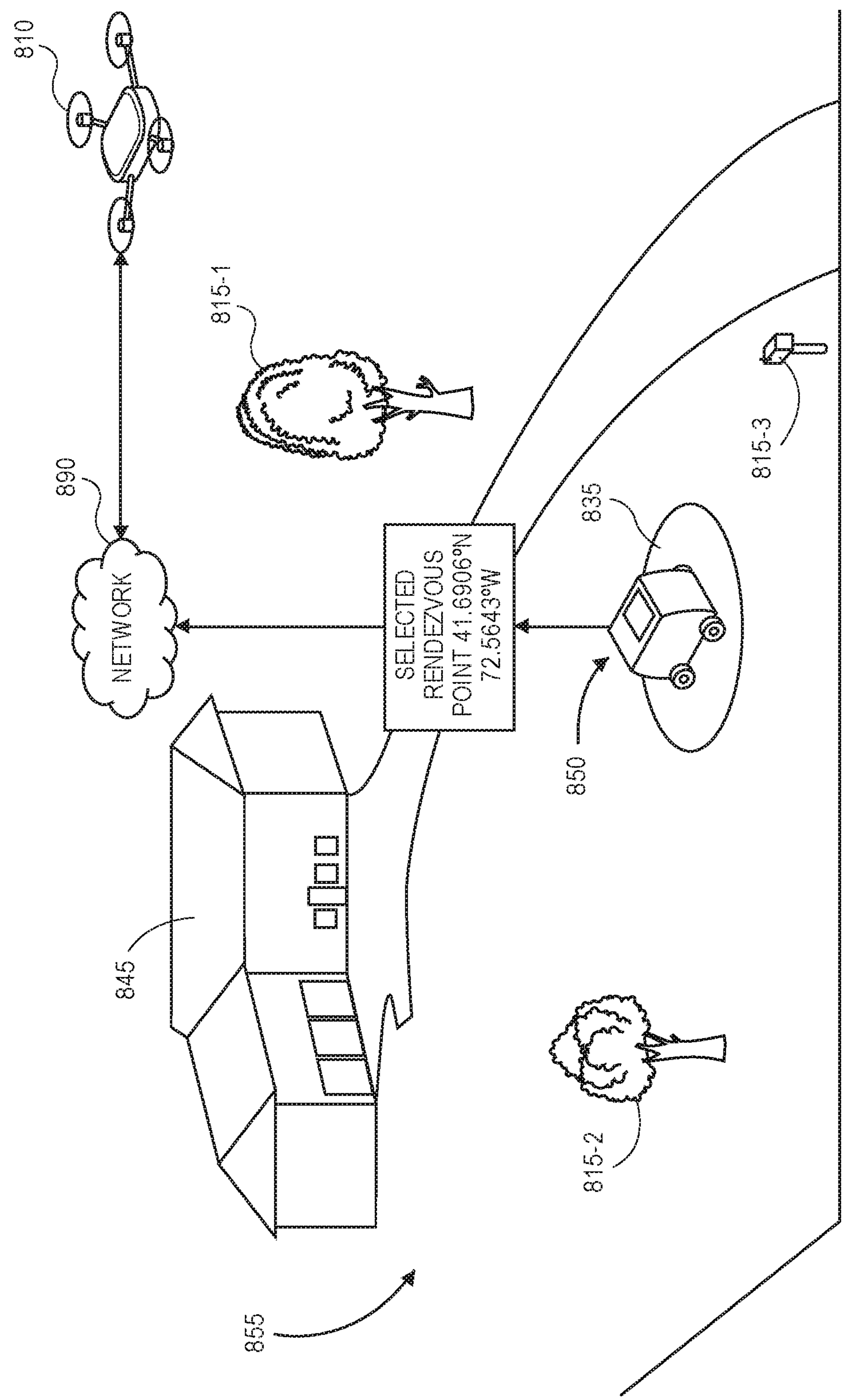
Figure 8D:
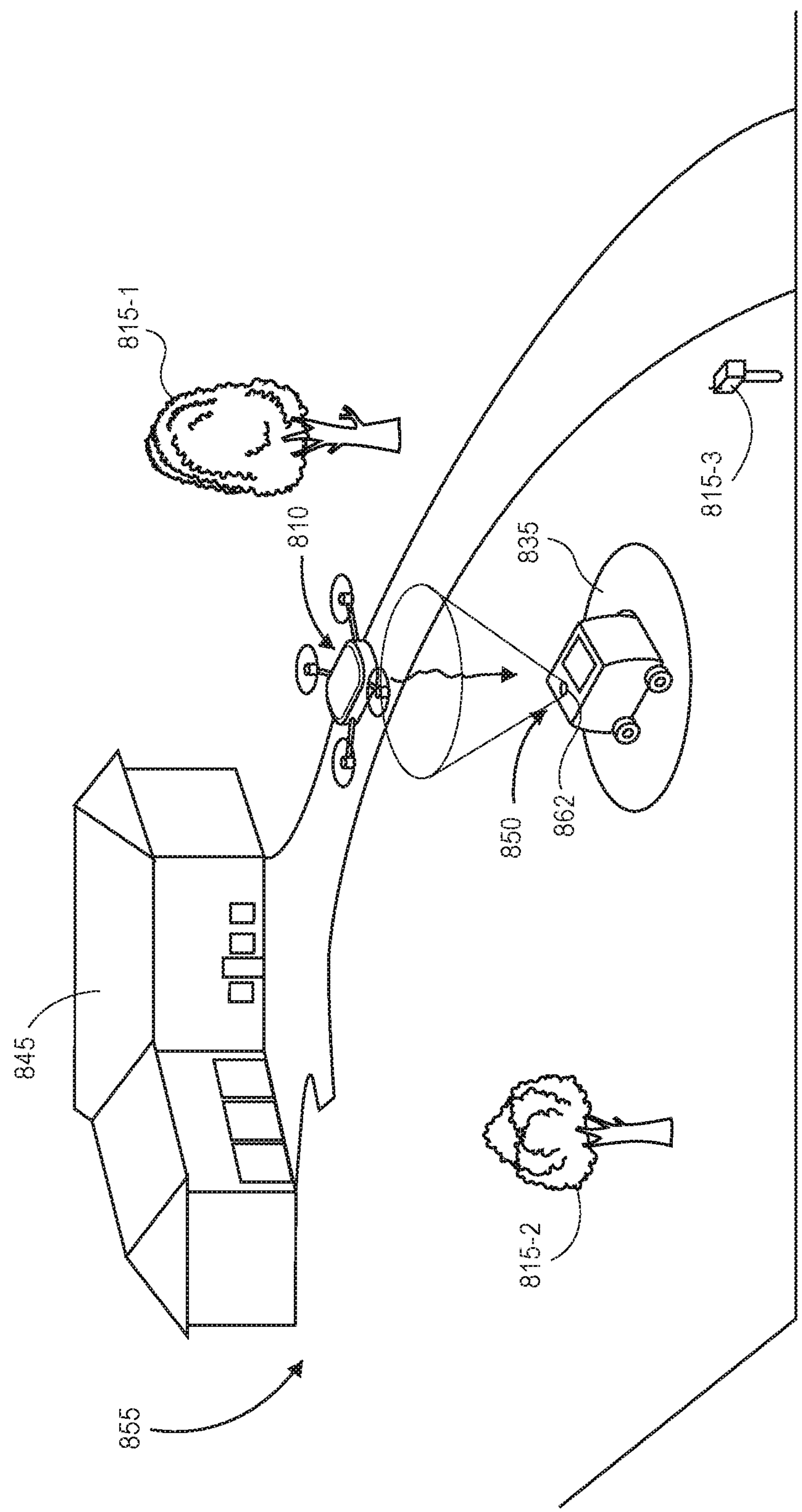

As is shown in FIG. 8C, the autonomous ground vehicle 850 selects a suitable area 835 on the grounds 855 for a rendezvous with the aerial vehicle 810, and transmits information or data (e.g., one or more sets of coordinates) regarding the area 835 to the aerial vehicle 810 over one or more networks 890. The area 835 may be selected on any basis, including but not limited to ground conditions, proximity to one or more of the obstructions 815-1, 815-2, 815-3, or one or more operating conditions or constraints of the autonomous ground vehicle 850 or the aerial vehicle 810, including but not limited to dimensions of the aerial vehicle 810, a mass of the aerial vehicle 810, operating speeds of one or more components of the aerial vehicle 810 (e.g., motors, shafts, propellers or other features), or a minimum clearance required between one or more features of the aerial vehicle 810 and one or more obstacles. As is shown in FIG. 8D, upon arriving above the area 835, the aerial vehicle 810 descends to the autonomous ground vehicle 850. As the aerial vehicle 810 descends, the autonomous ground vehicle 850 may capture information or data regarding the aerial vehicle 810, e.g., by an imaging device 862 or one or more other sensors, and may use such information or data to reposition itself with respect to the aerial vehicle 810, or transmit such information or data to the aerial vehicle 810 or one or more other external systems (not shown).

Figure 8E:
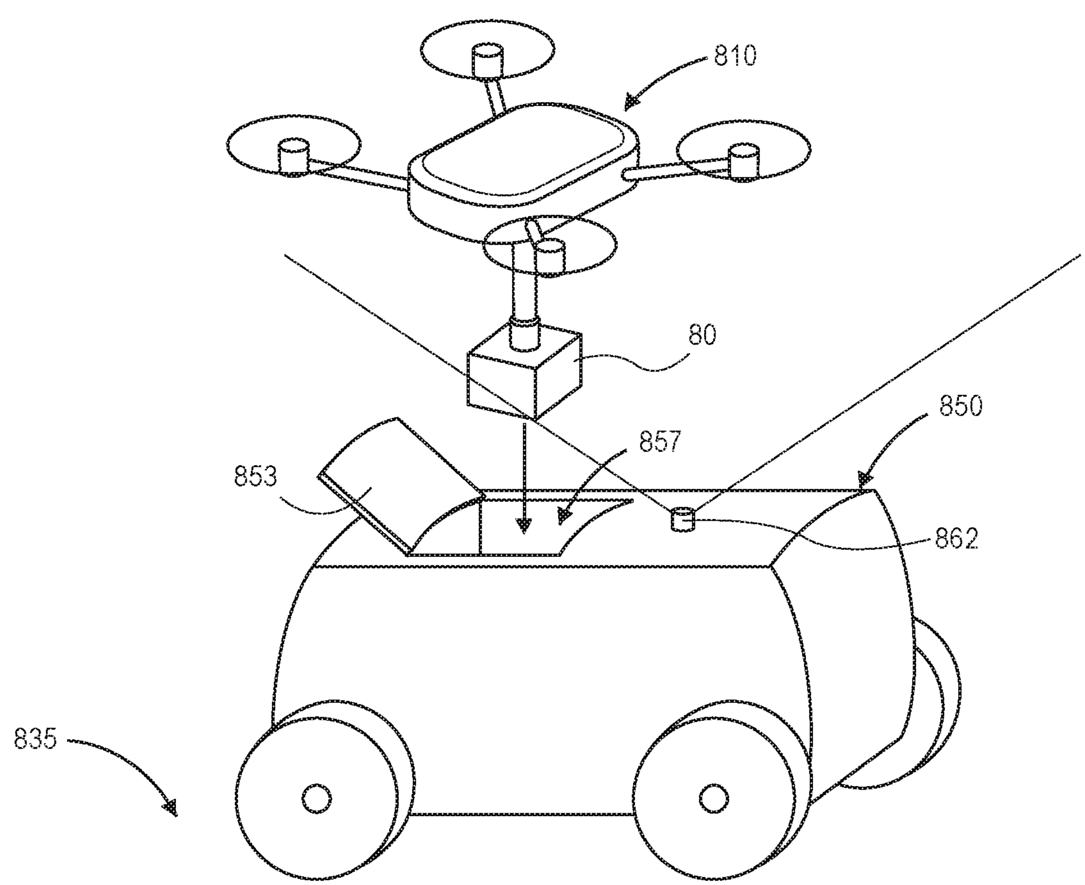

As is shown in FIG. 8E, the aerial vehicle 810 deposits an item 80 into a storage compartment 857 within the autonomous ground vehicle 850, which may be accessed via a door 853 or hatch or other system, while hovering above the autonomous ground vehicle 850. After the item 80 has been deposited within the storage compartment 857, the autonomous ground vehicle 850 may return to the home 845 or travel to one or more other locations and deposit the item 80 there. In some embodiments, the aerial vehicle 810 may be configured to land directly on a frame or other surface of the autonomous ground vehicle 850 prior to or while transferring the item 80 to the autonomous ground vehicle 850.

Alternatively, the aerial vehicle 810 may be configured to retrieve one or more items from the storage compartment 857. For example, in some embodiments, the autonomous ground vehicle 850 may have one or more items that are to be returned to a fulfillment center, a materials handling facility or any other location, and the aerial vehicle 810 may be configured to retrieve the one or more items from the autonomous ground vehicle 850 at the area 835. In some other embodiments, the autonomous ground vehicle 850 may include one or more replacement components or parts, such as replacement batteries (or other power supplies), replacement motors or replacement propellers. The aerial vehicle 810 may be configured to retrieve the one or more replacement components or parts from the autonomous ground vehicle 850 at the area 835, and to automatically install such components or parts while resting on the autonomous ground vehicle 850 or while in flight.

In some embodiments, an autonomous ground vehicle may be configured to not only select one or more delivery areas within a region or space, or other areas for performing other tasks or evolutions within the region or space, but also communicate with one or more delivery vehicles or couriers during the completion of a delivery or the performance of one or more other tasks or evolutions. The autonomous ground vehicle may thus generate and share information or data captured by one or more onboard sensors with an arriving delivery vehicle or courier, and provide information or data from the perspective of the autonomous ground vehicle to the delivery vehicle or courier that may not otherwise be sensed or discerned by any sensors that are available to the delivery or courier. Likewise, the autonomous ground vehicle may also provide feedback regarding a delivery or another evolution taking place nearby to one or more humans or other animals or machines, which is particularly beneficial where no other indications that the delivery or evolution will occur are available to such humans, animals or machines.

Referring to FIGS. 9A through 9D, views of aspects of one system for selecting delivery modes or delivery areas using autonomous ground vehicles in accordance with embodiments of the present disclosure are shown. Except where otherwise noted, reference numerals preceded by the number "9" in FIGS. 9A through 9D refer to elements that are similar to elements having reference numerals preceded by the number "8" in FIGS. 8A through 8E, by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 9A:
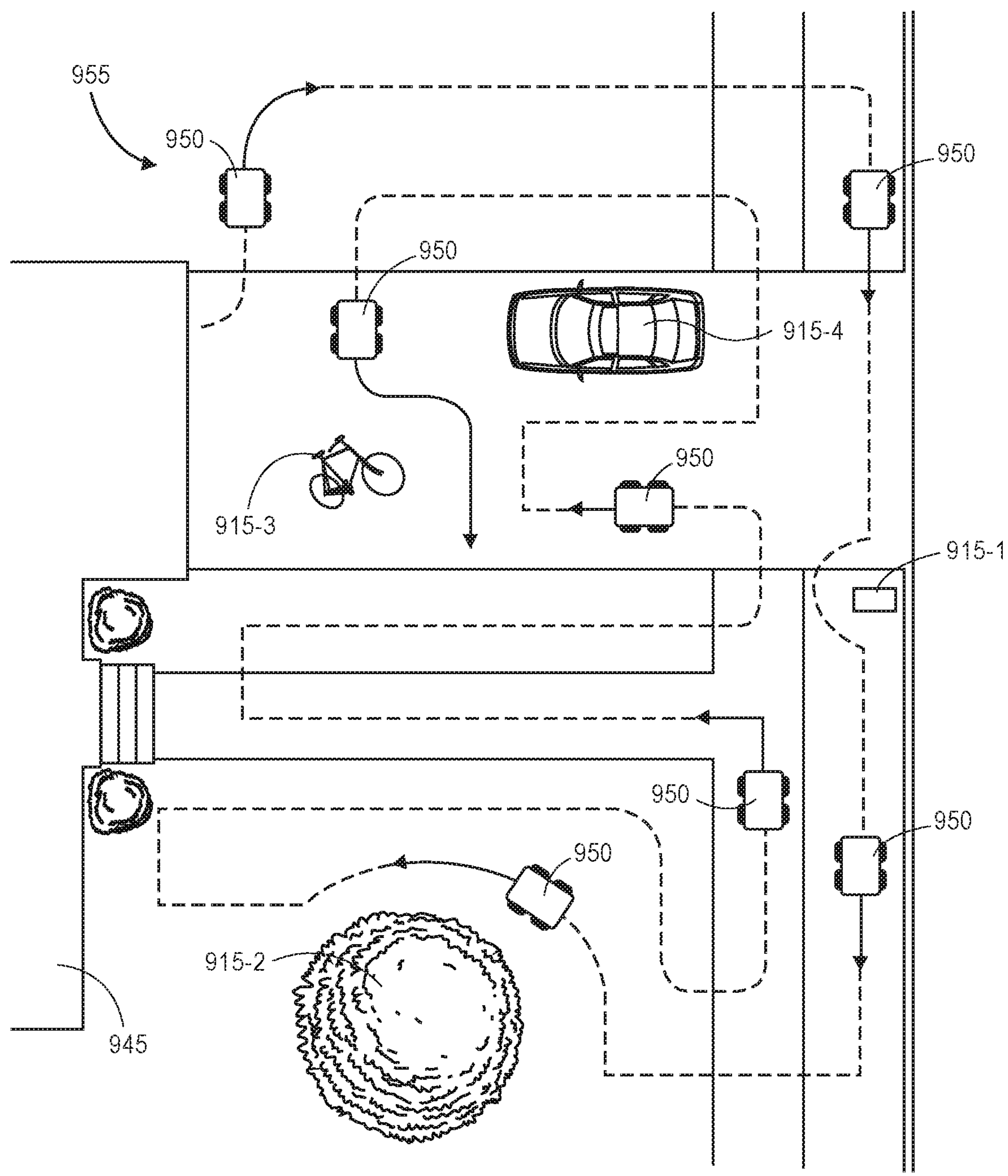
FIGS. 9A through 9D are views of aspects of one system for selecting delivery modes or delivery areas using autonomous ground vehicles in accordance with embodiments of the present disclosure.

As is shown in FIG. 9A, a ground vehicle 950 surveys grounds 955 within a vicinity of a home 945, e.g., by traveling in regular or irregular patterns defined with respect to one or more boundaries of the grounds 955 or aspects of the home 945, and capturing information or data regarding conditions of the grounds 955 by one or more sensors. For example, and as is shown in FIG. 9A, the ground vehicle 950 may travel about a perimeter of the grounds 955 and in one or more parallel or perpendicular paths (or other paths that are neither parallel nor perpendicular) while capturing information or data regarding the grounds 955. The information or data captured thereby may include positions of a mailbox 915-1, a tree 915-2, a bicycle 915-3 and an automobile 915-4, or any other obstacles that may be present on the grounds 955, as well as slopes, surface textures, terrain features, weather conditions, moisture contents or the like in one or more areas of the grounds 955.

Figure 9B:
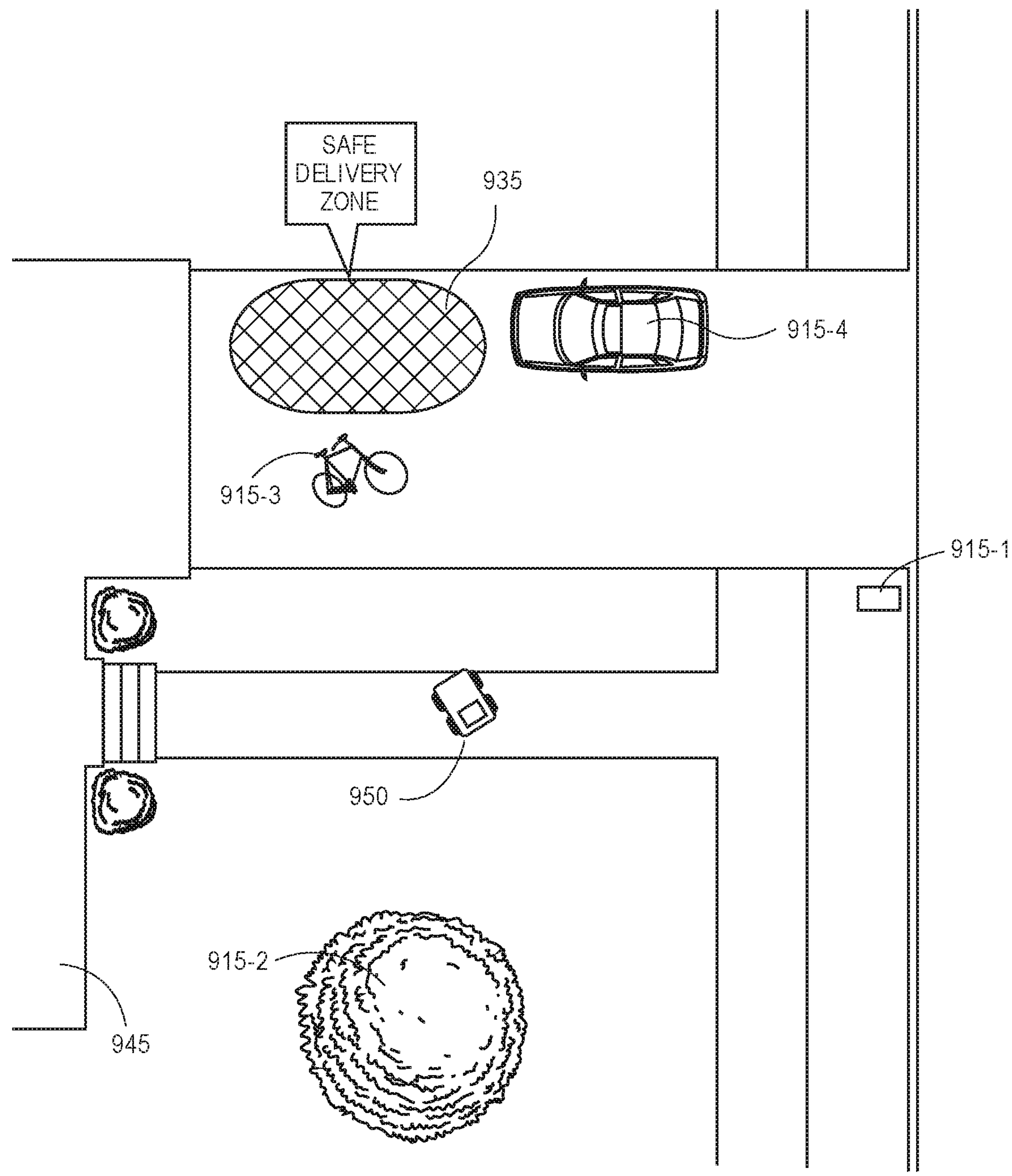
Figure 9C:
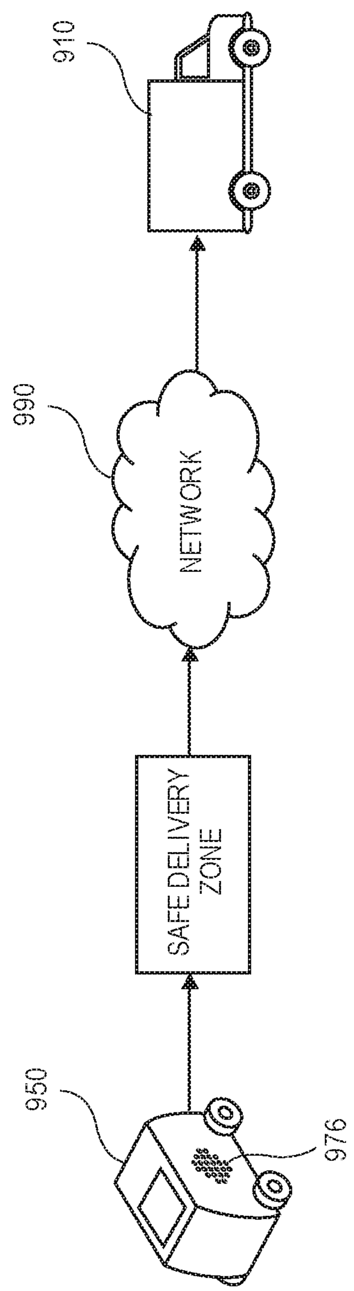

As is shown in FIG. 9B, based on the information or data captured by the one or more sensors aboard the ground vehicle 950, a safe delivery zone 935 on the grounds may be selected according to any standard or basis, including but not limited to operational constraints of a delivery vehicle, any attributes of an item to be delivered (e.g., whether the item includes one or more fragile aspects or components, or is subject to any temperature, pressure, alignment, orientation or other restrictions). As is shown in FIG. 9C, upon selecting the delivery zone 935, the ground vehicle 950 transmits information or data regarding the safe delivery zone 935 to a delivery vehicle 910 over a network 990, or directly outside of a centralized network. The safe delivery zone 935 may be identified by one or more coordinates corresponding to a center, a vertex, one or more foci, or any other attribute of a shape of a zone, or one or more points within the zone.

Figure 9D:
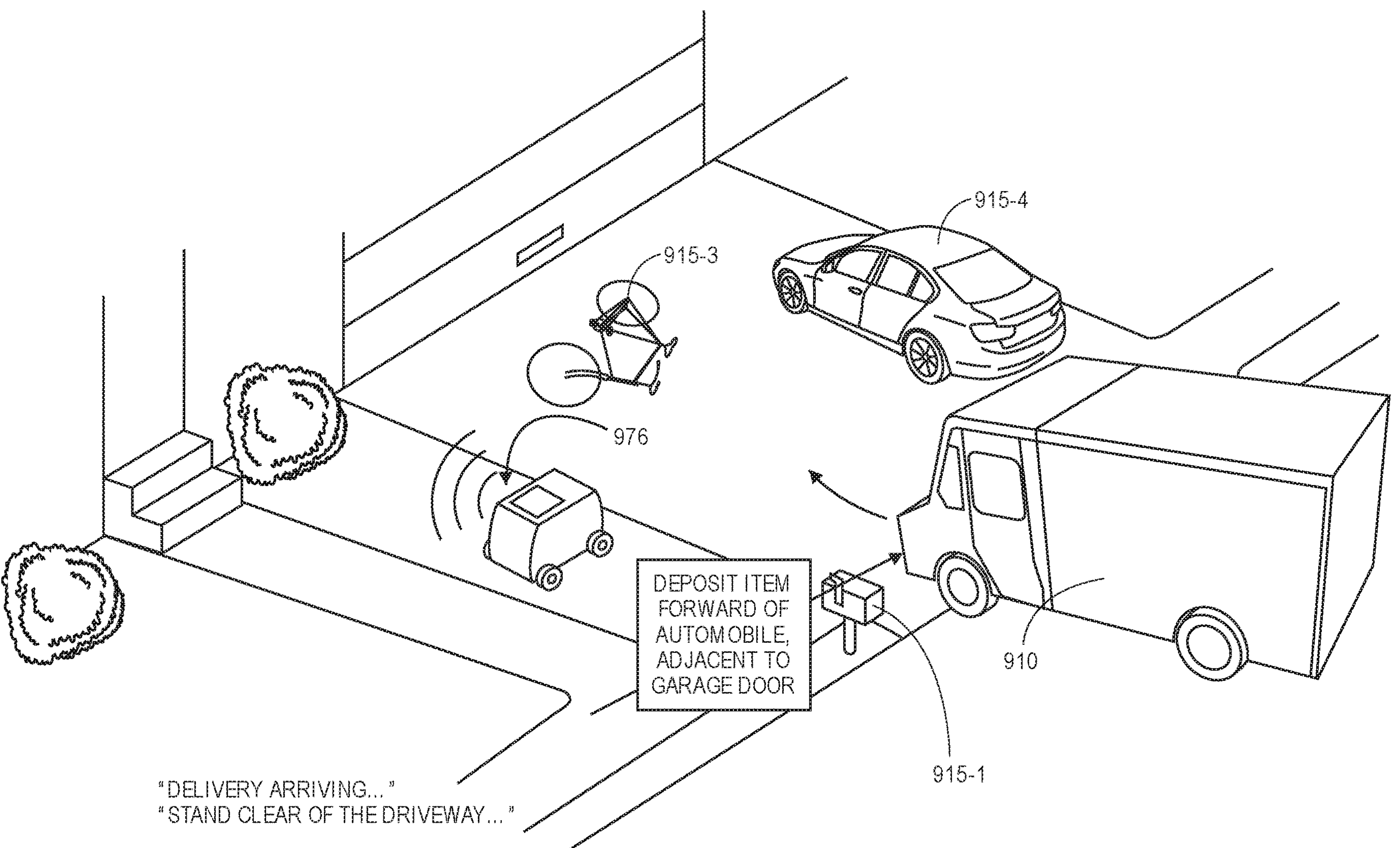

As is shown in FIG. 9D, the ground vehicle 950 provides instructions to the arriving delivery vehicle 910 regarding a location where a delivery is requested. The instructions may be provided to one or more computer systems or devices associated with either the delivery vehicle 910, or one or more workers aboard the delivery vehicle 910. Such instructions may identify the delivery area 935 with greater precision or clarity than may be available to traditional positioning systems, e.g., GPS, such as by identifying the delivery area 935 with respect to one or more landmarks or physical features that may not be identified by or evident to such systems. Additionally, the ground vehicle 950 also provides audible feedback in the form of one or more acoustic signals by a feedback device 976, informing any passersby or other animals that the delivery vehicle 910 is arriving. Alternatively, or additionally, the feedback device 976 may be configured to provide any other form of feedback, including but not limited to visible feedback (e.g., flashing lights), haptic feedback, or one or more electronic messages to any computer devices or systems that may be within a vicinity of the home 945 or the delivery area 935 (e.g., Bluetooth® signals).

In some embodiments, an autonomous ground vehicle may be configured to select a delivery area for a human courier, and to provide guidance to the human courier during a delivery, while also monitoring the completion of the delivery using one or more sensors thereon. Referring to FIGS. 10A through 10D, views of aspects of one system for selecting delivery modes or delivery areas using autonomous ground vehicles in accordance with embodiments of the present disclosure are shown. Except where otherwise noted, reference numerals preceded by the number "10" in FIGS. 10A through 10D refer to elements that are similar to elements having reference numerals preceded by the number "9" in FIGS. 9A through 9D, by the number "8" in FIGS. 8A through 8E, by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 10A:
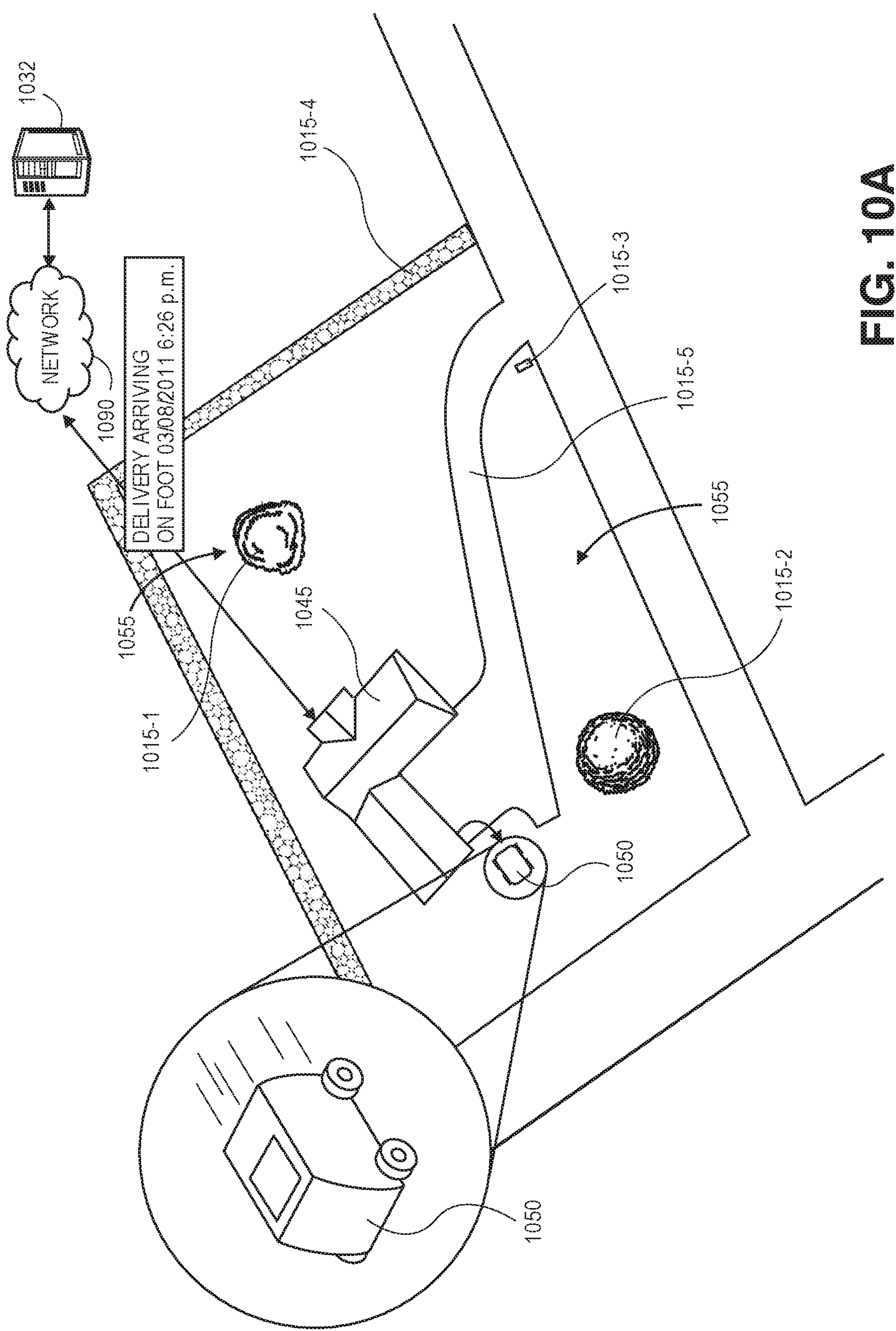
FIGS. 10A through 10D are views of aspects of one system for selecting delivery modes or delivery areas using autonomous ground vehicles in accordance with embodiments of the present disclosure.

As is shown in FIG. 10A, a server 1032 provides an instruction or message to one or more computer devices associated with a home 1045, via a network 1090. The instruction indicates that a courier is arriving with a delivery at a scheduled date and time. Upon receiving the instruction, a ground vehicle 1050 departs the home 1045 to begin surveying grounds 1055 within a vicinity of the home 1045. As is also shown in FIG. 10A, the grounds 1055 include a number of physical features, such as a pair of trees 1015-1, 1015-2, a mailbox 1015-3, a stone wall 1015-4 provided along some of the boundaries of the grounds 1055, as well as a driveway 1015-5 leading from one street to the home 1045 across the grounds 1055.

Figure 10B:
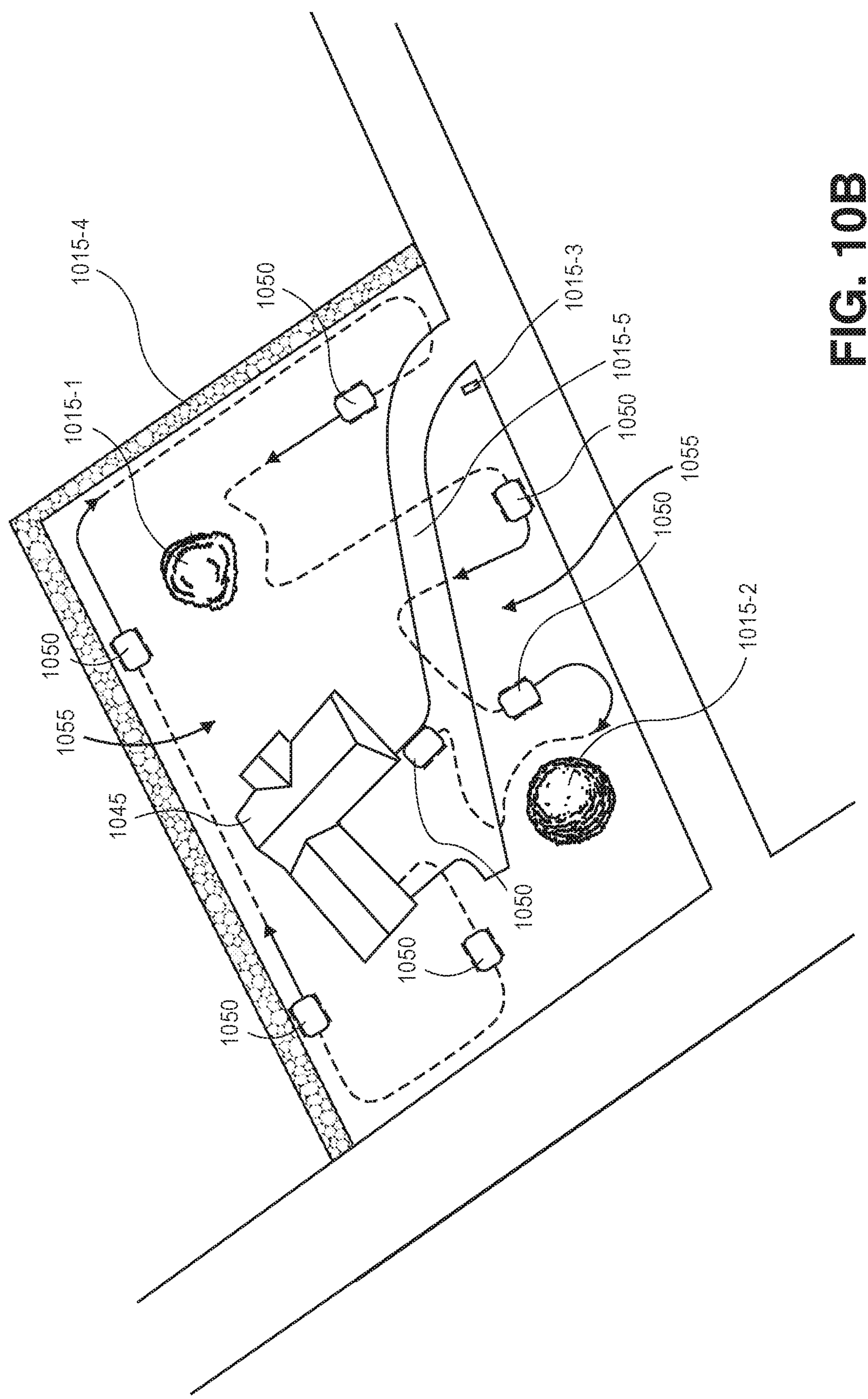
Figure 10C:
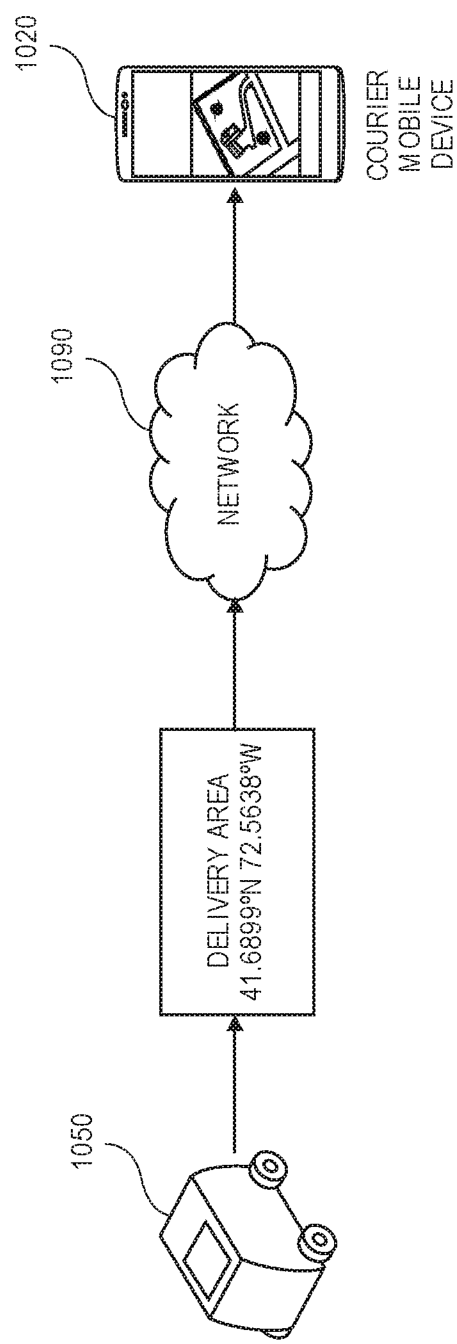

As is shown in FIG. 10B, the ground vehicle 1050 travels along the grounds 1055 in one or more regular or irregular patterns or directions, and at any velocities, while gathering information or data regarding features identified at specific points, such as surface textures, terrain features, weather conditions or moisture contents at such points. As is shown in FIG. 10C, based on the information or data captured thereby, the ground vehicle 1050 selects an area for receiving the delivery from the courier, and transmits one or more geolocations corresponding to the selected area to a mobile device 1020 of a courier over a network 1090.

Figure 10D:
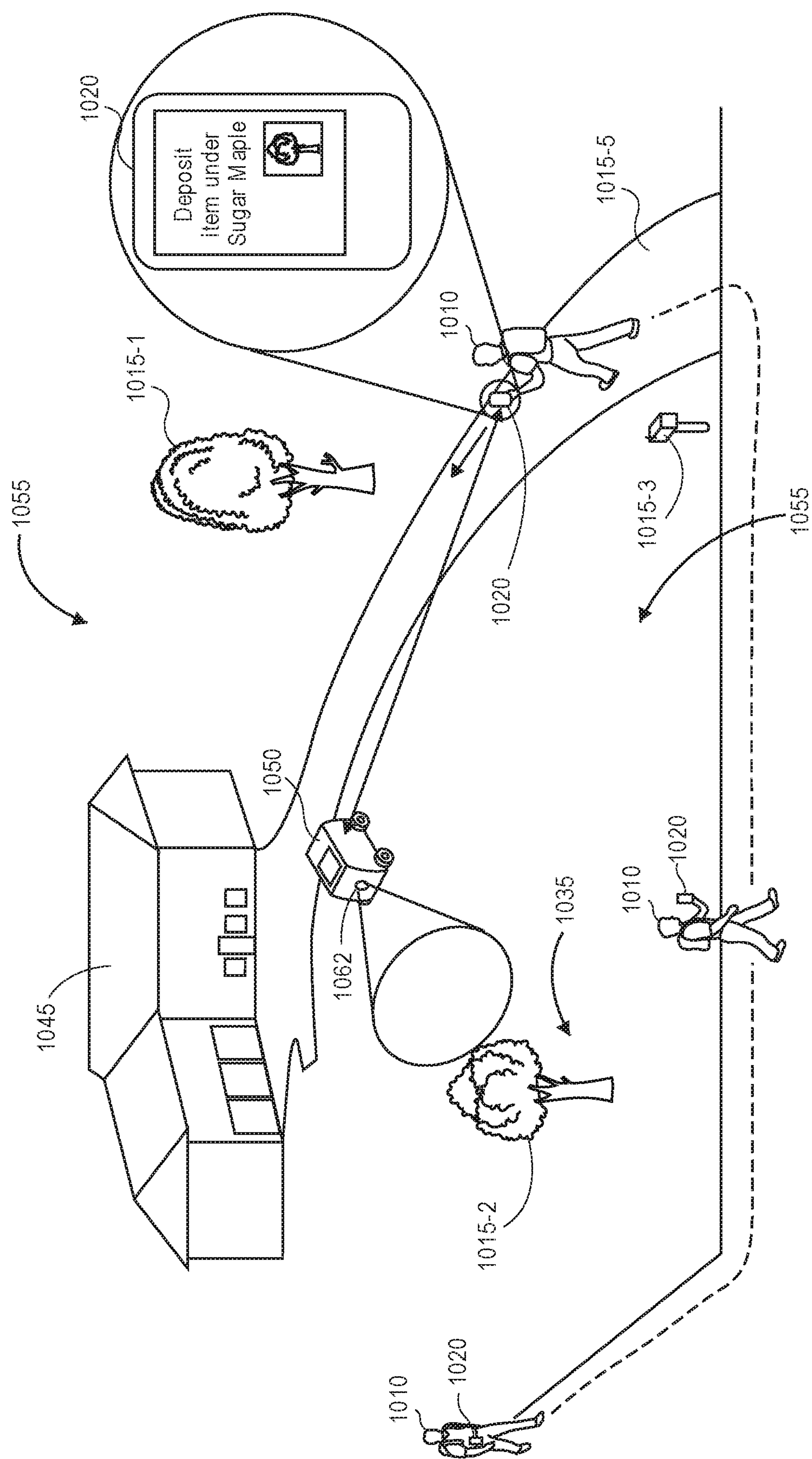

As is shown in FIG. 10D, upon receiving the information from the ground vehicle 1050, a courier 1010 bearing the mobile device 1020 travels along one or more paths to arrive at the grounds 1055. Upon the arrival of the courier 1010 at the grounds 1055, the ground vehicle 1050 engages in communication with the mobile device 1020 directly, e.g., via Bluetooth®, outside of a centralized network, or, alternatively, over the network 1090 of FIG. 10C. In particular, the ground vehicle 1050 may specifically identify a location 1035 on the grounds 1055 where the delivery is to be made, with greater precision or clarity than may be available to traditional positioning systems. Furthermore, as is also shown in FIG. 10D, the ground vehicle 1050 may also align one or more sensors 1062 (e.g., imaging devices or other sensors) to include the location 1035 within a field of view or operating range. In this regard, information or data captured using the sensors 1062 may be used to confirm that the delivery was made at the location 1035, and that the delivery complied with relevant rules, regulations or instructions.

Figure 11:
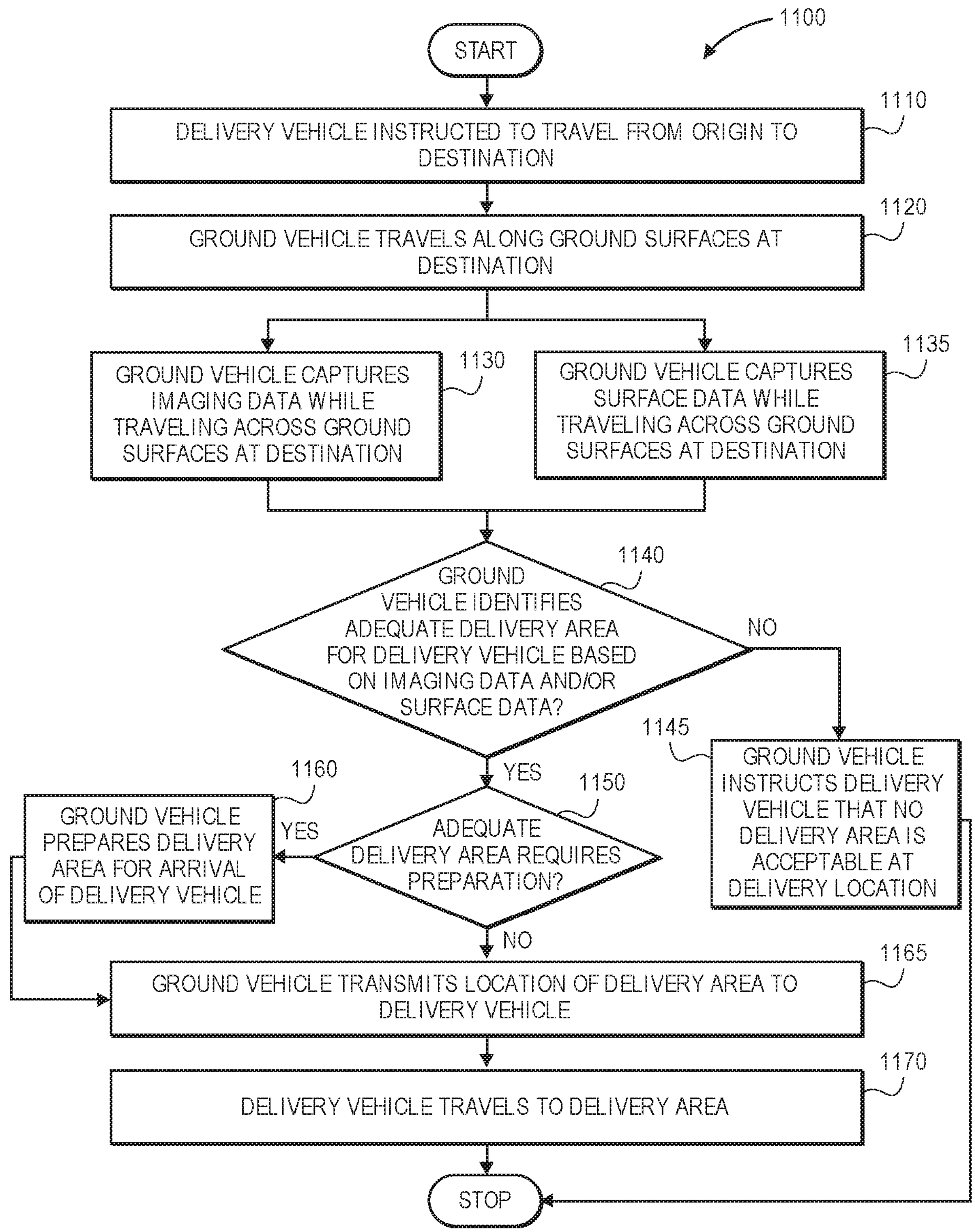
FIG. 11 is a flow chart of one process for selecting delivery modes or delivery areas using autonomous ground vehicles in accordance with embodiments of the present disclosure.

As is discussed above, an autonomous ground vehicle may identify an area where a delivery or one or more other tasks or evolutions is to take place within a region or space, and may take one or more actions to clear or otherwise prepare the area for the delivery or other tasks or evolutions, such as by removing one or more natural or artificial obstructions therefrom, or by otherwise making the area more ready to receive the delivery vehicle. Referring to FIG. 11, a flow chart 1100 of one process for selecting delivery modes or delivery areas using autonomous ground vehicles in accordance with embodiments of the present disclosure is shown. At box 1110, a delivery vehicle, such as an aerial vehicle, an automobile or another ground-based vehicle or, alternatively, a courier, is instructed to travel from an origin to a destination. At box 1120, a ground vehicle travels across ground surfaces at the destination, in one or more regular or irregular patterns or directions, and at constant or varying velocities. The destination may include one or more homes or other structures, and the ground surfaces may be yards, patios, driveways, sidewalks, walkways, streets or other surfaces within a vicinity of the one or more homes or other structures.

At box 1130, the ground vehicle captures imaging data while traveling across the ground surfaces at the destination. In some embodiments, the imaging data may include visual imaging data, e.g., color, grayscale or black-and-white images, or depth imaging data, e.g., ranges or distances to objects, that may be captured using imaging devices provided aboard the ground vehicle and having fields of view aligned at any orientation with respect to a direction of travel of the ground vehicle. In parallel, at box 1135, the ground vehicle also captures surface data while traveling across the ground surfaces at the destination, including angles of inclination, data regarding surface terrain (e.g., composition, moisture, or the like), or any other data that may be captured using one or more sensors aboard the ground vehicle.

At box 1140, whether the ground vehicle has identified an adequate delivery area for the delivery vehicle at the destination is determined. For example, based on one or more anticipated operating conditions or constraints of the delivery vehicle, e.g., dimensions, masses, traveling speeds, minimum turn radii, acoustic emissions, speeds of rotating parts, minimum levels of visibility, or any others, as well as the ground conditions at the destination, the ground vehicle may determine whether any areas at the destination may safely accommodate the completion of a delivery of the delivery vehicle. If the ground vehicle is unable to identify any such areas, the process advances to box 1145, where the ground vehicle instructs the delivery vehicle that no acceptable delivery area exists at the destination, and the process ends.

If the ground vehicle identifies one or more adequate delivery areas for the delivery vehicle at the destination, however, then the process advances to box 1150, where whether the delivery area requires any further preparation is determined. A delivery area that would otherwise satisfy one or more operating conditions or constraints of the delivery vehicle, but includes one or more remediable faults may be identified as such at box 1140. Such faults may include the presence of one or more natural or artificial obstructions such as snow, toys, or other movable objects, as well as a low-lighting condition or any other defects that would preclude a delivery from taking place without further interaction. If none of the delivery areas identified at box 1140 requires any further preparation, then the process advances to box 1165, where the ground vehicle transmits the location of the delivery area to the delivery vehicle, either directly, e.g., outside of a centralized network, or over one or more networks such as the Internet.

If one or more of the delivery areas requires further preparation, however, then the process advances to box 1160, where the ground vehicle prepares a delivery area for the arrival of the delivery vehicle. In some embodiments, a ground vehicle may be outfitted or otherwise equipped with one or more appurtenances or features for marking, altering or modifying a surface in advance of the arrival of the delivery vehicle. For example, in some embodiments, a ground vehicle may be outfitted with one or more systems for applying paint, chalk or other substances to a surface or objects within a vicinity of the surface, depositing one or more lights or illuminators upon the surface, or blades or other tools for otherwise marking the surface or the objects, in order to visually designate a delivery area in a manner that may be detected and recognized by one or more sensors associated with a delivery vehicle or courier. Alternatively, or additionally, the ground vehicle may be outfitted with one or more lights or other illuminators that may be deployed in any number at the delivery area, in order to further enhance the visibility of the delivery area. The ground vehicle may also be configured to remove or minimize such markings, alterations or lights after a delivery or other task or evolution has been satisfactorily completed or, alternatively, canceled or postponed.

In some other embodiments, a ground vehicle may be outfitted with one or more plows or other tools for sanding or otherwise treating a surface that is covered by snow or plagued with ice or other adverse traveling conditions. In still other embodiments, a ground vehicle may be outfitted with one or more robotic arms having end effectors with grips or other tools for engaging one or more obstacles or obstructions that are temporarily or movably present within a delivery area. The ground vehicle may detect the presence of the one or more obstacles or obstructions, or otherwise determine that the delivery area requires further preparation, based on information or data captured using one or more sensors provided aboard the ground vehicle, or external sensors, e.g., imaging devices, microphones, thermometers, light sensors or other sensors.

At box 1160, the ground vehicle prepares the delivery area for the arrival of the delivery vehicle, e.g., by clearing any natural or artificial obstructions therefrom, or by enhancing the visibility of the delivery area in any manner.

If each of the delivery areas identified at box 1140 does not require any further preparation, or after the delivery area has been further prepared at box 1160, the process advances to box 1165, where the ground vehicle transmits the location (e.g., one or more sets of coordinates or geolocations) of the delivery area to the delivery vehicle. In some embodiments, the ground vehicle may transmit the location of the delivery area to the delivery vehicle, prior to performing further preparations, or during such further preparations, such as where an estimated time for completing the further preparations is less than an estimated transit time of the delivery vehicle to the delivery area. At box 1170, the delivery vehicle travels to the delivery area, e.g., by one or more optimal paths, and the process ends.

In accordance with some embodiments of the present disclosure, an autonomous ground vehicle may be configured to prepare an area or location for an arrival of one or more vehicles, such as a landing by one or more aerial vehicles. Referring to FIGS. 12A through 12E, views of aspects of one system for selecting delivery modes or delivery areas using autonomous ground vehicles in accordance with embodiments of the present disclosure are shown. Except where otherwise noted, reference numerals preceded by the number "12" in FIGS. 12A through 12E refer to elements that are similar to elements having reference numerals preceded by the number "10" in FIGS. 10A through 10D, by the number "9" in FIGS. 9A through 9D, by the number "8" in FIGS. 8A through 8E, by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 12A:
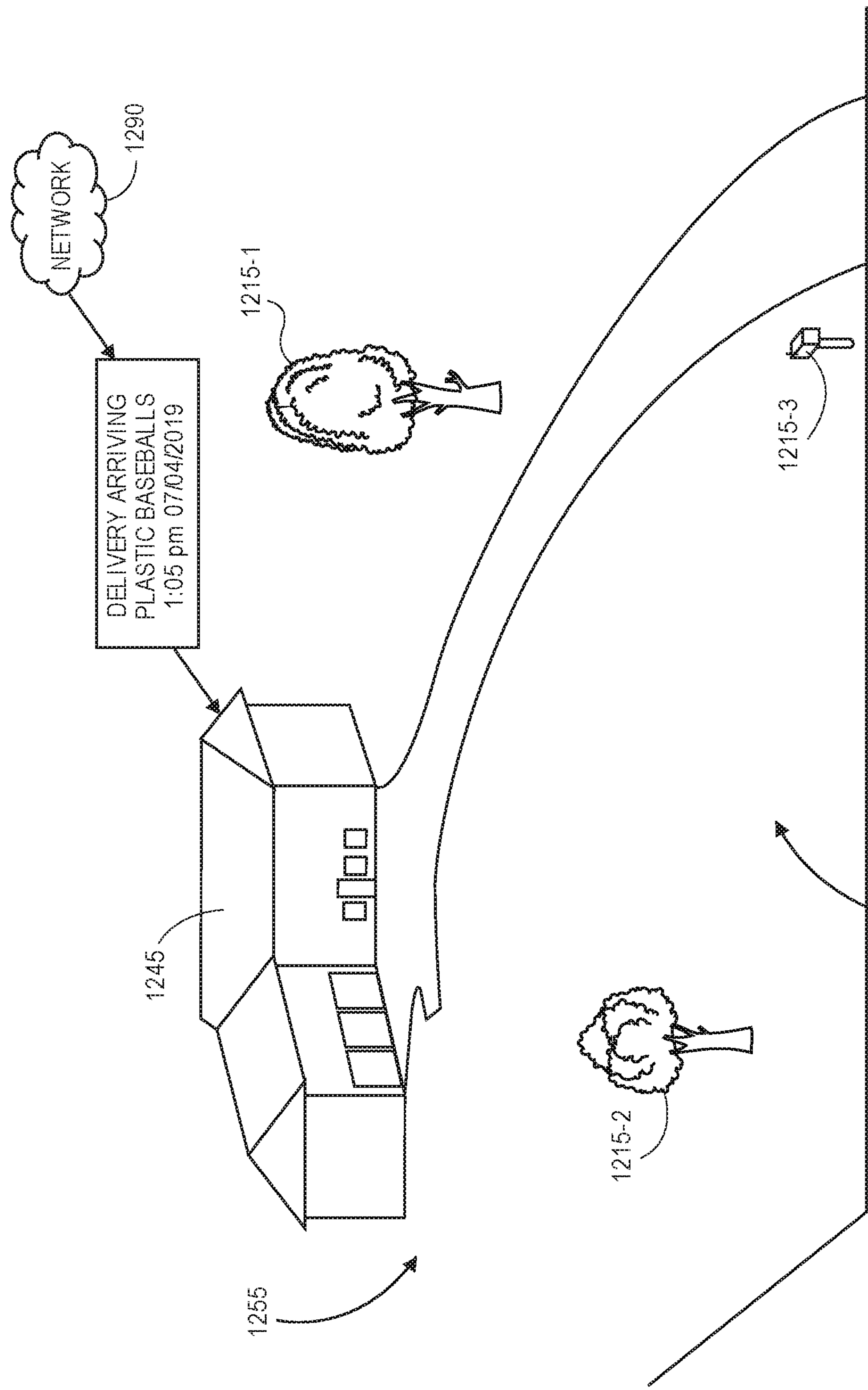
FIGS. 12A through 12E are views of aspects of one system for selecting delivery modes or delivery areas using autonomous ground vehicles in accordance with embodiments of the present disclosure.

As is shown in FIG. 12A, a customer at a home 1245 is informed via a tablet computer, a smartphone, a laptop computer, a desktop computer, a smart speaker, a wristwatch, a television, or any other system connected to a network 1290 that a delivery of an item will arrive at a scheduled date and time. As is also shown in FIG. 12A, grounds 1255 surrounding the home 1245 include a plurality of obstructions, e.g., a pair of trees 1215-1, 1215-2 and a mailbox 1215-3.

Figure 12B:
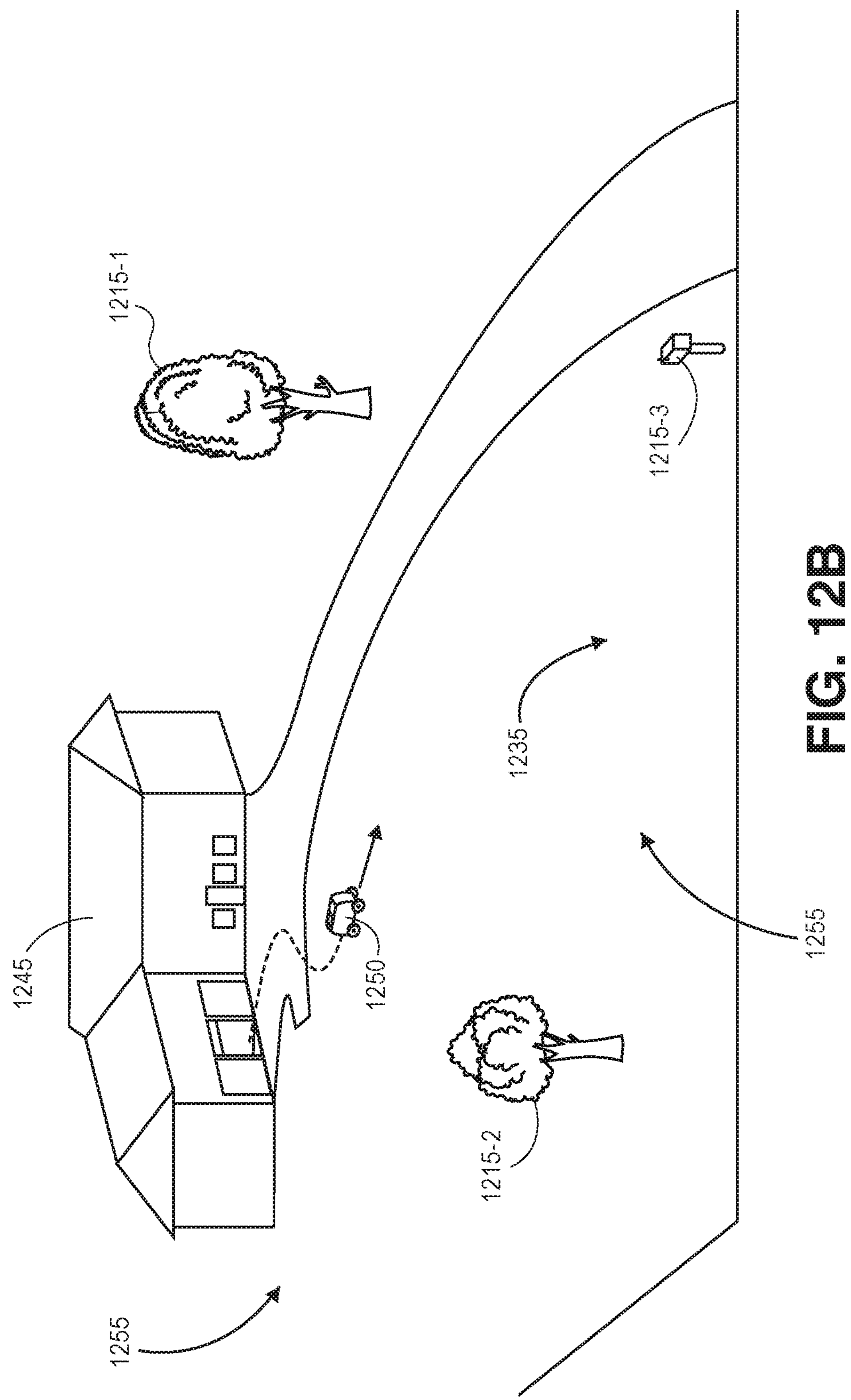
Figure 12C:
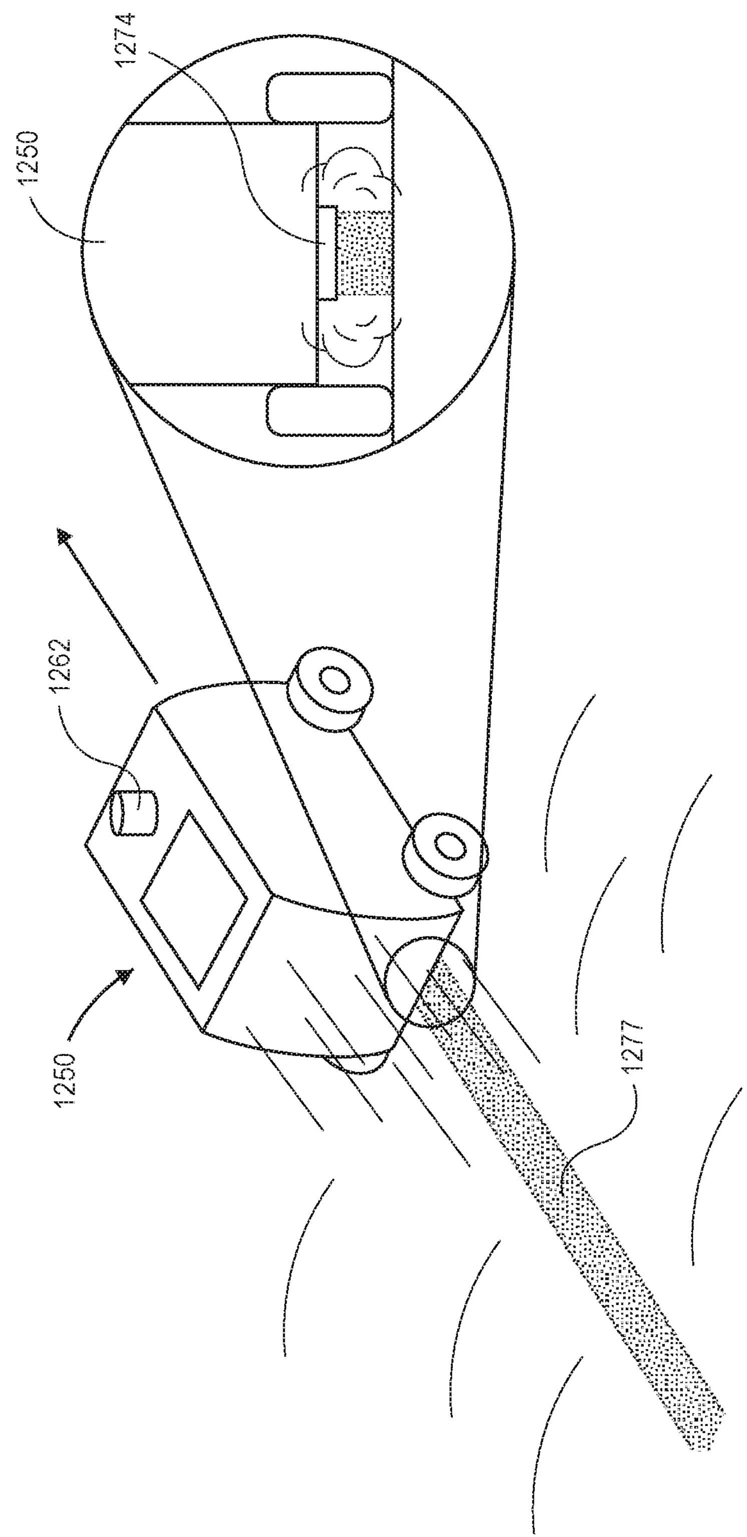
Figure 12D:
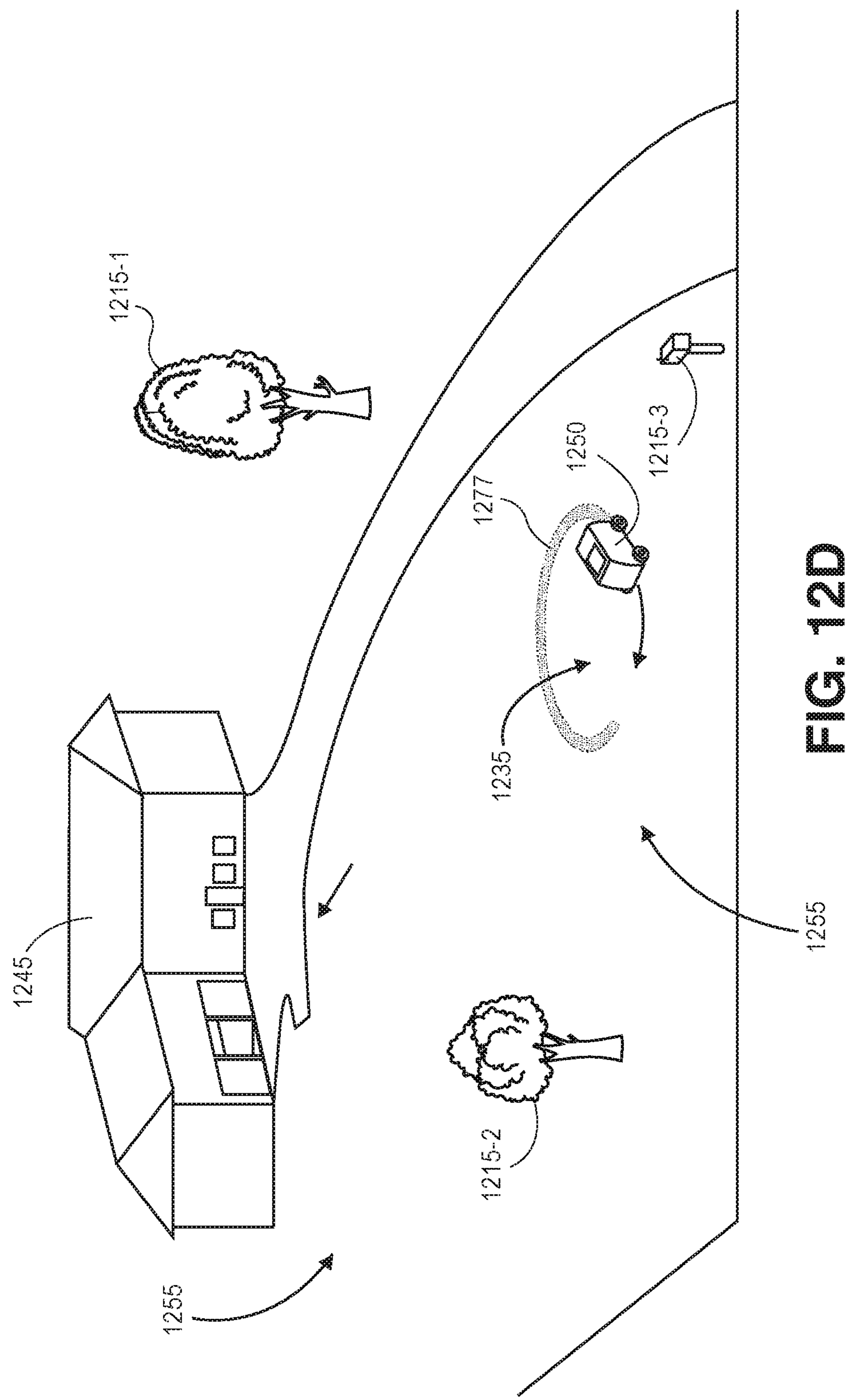

As is shown in FIG. 12B, as the instruction is received, or at a later time, an autonomous ground vehicle 1250 departs from the home 1245 and travels to a landing area 1235 on the grounds 1255. As is shown in FIGS. 12C and 12D, an applicator 1274 aboard the autonomous ground vehicle 1250 applies a line 1277 or other marking of paint, chalk or one or more other substances to surfaces at the landing area 1235. Alternatively, where the autonomous ground vehicle 1250 is a lawnmower, the autonomous ground vehicle 1250 may include one or more tools or other implements for cutting, carving or shaping the line 1277 into the surfaces at the landing area 1235. Alternatively, the autonomous ground vehicle 1250 may be further configured to deposit one or more lights or other illuminators, which may be discrete units or components of a single unit having one or more power sources (e.g., batteries or solar cells) in a line or in one or more other orientations or configurations to designate the landing area 1235 accordingly.

Figure 12E:
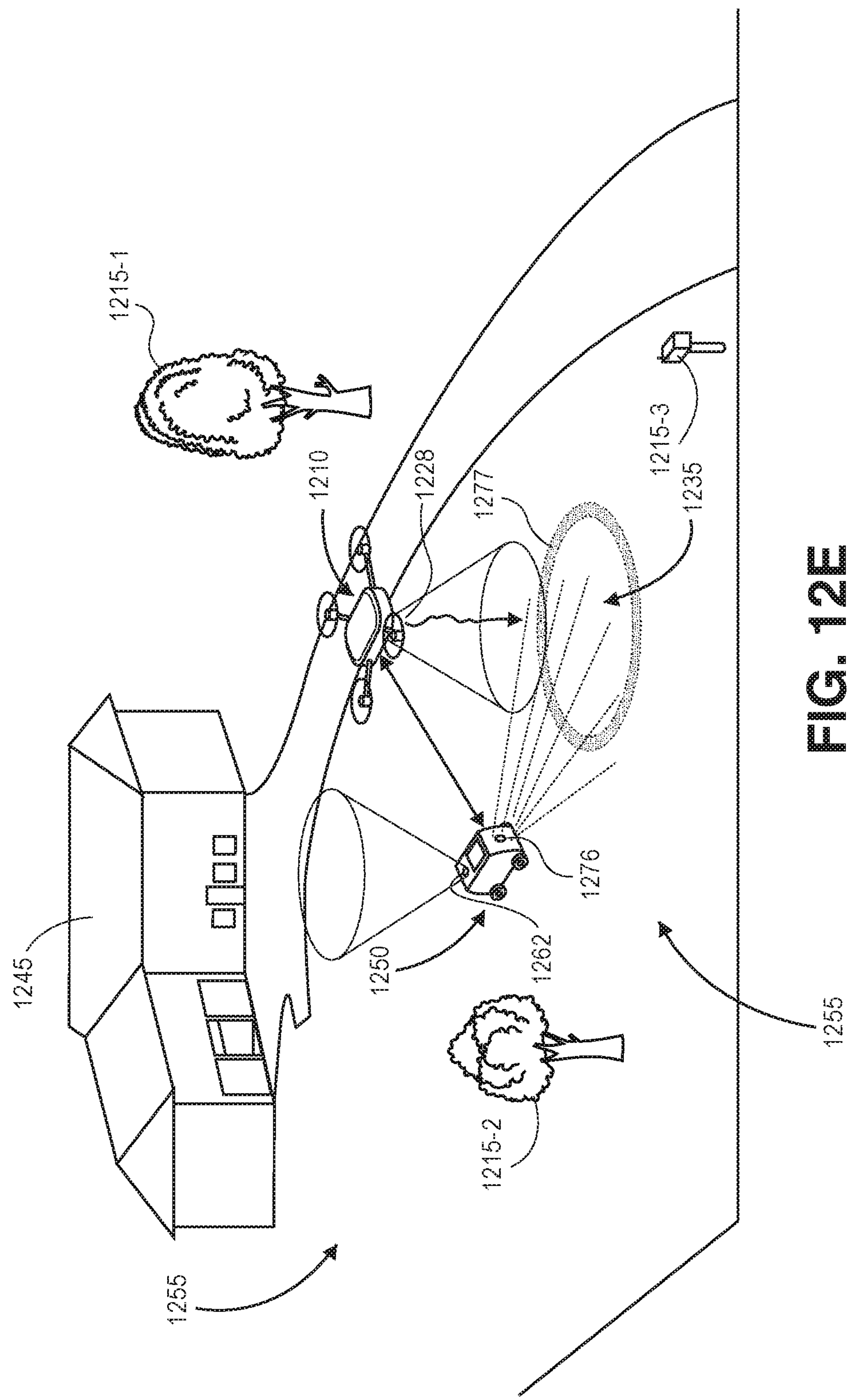

The line 1277 acts as a visual indicator of one or more boundaries of the landing area 1235. As is shown in FIG. 12E, after the line 1277 has been applied to the surfaces at the landing area 1235, an aerial vehicle 1210 may capture imaging data using an imaging device 1228 and recognize the line 1277 depicted therein before descending to land at the landing area 1235. As is further shown in FIG. 12E, the autonomous ground vehicle 1250 remains within a vicinity of the landing area 1235 to perform one or more tasks or functions that complement the landing of the aerial vehicle 1210. For example, the autonomous ground vehicle 1250 may further enhance the visibility of the line 1277 and/or the landing area 1235 by projecting light onto the landing area 1235 by one or more illuminators 1276. Additionally, the autonomous ground vehicle 1250 may also capture imaging data from above the autonomous ground vehicle 1250, e.g., to monitor the arrival of the aerial vehicle 1210, or to otherwise identify any other objects or hazards. The autonomous ground vehicle 1250 and the aerial vehicle 1210 may remain in direct communication with one another, or may communicate over one or more networks, e.g., the network 1290, as the aerial vehicle 1210 approaches the landing area 1235.

As is discussed above, an autonomous ground vehicle may be outfitted or equipped to prepare one or more delivery areas at a destination for the arrival of one or more delivery vehicles in any manner. Referring to FIGS. 13A through 13E, views of aspects of one system for selecting delivery modes or delivery areas using autonomous ground vehicles in accordance with embodiments of the present disclosure are shown. Except where otherwise noted, reference numerals preceded by the number "13" in FIGS. 13A through 13E refer to elements that are similar to elements having reference numerals preceded by the number "12" in FIGS. 12A through 12E, by the number "10" in FIGS. 10A through 10D, by the number "9" in FIGS. 9A through 9D, by the number "8" in FIGS. 8A through 8E, by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 13A:
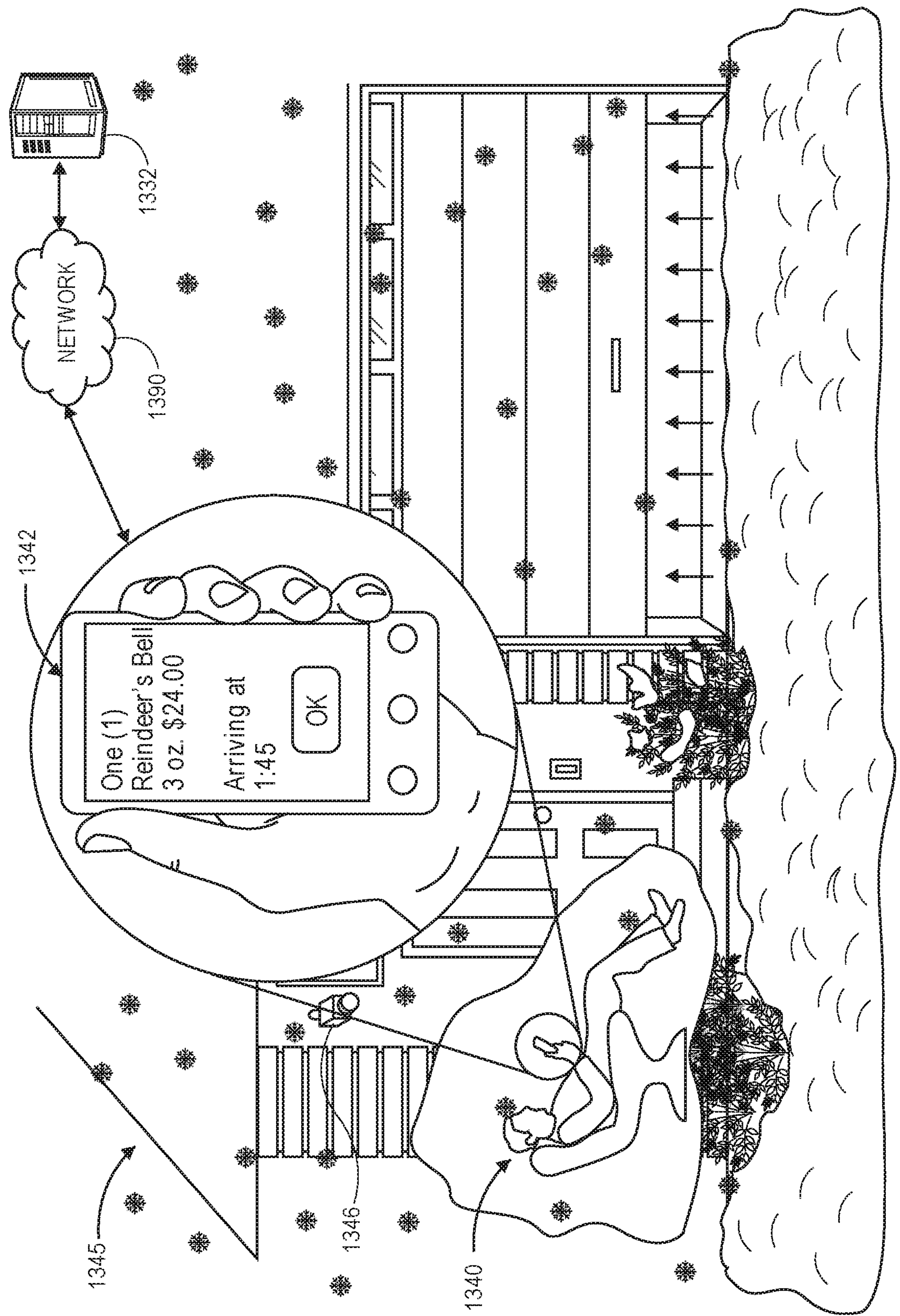
FIGS. 13A through 13E are views of aspects of one system for selecting delivery modes or delivery areas using autonomous ground vehicles in accordance with embodiments of the present disclosure.
Figure 13B:
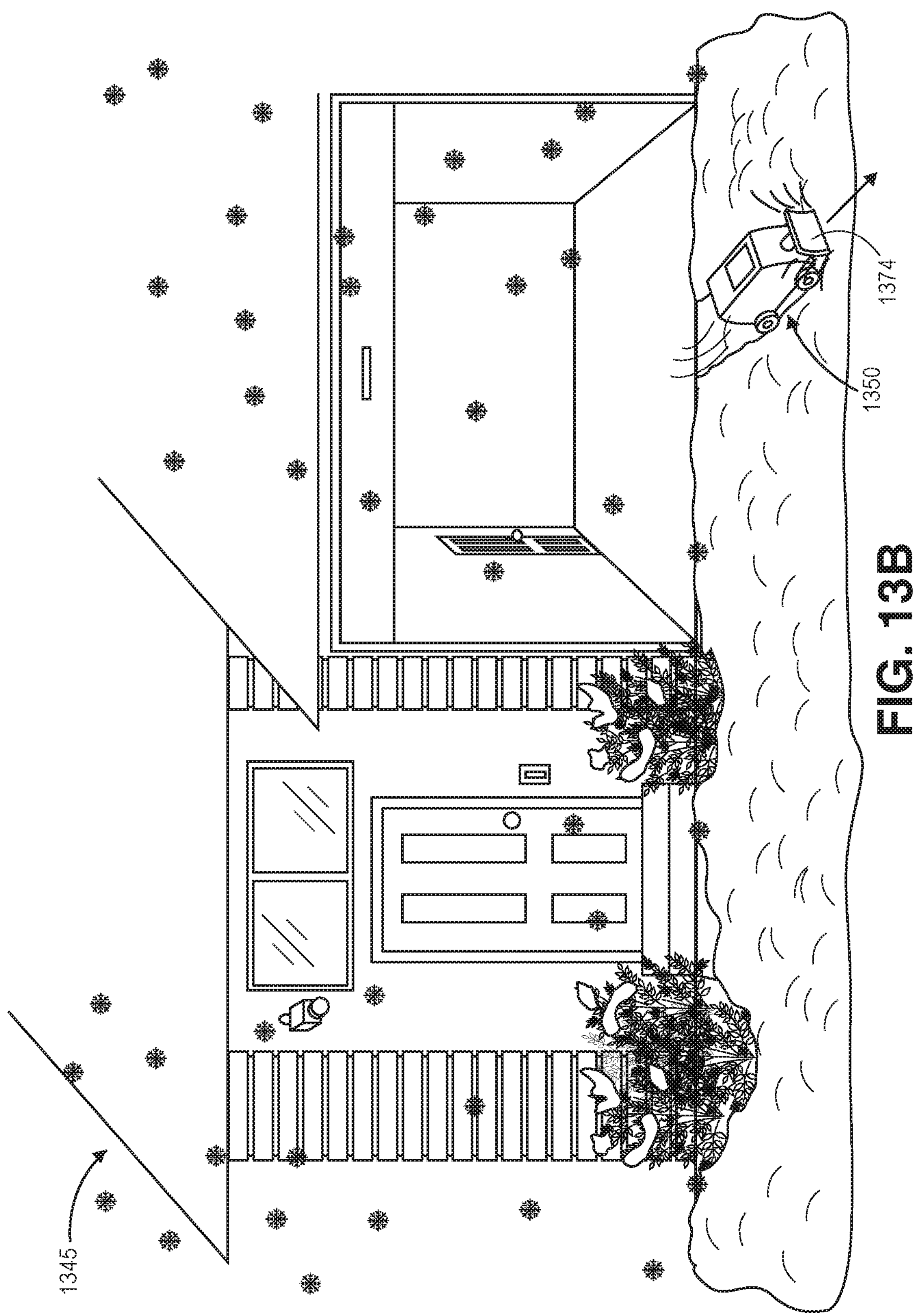

As is shown in FIG. 13A, a customer 1340 at a home 1345 having an imaging device 1346 mounted to an external surface receives a message on a mobile device 1342 indicating that a delivery of an item will arrive at a scheduled date and time. Grounds 1355 surrounding the home 1345 are covered with snow, which continues to fall. As is shown in FIG. 13B, as the message is received, or at a later time, an autonomous ground vehicle 1350 having a plow implement 1374 disposed at a forward end departs from the home 1345, and clears a path through the snow using the plow implement 1374.

Figure 13C:
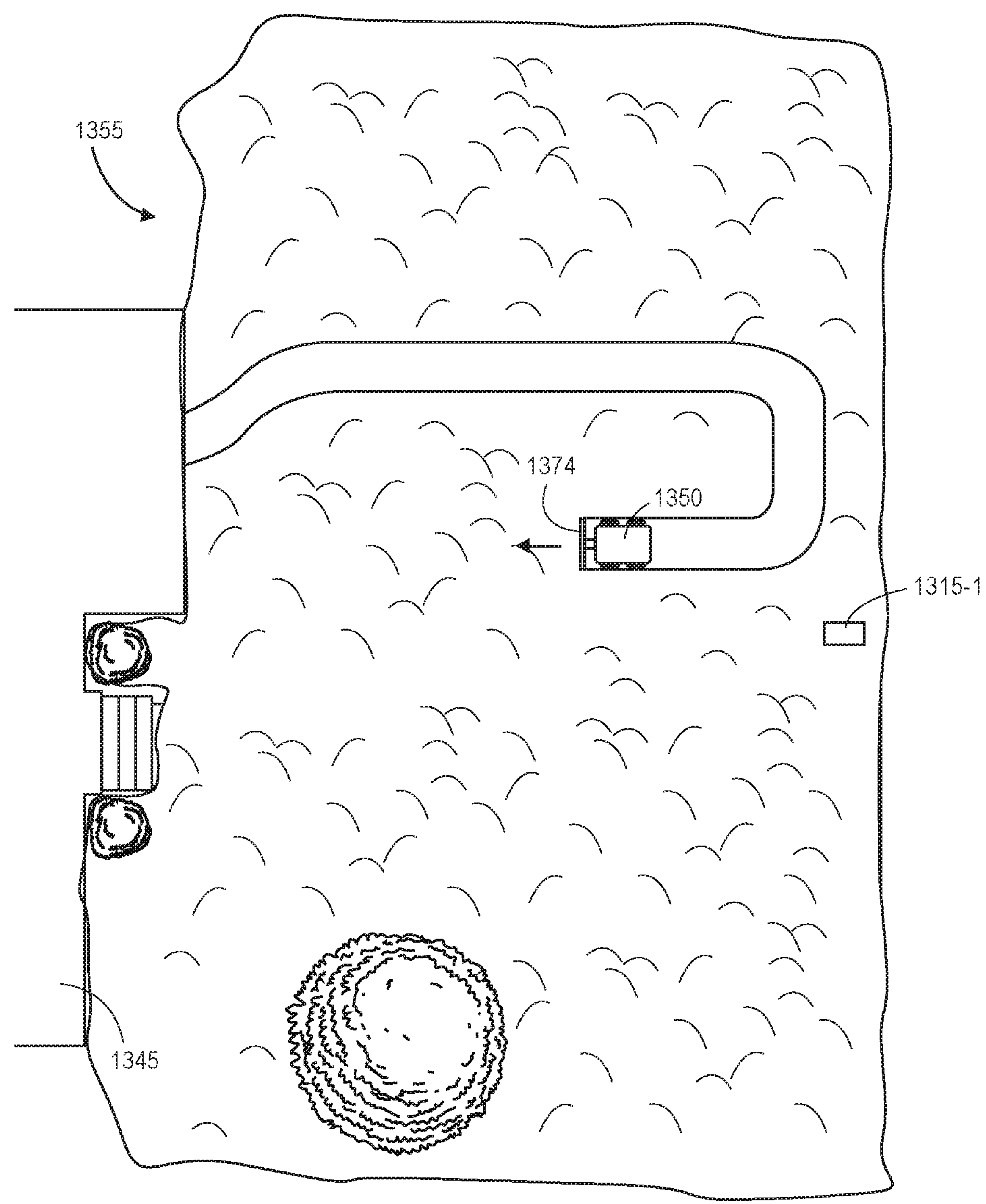
Figure 13D:
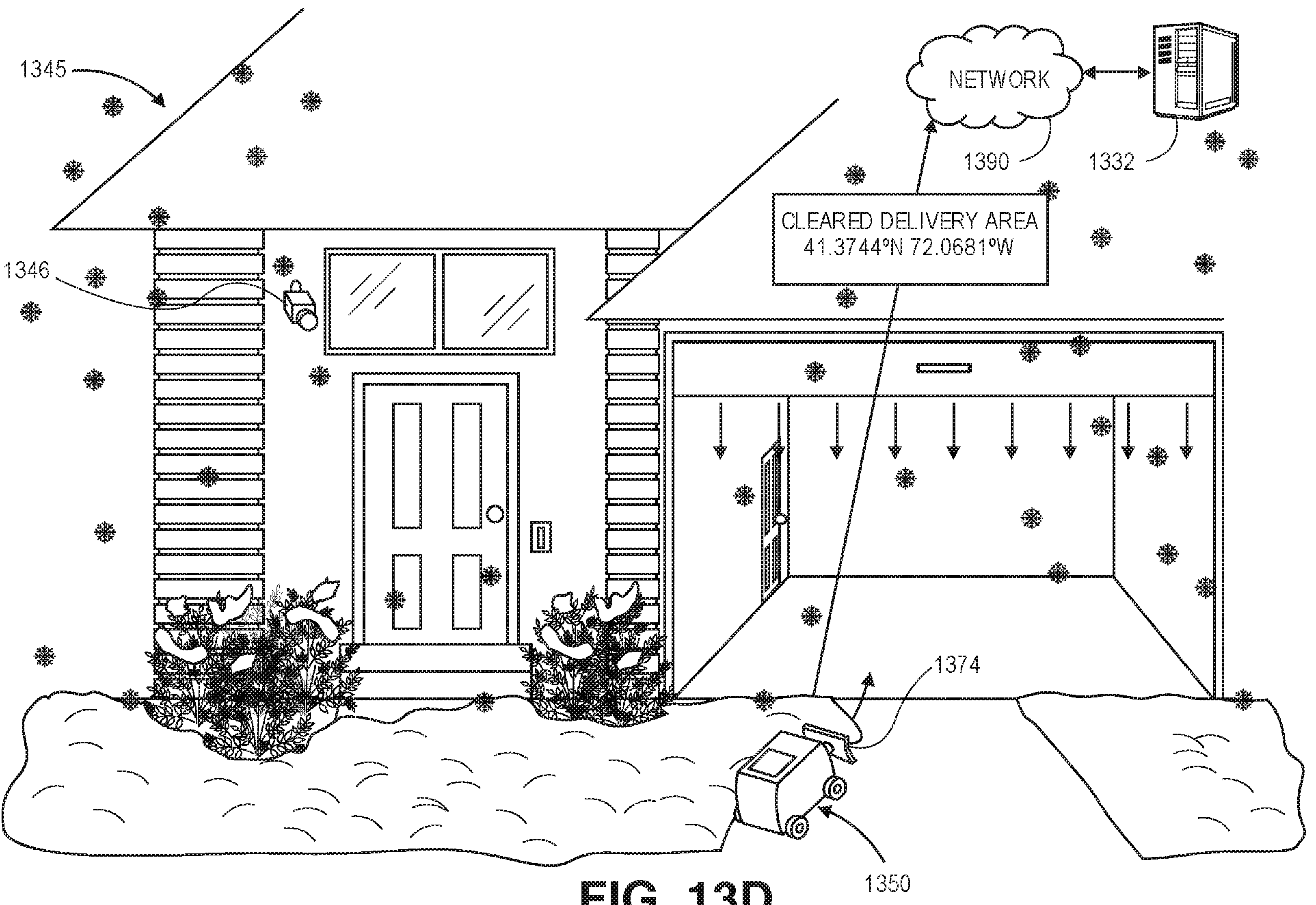

As is shown in FIG. 13C, the autonomous ground vehicle 1350 travels in regular or irregular patterns on one or more surfaces of the grounds 1355 to clear snow therefrom using the plow implements 1374. As is shown in FIG. 13D, after having cleared a delivery area 1335 on the grounds 1355 of snow, the autonomous ground vehicle 1350 reports a position associated with the delivery area 1335, e.g., a centroid of the delivery area 1335, to a server 1332 over a network 1390. The position may include one or more sets of coordinates or geolocations of the delivery area 1335, along with any other information or data regarding the delivery area 1335, such as an estimate of prevailing weather conditions, or a time until which the delivery area 1335 may be presumed to be ready to receive the delivery of the item.

Figure 13E:
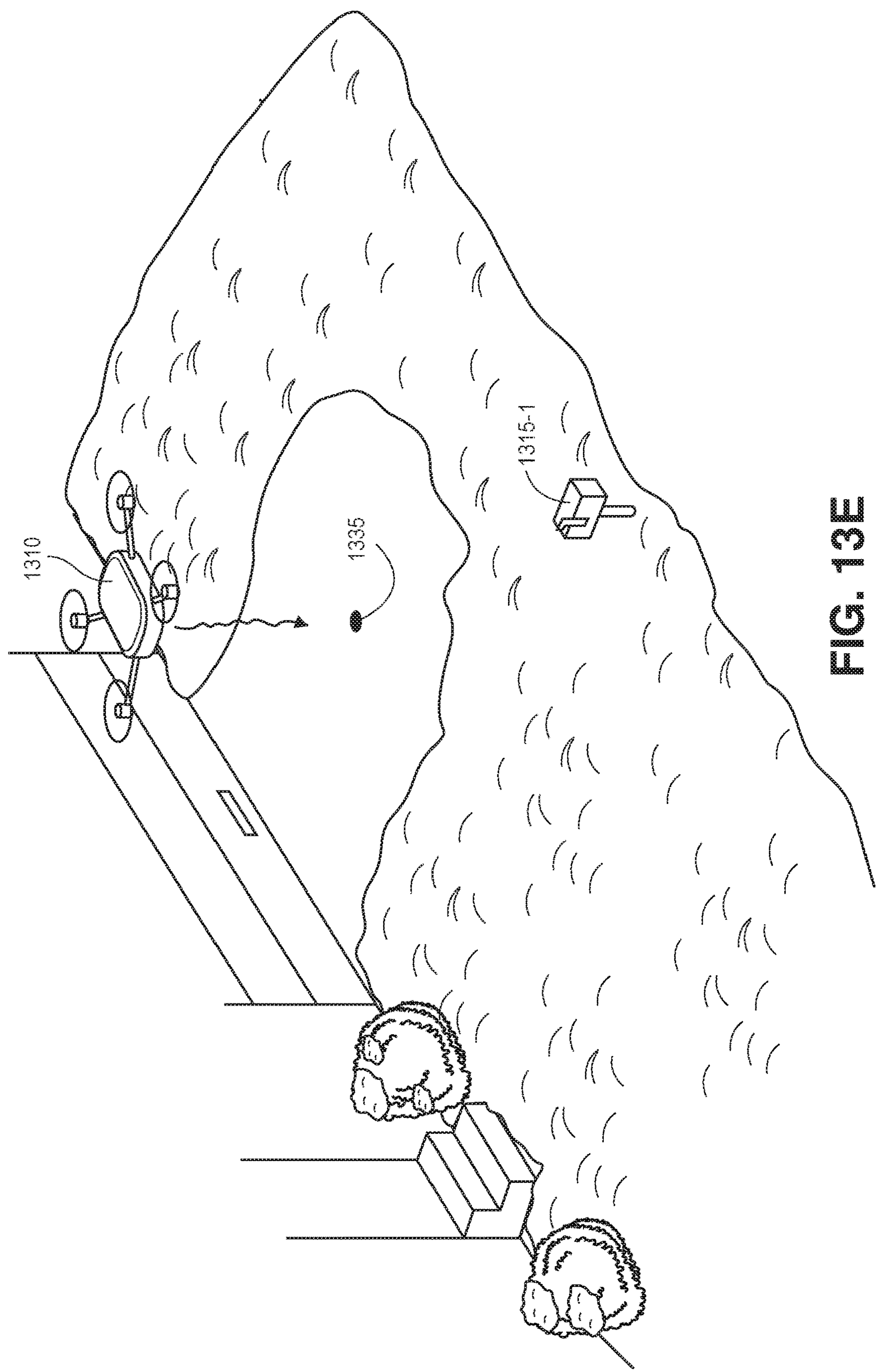

As is shown in FIG. 13E, an aerial vehicle 1310 lands in the delivery area 1335 to complete the delivery. Subsequently, the aerial vehicle 1310 may retrieve one or more items from the home 1345 or complete any other tasks or evolutions prior to taking off from the delivery area 1335.

Referring to FIGS. 14A through 14D, views of aspects of one system for selecting delivery modes or delivery areas using autonomous ground vehicles in accordance with embodiments of the present disclosure are shown. Except where otherwise noted, reference numerals preceded by the number "14" in FIGS. 14A through 14D refer to elements that are similar to elements having reference numerals preceded by the number "13" in FIGS. 13A through 13E, by the number "12" in FIGS. 12A through 12E, by the number "10" in FIGS. 10A through 10D, by the number "9" in FIGS. 9A through 9D, by the number "8" in FIGS. 8A through 8E, by the number "6" in FIGS. 6A through 6D, by the number "5" in FIGS. 5A through 5G, by the number "4" in FIG. 4, by the number "2" in FIG. 2A or FIG. 2B or by the number "1" shown in FIGS. 1A through 1J.

Figure 14A:
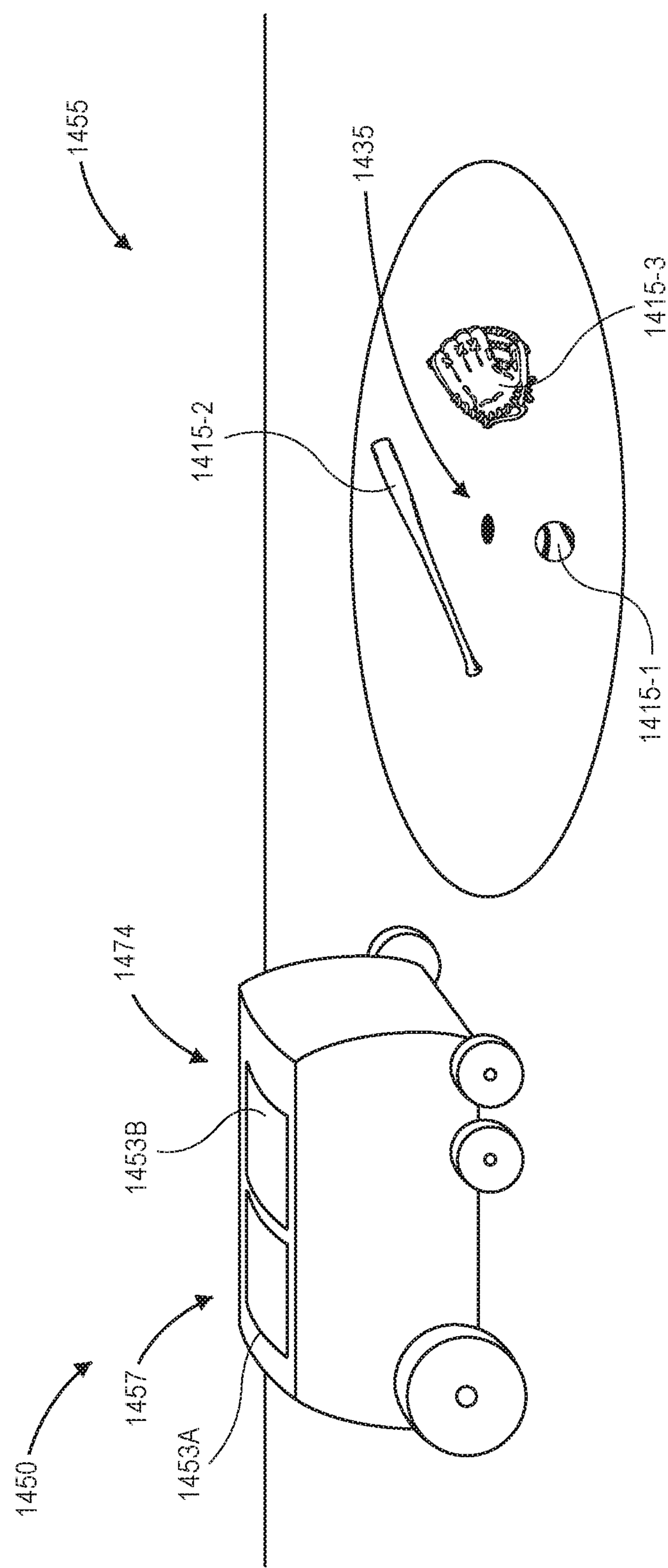
FIGS. 14A through 14D are views of aspects of one system for selecting delivery modes or delivery areas using autonomous ground vehicles in accordance with embodiments of the present disclosure.

As is shown in FIG. 14A, a delivery area 1435 on grounds 1455 features a number of obstructions, including a ball 1415-1, a bat 1415-2 and a glove 1415-3. Positions of the ball 1415-1, the bat 1415-2 or the glove 1415-3, or any other obstacles or obstructions, may be identified or determined on any basis, including but not limited to information or data captured by one or more sensors aboard a vehicle, e.g., the ground vehicle 1450 or others, or one or more other sensors, such as the digital camera 146 shown in FIG. 1A, that are provided in one or more fixed locations or in association with one or more mobile systems. As is also shown in FIG. 14A, a ground vehicle 1450 approaches the delivery area 1435, in order to prepare the delivery area 1435 to receive one or more delivery vehicles. The ground vehicle 1450 includes a storage compartment 1457 covered by a door 1453A, and a robotic arm 1474 having a grip or claw at an end effector. The robotic arm 1474 is covered by a door 1453B.

Figure 14B:
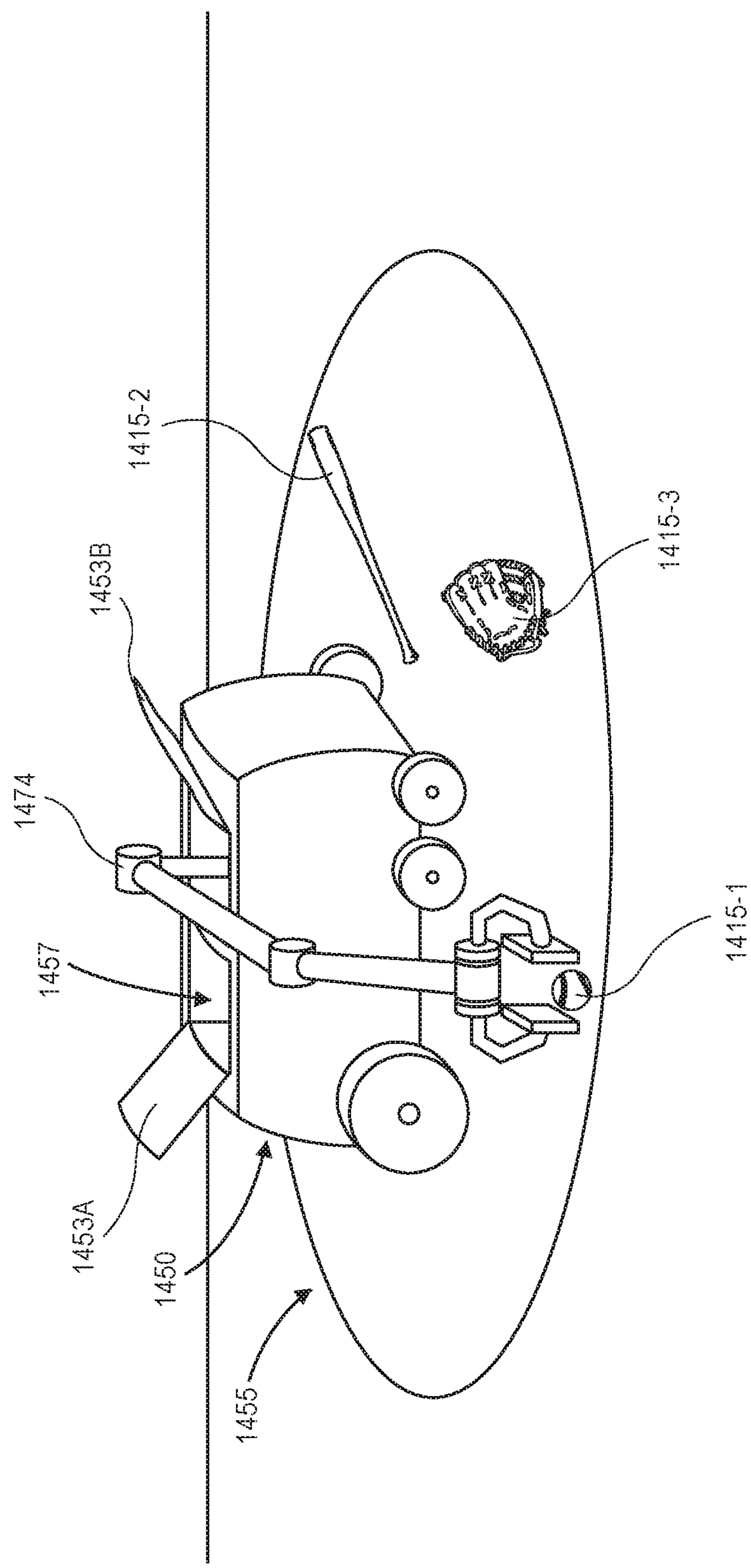

As is shown in FIG. 14B, the ground vehicle 1450 has approached the ball 1415-1. The ground vehicle 1450 opens the door 1453A to expose the storage compartment 1457, and opens the door 1453B to expose the robotic arm 1474. As is also shown in FIG. 14B, the robotic arm 1474 may be configured to extend over one side (e.g., a starboard side) of the ground vehicle 1450 to retrieve the ball 1415-1 from the grounds 1455 within the delivery area 1435. The robotic arm 1474 may be operated in response to one or more control signals generated by a control system (not shown) provided aboard the ground vehicle 1450 or in one or more external locations.

Figure 14C:
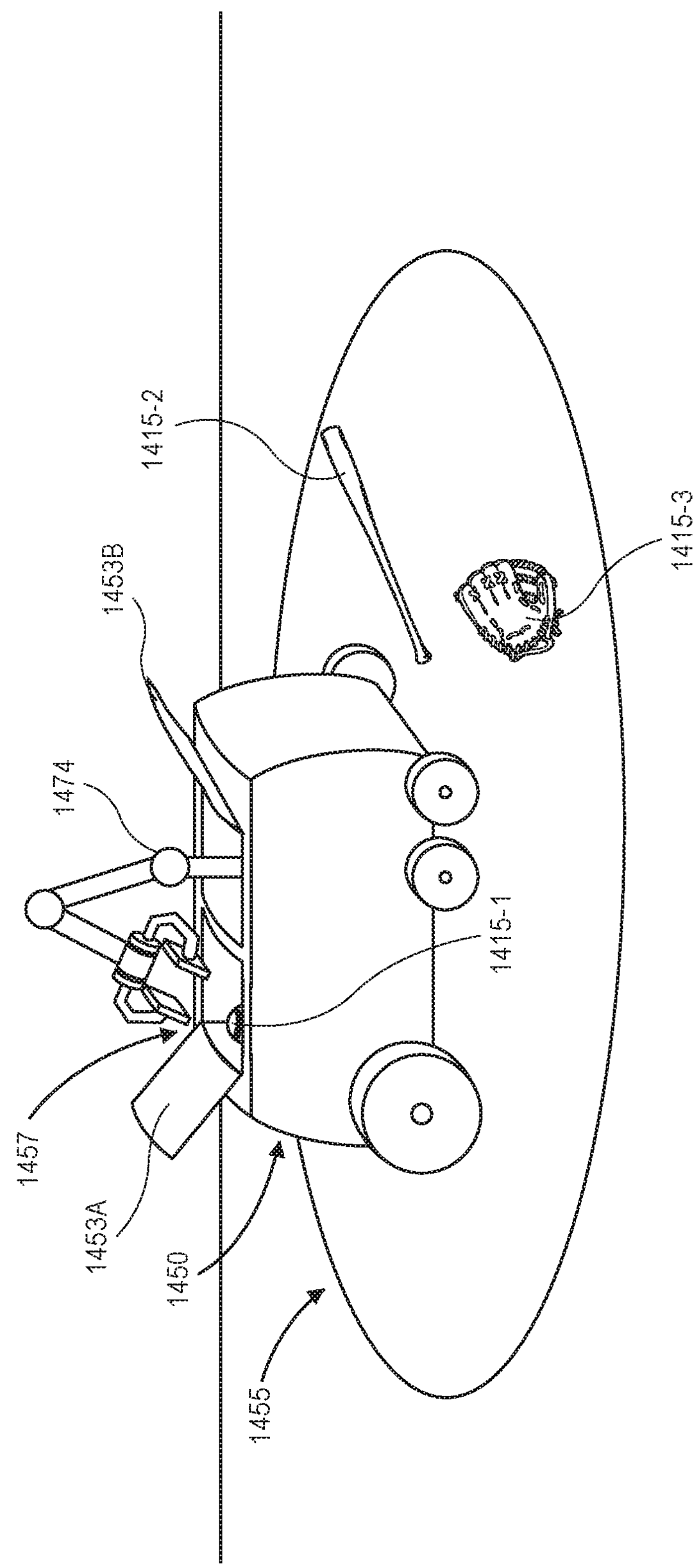

As is shown in FIG. 14C, upon retrieving the ball 1415-1, the robotic arm 1474 may be configured to translate and/or rotate the ball 1415-1 into position above or within the storage compartment 1457 before releasing the ball 1415-1. Similarly, the ground vehicle 1450 may also retrieve the bat 1415-2 and the glove 1415-3 (not shown), e.g., by programming the robotic arm 1474 to retrieve the bat 1415-2 and the glove 1415-3 or to translate and/or rotate the bat 1415-2 and the glove 1415-3 over the storage compartment 1457 prior to releasing the bat 1415-2 and the glove 1415-3, and advancing the ground vehicle 1450 into position within a range of the robotic arm 1474 from the bat 1415-2 and the glove 1415-3, as necessary.

Figure 14D:
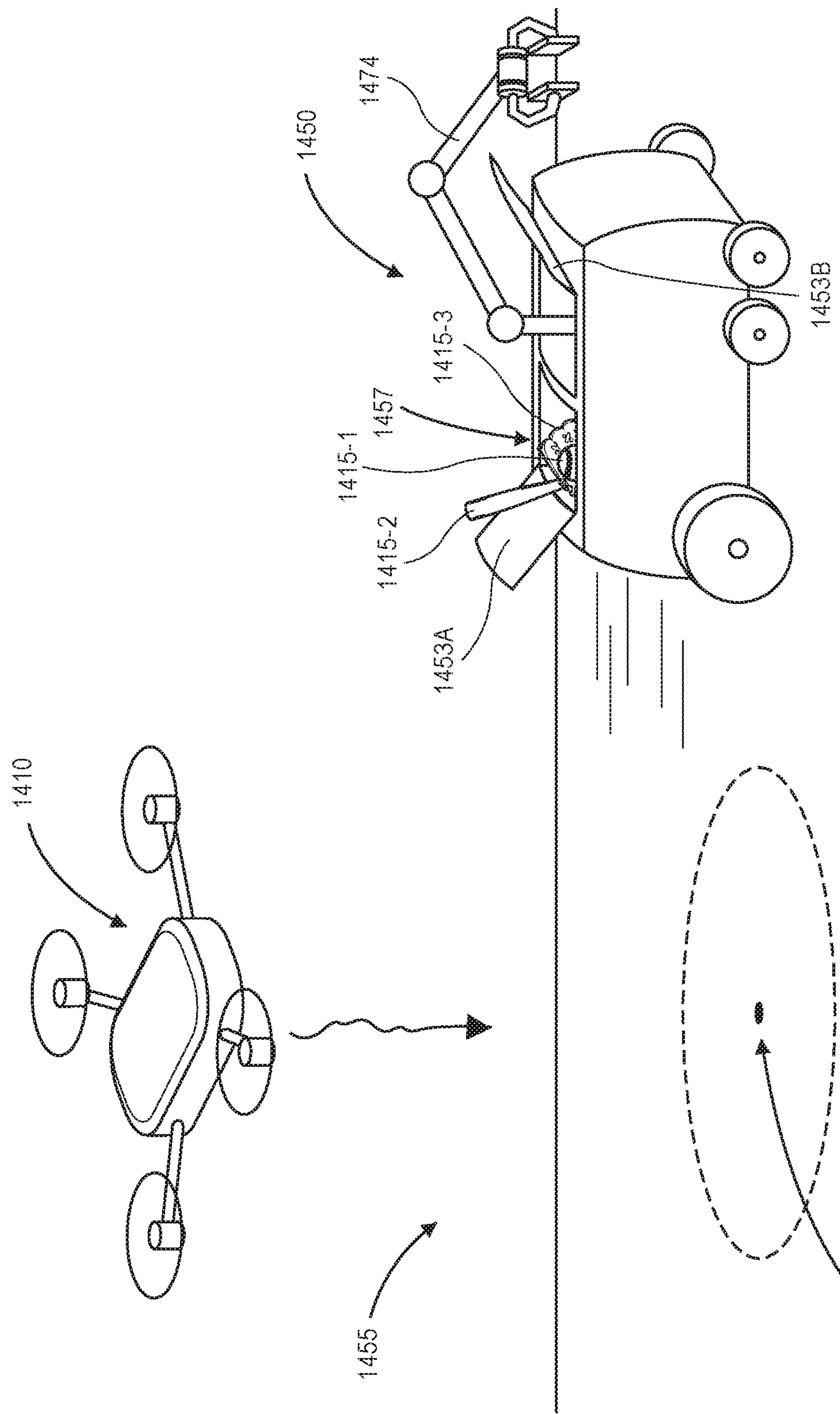

As is shown in FIG. 14D, after the ground vehicle 1450 has removed the ball 1415-1, the bat 1415-2 and the glove 1415-3 from the delivery area 1435, an aerial vehicle 1410 may complete a landing in the delivery area 1435, before performing one or more tasks or evolutions in the delivery area 1435, such as a delivery of one or more items.

Although some of the embodiments of the present disclosure depict deliveries of items to destinations by one or more delivery vehicles, those of ordinary skill in the pertinent arts will recognize that the systems and methods of the present disclosure are not so limited. Rather, autonomous ground vehicles may be used to select areas and/or rendezvous points for vehicles during the performance of any type of mission and are not limited to deliveries of items. Moreover, although some of the embodiments of the present disclosure depict autonomous ground vehicles or aerial vehicles that are small in size, those of ordinary skill in the pertinent arts will recognize that the systems and methods of the present disclosure are not so limited. Rather, autonomous ground vehicles or aerial vehicles may be of any size or shape, and may be configured or outfitted with components or features that enable such vehicles to capture information or data regarding ground conditions, to select a delivery area for a delivery vehicle, or to communicate with any extrinsic computer devices or systems in accordance with the present disclosure.

Furthermore, those of ordinary skill in the pertinent arts will recognize that the systems and methods disclosed herein may be used to select an area for performing any tasks or evolutions, or for preparing an area for the performance of any tasks or evolutions, based on any information or data captured by one or more autonomous ground vehicles, and are not limited to selecting areas for receiving deliveries of items, or preparing areas for landing or take-offs by aerial vehicles. Moreover, those of ordinary skill in the pertinent arts will recognize that one or more of the computer systems disclosed herein may be configured to execute one or more optimal path or route algorithms (e.g., shortest path or shortest route algorithms) for providing guidance to or instructing one or more vehicle systems or couriers to travel to a selected area. A path or route may be identified as "optimal" on any objective or subjective basis. For example, an optimal path or route may have a lowest financial cost, a shortest time, or any other beneficial or preferential ranking or status according to one or more objective or subjective metrics.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 7 or 11, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A distribution system comprising:

a fulfillment center;

an autonomous ground vehicle having an inclinometer and an imaging device;

an aerial vehicle; and at least one computer system in communication with the autonomous ground vehicle and the aerial vehicle, wherein the at least one computer system is configured to execute a method comprising:

receiving an order for a delivery of an item from the fulfillment center to a destination;

causing the autonomous ground vehicle to capture data regarding grounds at the destination by at least one of the inclinometer or the imaging device by traveling in at least one pattern within a boundary of the grounds;

receiving the data regarding the grounds from the autonomous ground vehicle;

selecting a landing area for the aerial vehicle on the grounds based at least in part on the data regarding the grounds;

causing the autonomous ground vehicle to travel to the landing area;

causing the autonomous ground vehicle to make at least one marking identifying the landing area on the grounds at the landing area;

transmitting at least one geolocation associated with the landing area to the aerial vehicle;

causing the item to be loaded onto the aerial vehicle at the fulfillment center;

causing the aerial vehicle to travel from the fulfillment center to the destination; and causing the aerial vehicle to complete a landing evolution at the landing area.

2. The distribution system of claim 1, wherein the at least one pattern comprises at least one path that is parallel to at least a portion of the boundary, and wherein the data is captured with the autonomous ground vehicle traveling in the at least one pattern on the grounds.

3. The distribution system of claim 1, wherein the aerial vehicle lands on at least one surface of the autonomous ground vehicle at the landing area.

4. A method comprising:

receiving information regarding a destination for performing at least one evolution by an aerial vehicle;

causing an autonomous ground vehicle to travel in a selected pattern on one or more ground surfaces within a vicinity of the destination, wherein the autonomous ground vehicle is equipped with at least one sensor;

capturing data regarding the one or more ground surfaces by the at least one sensor, wherein the data is captured by the at least one sensor with the autonomous ground vehicle traveling in the selected pattern on the one or more ground surfaces;

selecting, based at least in part on the data, at least a first area on the one or more ground surfaces for performing the at least one evolution by the aerial vehicle;

causing the autonomous ground vehicle to make at least one marking identifying the first area on the one or more ground surfaces; and causing the aerial vehicle to perform the at least one evolution at the first area.

5. The method of claim 4, wherein the autonomous ground vehicle comprises:

a frame, wherein the at least one sensor is coupled to the frame;

at least one wheel;

a motor disposed within the frame, wherein the motor is configured to cause the at least one wheel to rotate at a speed within a predetermined speed range;

at least one power module for powering the motor;

a position sensor;

at least one computer processor; and at least one memory component.

6. The method of claim 5, wherein the at least one sensor comprises an inclinometer configured to detect at least one angle of inclination of the autonomous ground vehicle about one or more axes, and wherein capturing the data regarding the one or more ground surfaces comprises:

determining angles of inclination of the autonomous ground vehicle at one or more positions on the one or more ground surfaces; and storing the angles of inclination of the autonomous ground vehicle in association with the one or more positions in the at least one memory component, wherein the first area is selected based at least in part on the angles of inclination and the one or more positions.

7. The method of claim 5, wherein the at least one sensor comprises an imaging device, and wherein capturing the data regarding the one or more ground surfaces comprises:

capturing imaging data at one or more positions on the one or more ground surfaces;

detecting at least one obstruction within the imaging data; and storing an identifier of the at least one obstruction in association with the one or more positions in the at least one memory component, wherein the first area is selected based at least in part on the at least one obstruction and the one or more positions.

8. The method of claim 5, further comprising:

determining at least one of a dimension or an operational constraint of the aerial vehicle, wherein the first area is selected based at least in part on the data and the at least one of the dimension or the operational constraint.

9. The method of claim 5, wherein selecting at least the first area comprises:

identifying a plurality of areas at the destination for performing the evolution by the aerial vehicle;

determining, for each of the plurality of areas, at least one of:

a minimum distance to an obstruction at the destination; or a slope; and selecting one of the plurality of areas based at least in part on at least one of the minimum distance to the obstruction or the slope, wherein the first area is the selected one of the plurality of areas.

10. The method of claim 5, wherein receiving the information regarding the destination comprises:

receiving an order for a delivery of an item over a network, wherein the at least one evolution is the delivery of the item, wherein the destination is specified in the order, and wherein the autonomous ground vehicle is caused to travel on the one or more ground surfaces at the destination in response to receiving the order.

11. The method of claim 5, further comprising:

causing the autonomous ground vehicle to travel to the first area; and causing the aerial vehicle to land on at least one surface of the frame of the autonomous ground vehicle.

12. The method of claim 5, further comprising:

generating a profile of the one or more ground surfaces based at least in part on the data, wherein the profile comprises:

a location of an obstruction on the one or more ground surfaces;

an elevation of the one or more ground surfaces;

a location of at least one slope of the one or more ground surfaces;

a location of at least one surface texture of the one or more ground surfaces; or a location of at least one weather condition at the one or more ground surfaces, wherein the first area is selected based at least in part on the profile.

13. The method of claim 12, further comprising:

transmitting, by the autonomous ground vehicle, the profile to one of a server or the aerial vehicle over one or more networks, wherein at least the first area is selected by one of the server or at least one computer processor provided aboard the aerial vehicle based at least in part on the profile.

14. The method of claim 5, wherein the pattern comprises at least a portion of a perimeter of the destination and at least one path parallel to at least a portion of the perimeter of the destination.

15. The method of claim 5, further comprising:

causing the autonomous ground vehicle to travel to the first area;

wherein the at least one marking comprises at least one of paint or chalk applied to the one or more ground surfaces at the first area.

16. The method of claim 5, wherein the autonomous ground vehicle is a lawn mower equipped with the at least one sensor.

17. A method comprising:

receiving, over a network, a request for a delivery of an item, wherein the request specifies a destination for the delivery of the item;

loading the item onto an aerial vehicle;

causing an autonomous ground vehicle associated with the destination to travel in a selected pattern on grounds within a vicinity of the destination, wherein the autonomous ground vehicle comprises:

a frame;

an imaging device;

an inclinometer;

a moisture sensor;

at least one wheel;

a motor disposed within the frame, wherein the motor is configured to cause the at least one wheel to rotate at a speed within a predetermined speed range;

at least one power module for powering the motor;

a position sensor;

at least one computer processor; and at least one memory component;

capturing data regarding the grounds by at least one of the imaging device, the inclinometer, or the moisture sensor, wherein the data is captured with the autonomous ground vehicle traveling in the selected pattern on the grounds;

selecting an area on the grounds based at least in part on the data;

transmitting at least one geolocation associated with the area to the aerial vehicle over the network;

causing the autonomous ground vehicle to travel to the area;

causing the aerial vehicle to land on the autonomous ground vehicle at the area; and causing the aerial vehicle to transfer the item to the autonomous ground vehicle at the area.

18. The method of claim 17, wherein the data comprises at least one of:

at least one slope at one or more locations on the grounds;

moisture contents at the one or more locations;

surface textures at the one or more locations; or weather conditions at the one or more locations.

19. The method of claim 17, wherein selecting the area comprises:

identifying a plurality of areas on the grounds for transferring the item to the autonomous ground vehicle by the aerial vehicle;

determining, for each of the plurality of areas, at least one of:

a minimum distance to an obstruction; or a slope; and selecting one of the plurality of areas based at least in part on at least one of the minimum distance to the obstruction or the slope, wherein the selected area is the one of the plurality of areas.

20. The method of claim 17, further comprising:

determining at least one of a dimension or an operational constraint of the aerial vehicle, wherein the area is selected based at least in part on the data regarding the grounds and the at least one of the dimension or the operational constraint.

* * * * *